(12) United States Patent
Barbour et al.

(10) Patent No.: US 12,175,600 B2
(45) Date of Patent: Dec. 24, 2024

(54) DATA MANAGEMENT SYSTEM FOR SPATIAL PHASE IMAGING

(71) Applicant: Photon-X, Inc., Kissimmee, FL (US)

(72) Inventors: Blair Barbour, Windemere, FL (US); Nicholas Englert, Orlando, FL (US); David Theodore Truch, Katy, TX (US); John Harrison, Kissimmee, FL (US)

(73) Assignee: Photon-X, Inc., Kissimmee, FL (US)

( * ) Notice: Subject to any disclaimer, the term of this patent is extended or adjusted under 35 U.S.C. 154(b) by 237 days.

(21) Appl. No.: 17/587,540

(22) Filed: Jan. 28, 2022

(65) Prior Publication Data

US 2022/0405874 A1 Dec. 22, 2022

Related U.S. Application Data

(63) Continuation of application No. PCT/US2020/045956, filed on Aug. 12, 2020.
(Continued)

(51) Int. Cl.
*G06T 17/20* (2006.01)
*G06T 1/00* (2006.01)
(Continued)

(52) U.S. Cl.
CPC ............ *G06T 17/20* (2013.01); *G06T 1/0007* (2013.01); *G06V 10/147* (2022.01); *G06V 10/44* (2022.01);
(Continued)

(58) Field of Classification Search
None
See application file for complete search history.

(56) References Cited

U.S. PATENT DOCUMENTS

| 5,631,970 A | 5/1997 | Hsu |
| 5,890,095 A | 3/1999 | Barbour et al. |

(Continued)

FOREIGN PATENT DOCUMENTS

| JP | 2008002949 | 1/2008 |
| KR | 20000005409 | 1/2000 |

(Continued)

OTHER PUBLICATIONS

KIPO, International Search Report and Written Opinion mailed Nov. 11, 2020, in PCT/US2020/045956, 10 pgs.

*Primary Examiner* — Siamak Harandi
*Assistant Examiner* — Caroline Tabancay Duffy
(74) *Attorney, Agent, or Firm* — Henry Patent Law Firm PLLC

(57) ABSTRACT

In a general aspect, a data management system for spatial phase imaging is described. A data management system for spatial phase imaging includes: a storage engine configured to receive and store input data in a record format, the input data including: pixel-level first-order primitives generated based on electromagnetic (EM) radiation received from an object located in a field-of-view of an image sensor device; and pixel-level second-order primitives generated based on the first-order primitives. The data management system further includes: an analytics engine configured to determine a plurality of features of the object based on the pixel-level first-order primitives and the pixel-level second-order primitives; and an access engine configured to provide a user access to the plurality of features of the object determined by the analytics engine and to the input data stored by the storage engine.

25 Claims, 35 Drawing Sheets

Related U.S. Application Data

(60) Provisional application No. 62/885,436, filed on Aug. 12, 2019, provisional application No. 62/885,407, filed on Aug. 12, 2019.

(51) Int. Cl.
| | |
|---|---|
| *G06V 10/147* | (2022.01) |
| *G06V 10/44* | (2022.01) |
| *G06V 10/54* | (2022.01) |
| *G06V 10/762* | (2022.01) |
| *H04N 19/90* | (2014.01) |
| *G06V 20/13* | (2022.01) |
| *G06V 20/64* | (2022.01) |
| *G06V 40/13* | (2022.01) |

(52) U.S. Cl.
CPC ............ *G06V 10/54* (2022.01); *G06V 10/762* (2022.01); *G06V 20/13* (2022.01); *G06V 20/64* (2022.01); *G06V 40/1312* (2022.01)

(56) References Cited

U.S. PATENT DOCUMENTS

| | | | |
|---|---|---|---|
| 6,163,365 | A | 12/2000 | Takahashi |
| 6,671,390 | B1 | 12/2003 | Barbour et al. |
| 6,741,744 | B1 | 5/2004 | Hsu |
| 6,810,141 | B2 | 10/2004 | Barbour |
| 8,023,724 | B2 | 9/2011 | Barbour |
| 8,320,661 | B2 | 11/2012 | Barbour |
| 8,736,670 | B2 | 5/2014 | Barbour et al. |
| 9,693,728 | B2 | 7/2017 | Harry et al. |
| 9,736,670 | B2 | 7/2017 | Harry et al. |
| 2002/0181761 | A1 | 12/2002 | Barbour |
| 2003/0103674 | A1 | 6/2003 | Publicover |
| 2005/0163365 | A1* | 7/2005 | Barbour .................. G01J 3/36 |
| | | | 382/312 |
| 2007/0046525 | A1 | 3/2007 | Holbrook et al. |
| 2011/0037965 | A1 | 2/2011 | Hintz et al. |
| 2011/0134220 | A1 | 6/2011 | Barbour et al. |
| 2014/0211193 | A1 | 7/2014 | Bloom et al. |
| 2015/0350569 | A1 | 12/2015 | Espersen et al. |
| 2015/0373320 | A1* | 12/2015 | Ackerson .................. G06T 17/00 |
| | | | 348/44 |
| 2016/0292908 | A1* | 10/2016 | Obert .................... G06T 15/005 |
| 2017/0006233 | A1 | 1/2017 | Venkataraman et al. |
| 2017/0091897 | A1 | 3/2017 | Lee et al. |
| 2017/0098310 | A1 | 4/2017 | Chefd'Hotel et al. |
| 2017/0345222 | A1 | 11/2017 | Cohen-Or et al. |
| 2019/0178968 | A1 | 6/2019 | Cetingul |
| 2019/0213739 | A1 | 7/2019 | Ohba et al. |
| 2019/0258878 | A1 | 8/2019 | Koivisto et al. |
| 2020/0054398 | A1* | 2/2020 | Kovtun .................. G16H 40/63 |
| 2020/0138521 | A1 | 5/2020 | Aben et al. |
| 2020/0175715 | A1 | 6/2020 | Ogasawara |
| 2020/0231176 | A1 | 7/2020 | Motoyama et al. |
| 2020/0272834 | A1 | 8/2020 | Motoyama et al. |
| 2022/0103797 | A1 | 3/2022 | Barbour et al. |

FOREIGN PATENT DOCUMENTS

| | | | |
|---|---|---|---|
| KR | 20150069617 | 6/2015 | |
| WO | 1997037336 | 10/1997 | |
| WO | 2012053811 | 4/2012 | |
| WO | WO-2012053811 A2 * | 4/2012 | .......... G06K 9/4652 |
| WO | 2018213841 | 11/2018 | |
| WO | 2020163742 | 8/2020 | |
| WO | 2020236575 | 11/2020 | |
| WO | 2021030454 | 2/2021 | |
| WO | 2021067665 | 4/2021 | |

* cited by examiner

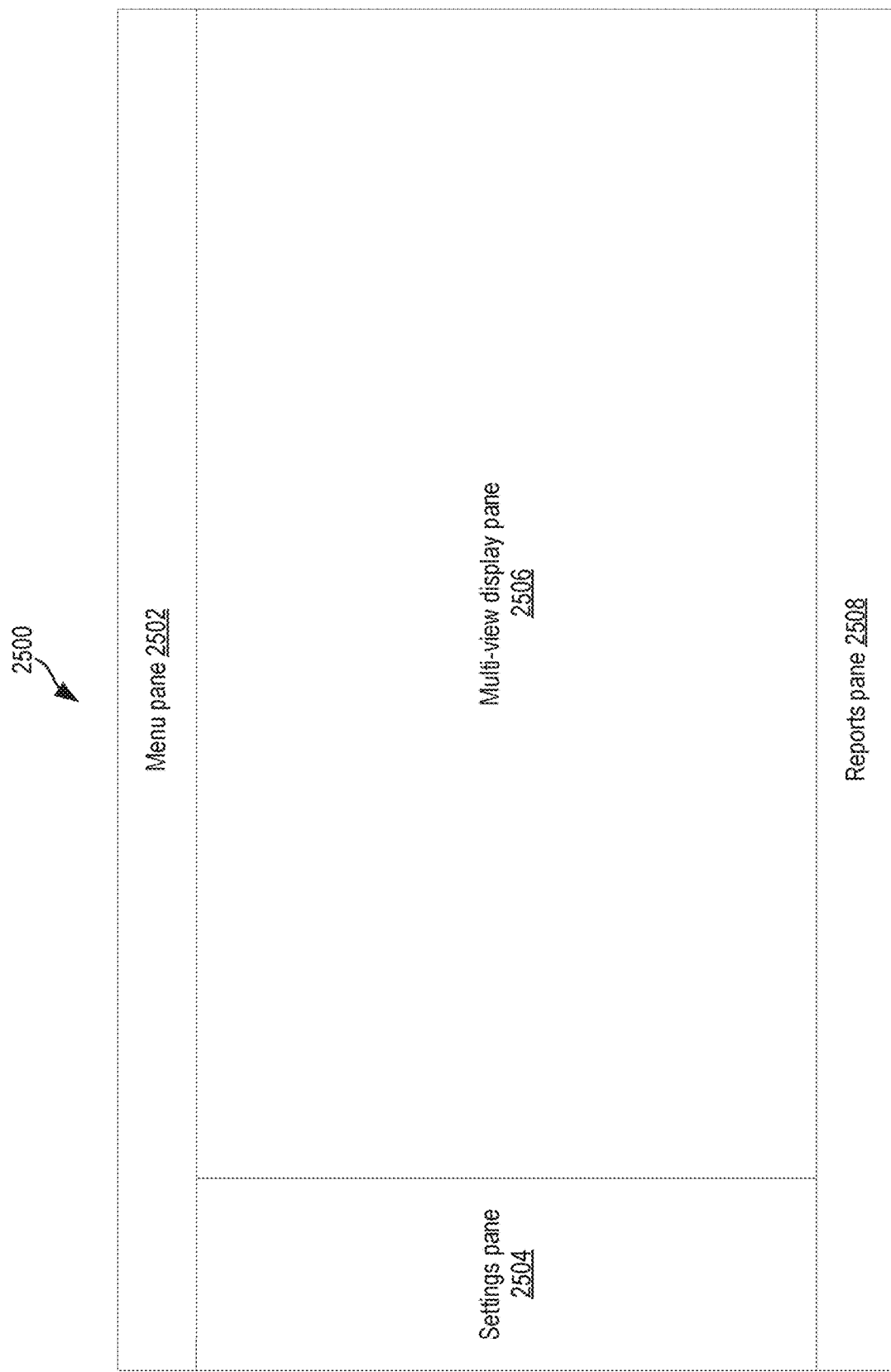

DATA MANAGEMENT SYSTEM FOR SPATIAL PHASE IMAGING

CROSS-REFERENCE TO RELATED APPLICATIONS

The present application is a continuation of PCT Application No. PCT/US2020/045956, filed Aug. 12, 2020, entitled "Data Management System for Spatial Phase Imaging" which claims priority to U.S. Provisional Patent Application Ser. No. 62/885,436, filed Aug. 12, 2019, entitled "Apparatus and Method for Extracting Shape Operating System ShapeOS," and U.S. Provisional Patent Application Ser. No. 62/885,407, filed Aug. 12, 2019, entitled "Apparatus and Method for Extracting Dynamic Pixel Normal Shape pnShape from Electromagnetic Energy," the disclosures of which are hereby incorporated by reference in its entirety.

BACKGROUND

The following description relates to a data management system for spatial phase imaging.

Conventional imaging systems employ intensity-based techniques to detect electromagnetic energy proceeding from a source (e.g., an object). As one example of a conventional system, a spectroscopic system determines spectral (wavelength) composition of objects and scenes. Conventional imaging systems may not be suitable to generate 3D images or other angle representations of object shapes and scenes in real-time. Furthermore, conventional imaging systems may not be suitable in incoherent electromagnetic environments or turbid media (e.g., environments containing mist, fog, or smoke). Other imaging solutions may be needed to overcome the limited use of conventional imaging systems.

DESCRIPTION OF DRAWINGS

FIG. 25 shows an example portal that can be used to provide access to functionalities in the shape operating system shown in FIG. 19.

DETAILED DESCRIPTION

In some aspects of what is described here, a data management system (e.g., a system of technology, mathematical routines, and approaches which can be constructed in various architectures, procedures and order) is used to improve digital interpretation of a real-world scene in the context of spatial phase imaging (SPI). The data management system can be used in a variety of real-world applications such as corrosion detection, autonomous driving, tracking, farming, terrain mapping, situational awareness, to name a few. The data management system can be organized into digital architectures such as operating system structures, application structures, and platform-based structures. The combination of approaches can be implemented on the wide variety of processing architectures currently in existence such as laptops, smart phones, graphics processing units (GPUs), advanced reduced instruction set computer machine (ARM) processors, etc. and any new architectures which will be developed such as quantum, photonic, biological, etc. In some implementations, the data management system can manage the storage, privacy, distribution, and transformation of captured SPI-based rich data attributes and data sets such as surface and shape information.

Figure 1A:
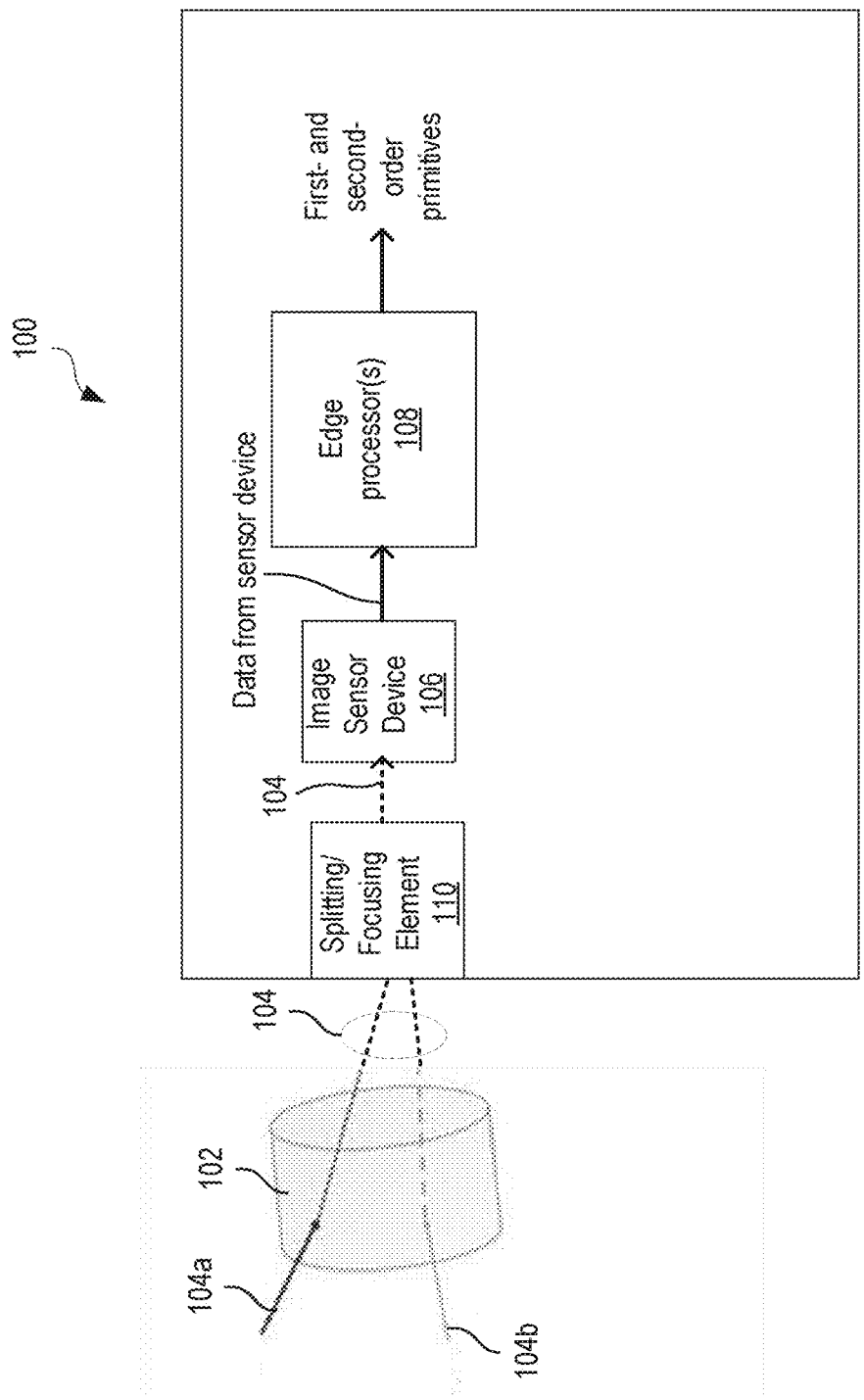
FIGS. 1A to 1C show an example single-lens spatial phase imaging (SPI) system.
Figure 1B:
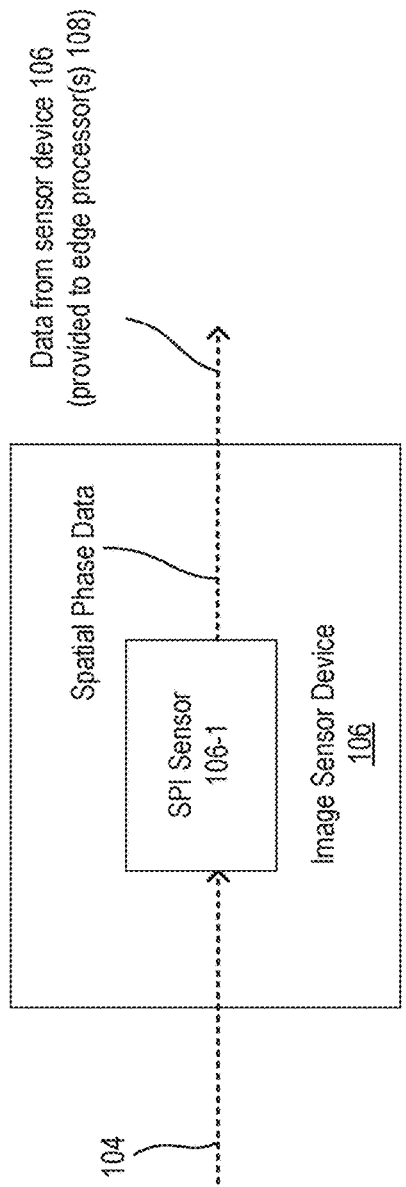
Figure 1C:
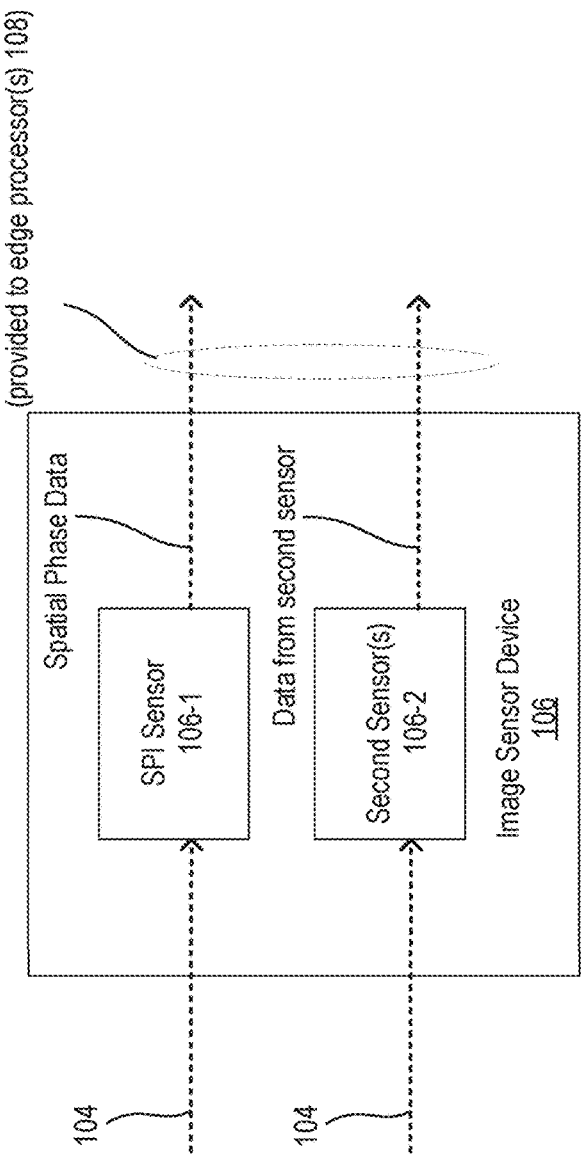
Figure 2A:
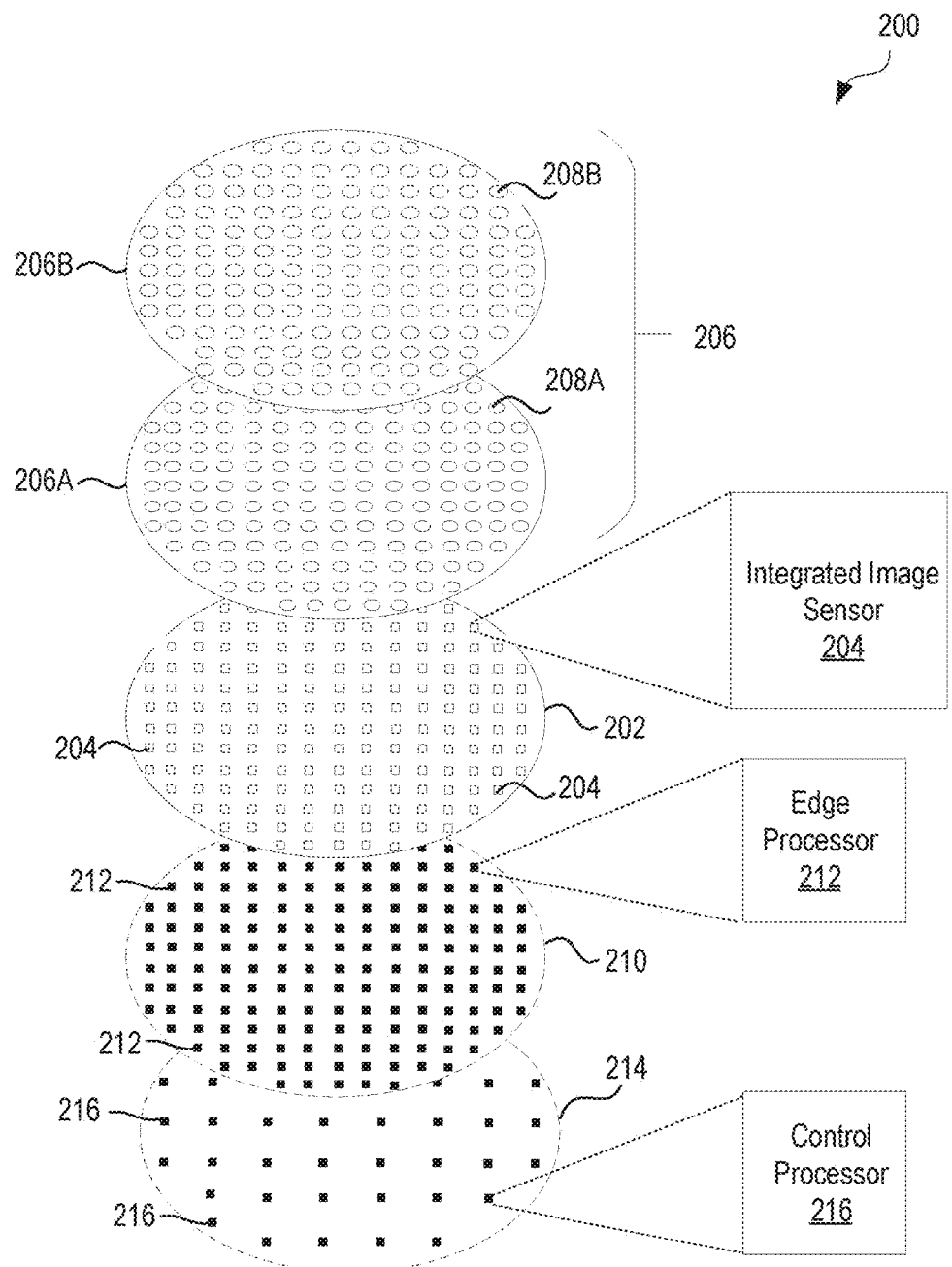
FIGS. 2A and 2B show an example wafer-level SPI system.
Figure 2B:
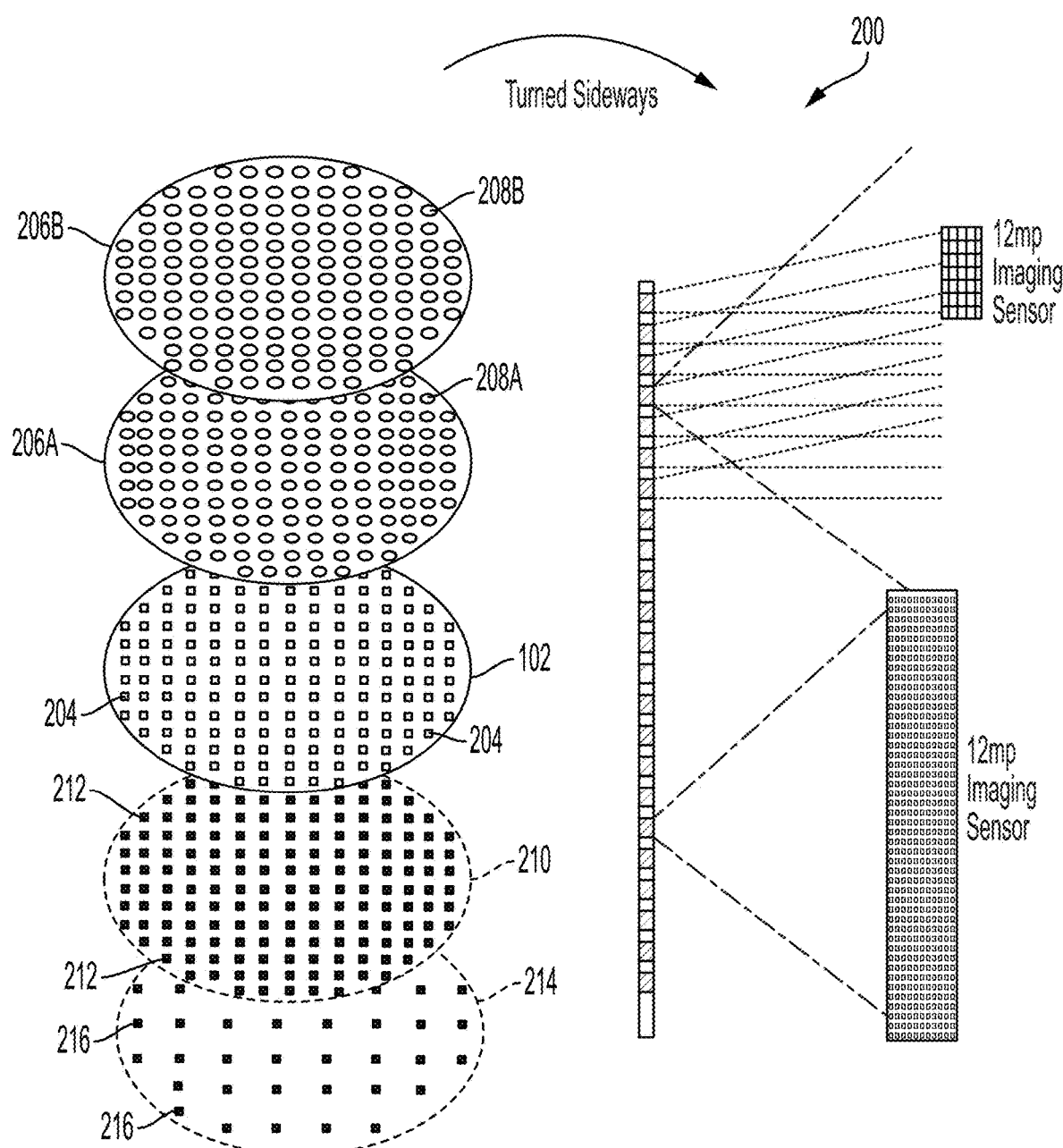

SPI systems can be implemented in various ways, examples being a single-lens SPI system, a wafer-level SPI system, etc. FIGS. 1A, 1B, and 1C show an example single-lens SPI system 100. FIGS. 2A and 2B show an example wafer-level SPI system that is developed by stacking various wafers. In a general aspect, the SPI systems 100, 200 are lensed 3D data acquisition sensor and analytics platforms that are configured to capture 3D data at the pixel level and across the electromagnetic (EM) spectrum. The 3D data captured by the SPI systems 100, 200 can be dense, high-resolution, accurate, and information-rich representations of scenes or objects located within the fields-of-view (FOVs) of the respective SPI systems 100, 200. The SPI systems 100, 200 are also configured to: process the captured 3D data to generate 3D surface data and 3D shape data; apply artificial intelligence (AI) to analyze the 3D surface data and 3D shape data; compare results to known parameters; and output real-time or near-time solutions.

The SPI systems 100, 200 include image sensors which function as shape-based sensors that are configured to passively capture spatial phase and radiometric information of the EM radiation that is collected by the SPI systems 100, 200. In a general aspect, the SPI systems 100, 200 are sensitive to spatial phase of the EM radiation incident upon it. The SPI systems 100, 200 re-describe objects and scenes in their FOVs in terms of spatial phase data. In particular, the spatial phase of EM radiation emanating from the surfaces of objects and scenes, whether it is emitted, transmitted, or reflected, has a measurable spatial phase. Thus, the shape of the object, the type of material from which it is made, the orientation of the object relative to the observer, etc., affect the spatial phase of the EM radiation incident upon the SPI systems 100, 200. As a result, each feature of the object 102 has a distinct spatial phase signature. Consequently, the EM radiation incident upon the SPI systems 100, 200 contains information indicative of the interaction of EM energy with objects and scenes in their FOVs.

Referring initially to the example SPI system 100 shown in FIGS. 1A to 1C, the SPI system 100 may be used to generate a representation of an object 102 that is located within the FOV of the SPI system 100. The object 102 may be any physical object in the real world, some examples being buildings, structures, a human body, scenes, terrains, astronomical bodies, planetary bodies, vehicles, among others.

The SPI system 100 is sensitive to EM radiation 104 that is incident upon it. The EM radiation 104 encompasses any and all wave energies in the spectrum of EM energy. Examples of EM energies that the SPI system 100 is sensitive to include the visible light range, the near infrared (NIR) range, the infrared range (e.g., short-wave infrared (SWIR), mid-wave infrared (MWIR), LWIR), the ultraviolet (UV) range, the microwave range, the x-ray range, the gamma ray range, the radio frequency range, radiation in the terahertz (THz) range, etc. The EM radiation 104 may be emitted by the object 102, reflected off the object 102 and directed toward the SPI system 100, transmitted through the object 102 and directed toward the SPI system 100, or may be a combination thereof. In some implementations, the EM radiation 104 may include ambient EM energy (e.g., ambient light 104a) that is reflected off, or emitted from surfaces of the object 102 or transmitted through the object 102. Additionally or alternatively, the EM radiation 104 may include EM energy that is projected onto the object 102 by an EM energy source (e.g., projected light 104b) and reflected off, emitted from surfaces of the object 102 or transmitted through the object 102.

Figure 3A:
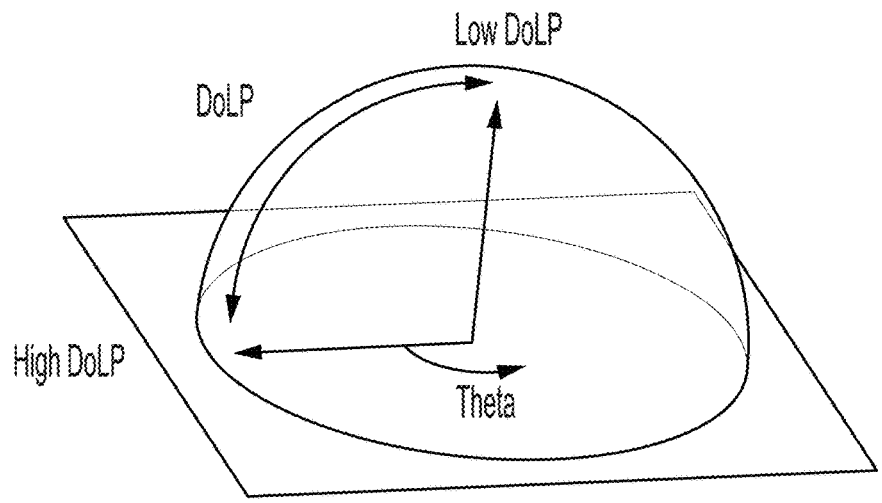
FIG. 3A shows an example of degrees of linear polarization of electromagnetic radiation and its correlation to a direction cosine of the electromagnetic radiation.
Figure 3B:
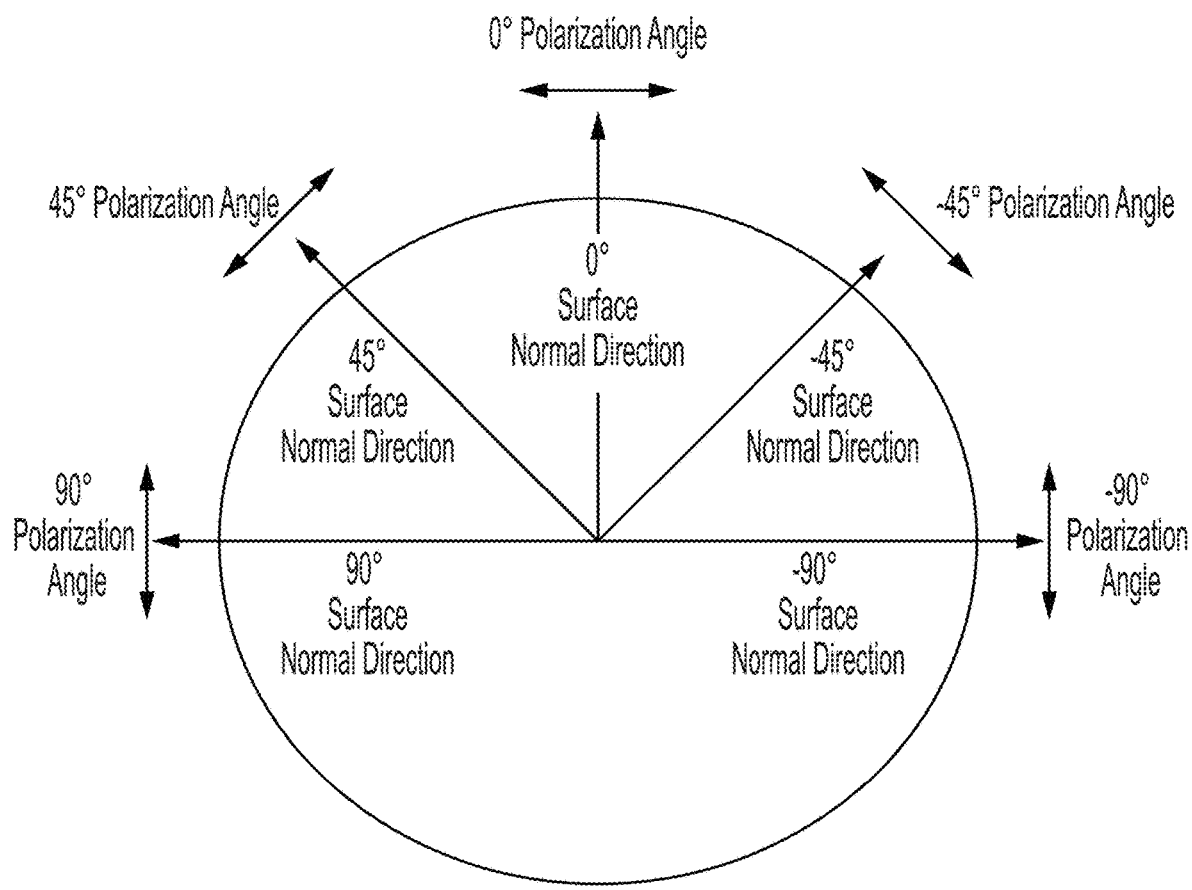
FIG. 3B shows an example of a correspondence between a direction of a surface normal of electromagnetic radiation and a polarization angle of the electromagnetic radiation.

Properties of the EM radiation 104 may be altered as it interacts with the object 102. FIG. 3A shows, as an example, that after an interaction with the object 102, the percentage of linear polarization in the EM radiation 104 reflected from surfaces of the object 102 (indicated in FIG. 3A as a degree of linear polarization, DoLP) may be directly correlated to the direction cosine of the original EM energy incident on the object 102. Furthermore, the primary angle of the reflected linearly polarized light, which is indicated as Theta in FIG. 3A, may be mathematically related to the in-plane angle of the reflecting surface. FIG. 3B shows an example of a correspondence between a direction of a surface normal and a surface angle of the EM radiation 104. In the example shown in FIG. 3B, which is a specific example where the correlation is defined relative to a reference coordinate frame, a 90-degree polarization angle may correspond to a 90-degree surface normal direction; a 45-degree polarization angle may correspond to a 45-degree surface normal direction; a 0-degree polarization angle may correspond to a 0-degree surface normal direction; a −45-degree polarization angle may correspond to a −45-degree surface normal direction; and a −90-degree polarization angle may correspond to a −90-degree surface normal direction. While FIG. 3B shows five specific angles of polarization, the angles of polarization can be of any value between 0 degrees and 360 degrees, or multiples thereof. The example of FIG. 3B is merely illustrative and other correlations may be defined relative to other reference coordinate frame (e.g., relative to an object's surface or relative to a camera angle).

Since the EM radiation 104 incident on the SPI system 100 has properties that are indicative of its interaction with the object 102, the SPI system 100 can derive information about the object 102 from the magnetic vector of the EM radiation 104, from the electric vector of the EM radiation 104, or from both. In this regard, the SPI system 100 includes an image sensor device 106 configured to generate 3D data (e.g., spatial phase data) and one or more edge processors 108 configured to process the 3D data and generate, in real-time or near-time (e.g., in a range from one millisecond to about 5 seconds), first- and second-order primitives that convey information about the object 102.

The first- and second-order primitives may include: the shapes and surface anomalies of the object; surface roughness of the object; material analysis of the object; lighting analysis of the object; the angles of various surfaces of the object (e.g., expressed as surface normal vectors or orientations in the x-, y-, and z-directions); edges, occlusions, blobs, masks, gradients, and interior volume features of the object; surface/pixel geometry of the object; a frequency distribution of the EM radiation 104 received from the object; color and intensity information of object; EM spectrum information of the object (from any band in the EM spectrum); the degree of linear polarization, angle of polarization, angle of linear polarization, angle of incidence, angle of reflection, angle of refraction, depolarization factor, principal curvatures, mean curvature, Gaussian curvature, synthetic skin or lighting, unpolarized scatter, ellipticity, albedo, the index of refraction, cluster of angles, surface angles, slope vectors, angular relationships, rate of slope, surface scattering, specular/diffuse scattering, propagation scattering of the object; pixel-to-pixel clusters; 3D object or scene detection; distance tracking; scene reconstruction; object mapping; surface characterization; and others. Therefore, the object 102 may be represented by a broad number of parameters.

The one or more edge processors 108 may also be configured to cluster similar features or information related to the object 102. For example, the one or more edge processors 108 may be configured to cluster similar first- and second-order primitives representing the object 102. By clustering similar features/information from the pixels representing the object 102, the SPI system 100 can group the scene into different object types or group the object 102 into different surfaces, thus enabling segmentation of the object 102 from a cluttered scene. The application of this segmentation can be crucial for machine visioning applications. Segmentation at the angle and surface level can also be important in describing a surface or shape of a 3D object.

These clustered and segmented parameters form a family of representations called pXSurface and pXShape where "X" defines the attribute type. For example, information related to surface normal vectors or orientations of the object 102 may be clustered or segmented, thus resulting in a pNSurface and pNShape description of the object 102, where "N" denotes the surface normal vectors or orientations. By deriving information about the object 102, the SPI system 100 may also detect the presence of object 102 and track or predict their motion (e.g., in the context of drone or object detection and tracking). Other applications of the SPI system 100 include predicting the rate of corrosion or blister growth, quality inspection and 3D scanning in an industrial environment, wound imaging and early skin cancer detection, 3D facial reconstruction and identification of an individual, autonomous navigation, among others. These, and other, applications of the SPI system 100 are described in further detail below.

The image sensor device 106 includes a first image sensor 106-1 (e.g. in the example shown in FIG. 1B). The first image sensor 106-1 may be an SPI sensor that generates spatial phase data of the object 102. As described in further detail below in FIGS. 4A and 4B, the SPI sensor 106-1 includes an EM detector (e.g., including an array of radiation-sensing pixels) and a polarization structure. Also as discussed in further detail below, the spatial phase data can be processed by the processor(s) 108 to generate first- and second-order primitives that convey information about the object 102 (e.g., one or more of the features discussed above).

In some implementations, the image sensor device 106 may also include at least one second image sensor 106-2 (e.g., in the example shown in FIG. 1C). The second image sensor 106-2 may be a sensor that generates a different cue or aspect compared to the SPI sensor 106-1. For example, the second image sensor 106-2 may be a sensor having a different modality compared to the SPI sensor 106-1. The second image sensor 106-2 may include a Kinect sensor, a LIDAR sensor, infrared sensors, spectral sensors, X-Ray sensors, laser scanners, monochrome and color sensors, shape from motion, stereo, depth sensors, a sonar sensor, a radar sensor, a ToF sensor, a plenoptic (lightfield) sensor, an acoustic or stereo sensor, a structured light sensor, a rangefinder, a focus sensor, a NIR sensor, a SWIR sensor, a MWIR sensor, a LWIR sensor, or a combination thereof. In some implementations where the SPI sensor 106-1 is sensitive to a high energy regime of the EM spectrum, the second image sensor(s) 106-2 may be omitted. In some examples, the second image sensor 106-2 may even be another SPI sensor that produces a different or same cue or aspect compared to the SPI sensor 106-1. For example, in some implementations, while the spatial phase data from the SPI sensor 106-1 may be processed to generate information indicative of a 3D surface topography of the object 102, the data from the second image sensor 106-2 (e.g., another SPI sensor) may be processed to generate information indicative of a shape from motion or a specular/diffuse separation shape. As such, by utilizing the SPI sensor alone (e.g., in the example shown in FIG. 1B) or with another SPI or different types of sensor(s) (e.g., in the example shown in FIG. 1C), the SPI system 100 captures various different physical properties, cues, or aspects, thus enabling the generation of the combined data set that is the dense, high-resolution, accurate, and information-rich representation of the object 102.

In the example of FIG. 1A, EM radiation 104 from the object 102 is focused onto the image sensor device 106 by an optical element 110. The optical element 110 may include one or more apertures, lenses, mirrors, catoptric elements, fiber optic elements, micromirror arrays, microlens arrays, baffles, holographic optical elements, diffractive optical elements, and beam steering mechanisms. For example, catoptric elements may be used to design a wide-angle optical element 110. As another example, the optical element 110 may include beam steering mechanisms may be used to expand a FOV of the image sensor device 106. As a further example, microlens arrays may be used to take advantage of numerical imaging phenomena including, but not limited to, super-resolution, greater depth of field, or greater dynamic range. In some examples where the image sensor device 106 includes the SPI sensor 106-1 and the second image sensor 106-2, the optical element 110 may function as a splitting element that splits the EM radiation 104 and focuses the split beams onto the SPI sensor 106-1 and the second image sensor 106-2. In such examples, the optical element 110 may further include a prism, a beam splitter, an element including metamaterials, or an element including birefringent materials.

Referring now to the wafer-level SPI system 200 shown in FIGS. 2A and 2B, the SPI system 200 includes an imaging wafer 202, wafer-level integrated optics 206 stacked on the imaging wafer 202, a processing wafer 210 attached to another side of the imaging wafer 202, and a control wafer 214 attached to a backside of the processing wafer 210. By stacking wafers, more integrated sensors in a smaller more cost-effective package may be developed. Like the SPI system 100, the SPI system 200 is sensitive to EM radiation that is incident upon it.

The SPI system 200 includes the imaging wafer 202. In some implementations, pixels of different sizes, focal lengths, integration times, and different image sensors can be interleaved within the same wafer-level SPI system 200, as seen in the example of FIG. 2B. As an example, one or more LWIR bolometers can be placed on the same imaging wafer 202 as silicon CMOS visible/NIR imagers. As a further example, different pixel sizes can be mixed with cells of pixels to create a sensor having wide dynamic range and strong angle sensitivity across the image. In some implementations, the imaging wafer 202 has a diameter ranging from about 20 mm to about 500 mm. As examples, the imaging wafer 202 may be a semiconductor wafer having a diameter of about 25 mm, about 50 mm, about 75 mm, about 100 mm, about 125 mm, about 150 mm, about 200 mm, about 300 mm, or about 450 mm. The typical wafers can be either 200 mm or 300 mm for standard CMOS image sensor process flows.

The imaging wafer 202 includes an array of integrated image sensors 204. The image sensors 204 can be mixed or similar imager types, such as visible, NIR, Si SWIR, SWIR, MWIR, LWIR, UV, THz, X-ray, depth, spectral (Single, Multi, hyper), etc. As described in further detail below in FIGS. 4A and 4B, each integrated image sensor 204 includes an EM detector (e.g., including an array of radiation-sensing pixels) and a polarization structure. In some implementations, each integrated image sensor 204 can include additional layers, examples being color, multispectral, hyperspectral, polarization, lenslets, multiple types of other depth pixels or imagers, etc. In some implementations, the polarization structure is disposed over (e.g., placed on) the array of radiation-sensing pixels, while in other implementations (e.g., backside illuminated image sensors), the polarization structure is integrated into radiation-sensing pixels (e.g., at the anode or cathode level of the radiation-sensing pixels). The number of integrated image sensors 204 formed on the imaging wafer 202 is not limited and can vary from a single image sensor to hundreds, thousands, or even millions of image sensors 204. The integrated image sensors 204 may be manufactured at any technology node (e.g., using any process from the 180 nm process down to the 5 nm process and beyond. In general, smaller technology nodes favor the manufacture of subwavelength structures that can function as the polarization structure, thereby changing the characteristics of the signal and thus polarization or angle data.

The SPI system 200 also includes wafer-level integrated optics 206 stacked on the imaging wafer 202. The wafer-level integrated optics 206 may include one or more optical wafers 206A, 206B to make a very small embedded lens (sometimes referred to as a lensless optical system). Only two optical wafers are shown in the example of FIGS. 2A and 2B for the sake of illustration, and some implementations can include more than two optical wafers. Each optical wafer 206A, 206B respectively includes microlens arrays 208A, 208B distributed over the face of the wafer 206A, 206B and at each pixel level of an individual image sensor 204, which results in numerous image sensors 204 with separate lenses on each image sensor 204 in the array with the wafer optics. A respective microlens array 208 includes an array of microlenses and is placed above each integrated image sensor 204 to focus the EM radiation 201 directly to radiation-sensing pixels of the integrated image sensor 204, thereby reducing optical crosstalk between adjacent integrated image sensors 204. In some implementations, the microlens arrays 208 may include one or more coatings to reduce reflection, thus minimizing flares and ghost images while maximizing contrast and color rendition. In some implementations, the optical array can include an autoaperture capability or other integrated camera components. The wafer-level integrated optics 206 and the microlens arrays 208A, 208B are configured to operate at any wavelength in the EM spectrum. The wafer-level integrated optics 206 and the microlens arrays 208A, 208B can include any focusing element that focuses the EM radiation 104 directly to radiation-sensing pixels of the integrated image sensor 204. For example, the microlens arrays 208A, 208B can include a glass lens, a quartz lens, an element that produces magnetic pulses (which may be used in the high energy part of the EM spectrum), an antenna-based element (which may be used in the low energy part of the spectrum, for example, radio frequencies), or a combination thereof.

The SPI system 200 also includes the processing wafer 210 attached to the backside of the imaging wafer 202. The processing wafer 210 includes an array of edge processors 212, with a respective edge processor 212 being dedicated to processing signals received from a respective integrated image sensor 204. The edge processors 212 can include artificial intelligence (AI) or deep learning processors. In some implementations, the processing wafer 210 may be omitted, and the edge processors 212 may be placed on the imaging wafer 202. For example, an edge processor 212 may be placed on the imaging wafer 202 between adjacent integrated image sensors 204. In such implementations, a respective edge processor 212 is still dedicated to processing signals received from a respective integrated image sensor 204. In some examples, the edge processors 212 act as localized processing for respective integrated image sensors 204 for fast efficient analytics. Such dedicated processing results in real time generation of data (e.g., first and second order primitives). Advanced 3D analytics and AI engines can be deployed at this level of information processing (e.g., by edge processors 212) to produce the first and second order primitives. These approaches are also used with the higher order data derived and are referenced in the various example applications details, which are described below. Advanced 3D analytics and AI engines can also be programmed at the system level.

The edge processor 212 dedicated to a respective integrated image sensor 204 generates a data set that is a dense, high-resolution, accurate, and information-rich representation of a scene or the object 102. The representation of the object 102 may be a localization (e.g., 3D localization) of the object 102. Additionally or alternatively, the representation of the object 102 may be identification, characterization, or quantification of surfaces, shapes, or interrelationships among the shapes of the object 102. The edge processor 212 generates the data set in real-time or near-time (e.g., in a range from one millisecond to about 5 seconds) through a plurality of image frames similar to a 3D shape video. Each individual frame has rich data features including but not limited to 3D shape at pixel or object level.

The SPI system 200 may include a control wafer 214 adhered to a backside of the processing wafer 210. In some implementations, the processing wafer 210 includes an array of control processors 216, each of which is configured to perform integration and processing (e.g., correlation) of the first- and second-order primitives from a group of edge processors 212. The control processors 216 may also be configured to relay key information to their associated edge processors 212. Since each control processor 216 manages and processes data from a group of edge processors 212, the number of control processors 216 formed on the control wafer 214 is less than the number of edge processors 212 formed on the processing wafer 210.

Figure 4A:
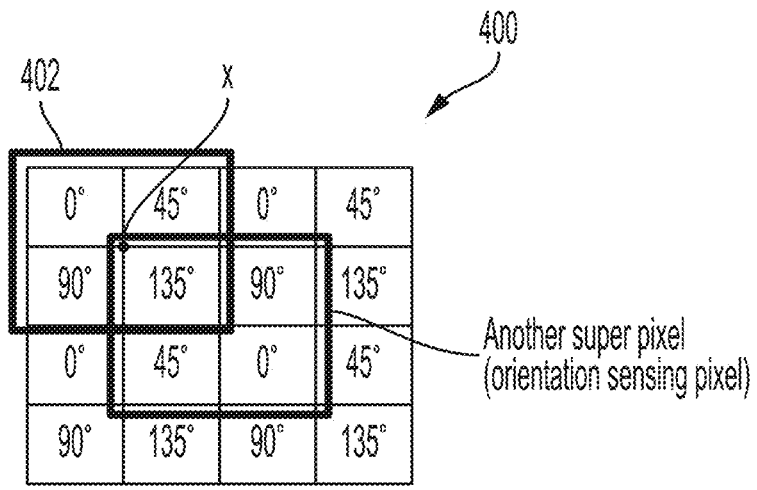
FIG. 4A shows a top-down view of an example electromagnetic detector of a SPI sensor.
Figure 4B:
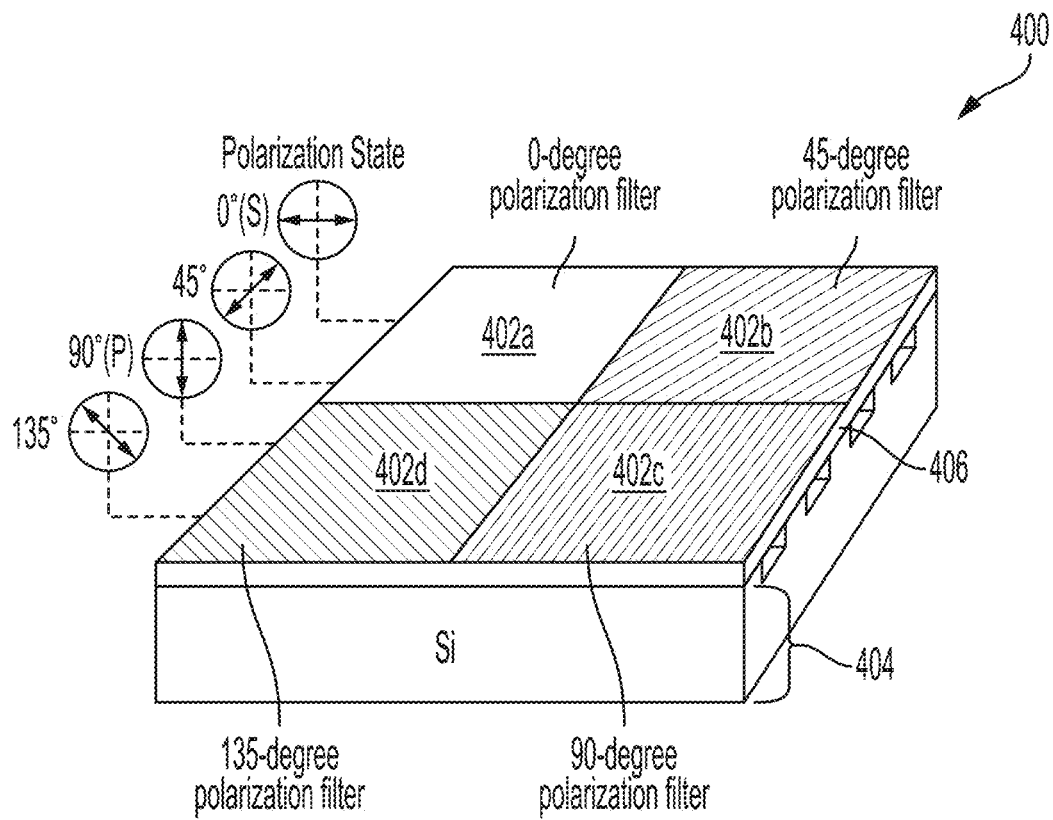
FIG. 4B shows a perspective view of an example super pixel of the electromagnetic detector shown in FIG. 4A.

As discussed above, the SPI-sensor 106-1 and the integrated image sensor 204 include an EM detector (e.g., including an array of radiation-sensing pixels) and a polarization structure. FIG. 4A shows a top-down view of an example EM detector 400 including a "super" pixel 402. The super pixel 402 may be an orientation-sensing pixel (e.g., sensitive to orientations of the EM radiation 104) and may include a plurality of sub-pixels. Four sub-pixels 402a, 402b, 402c and 402d are shown in the example of FIG. 4A, although any number of sub-pixels may be possible in other examples. Furthermore, the pixels/sub-pixels may be arranged in any format. FIG. 4B shows a perspective view of the super pixel 402 illustrated in FIG. 4A. For illustrative purposes, the EM detector 400 is shown as a 4×4 pixel array in FIG. 4A; however, the EM detector 400 may include arrays of other sizes. FIGS. 4A and 4B are examples of using pixel information to generate surface normal vectors; however, clustering does not require symmetrical pixels nor is clustering a technique to only obtain the shape of the object 102. The super pixel 402 is shown to be formed by a 2×2 pattern formed by the adjoining pixels 402*a*, 402*b*, 402*c* and 402*d*, although other super pixel sizes are possible in other examples. In some examples, the super pixel patterns are repeated, as seen in FIG. 4A, to form another super pixel. By examining the difference between two adjacent angles and by moving across or down one pixel, the edge processors 108 or 212 calculate the slope of the curve between the two adjacent angles and store the result as different attributes (e.g., a tangent line to the slope, a cosine of the angle, polar coordinate representation, and additional results). The edge processors 108 or 212 can also provide further calculated results such as the average of the four angles of the super pixel 402, providing a single normal vector for the super pixel 402 (e.g., at point "X" in the super pixel 402).

In the example of FIGS. 4A and 4B, the EM detector 400 may include an array of detector pixels 404 (e.g., implemented in silicon) and a polarizing array 406 disposed over the array of detector pixels 404. The polarizing array 406 can also be integrated into the photodiode and not on top of the sensing surface. Each photodiode can have a polarization sensitive anode and or cathode. When placed on top to work properly, the polarization arrays can be tied to the pixel isolation barriers to create as much metal mass as possible to increase the EM field in the desired polarization direction. The EM radiation 104 is incident on the polarizing array 406, which filters the EM radiation 104 based on its orientation and rejecting all scattered or noise EM energy. The underlying array of detector pixels 404 records an intensity of the EM radiation 104 at each of the orientations. Stated differently, in the example shown in FIGS. 4A and 4B, the array of detector pixels 404 captures the frequency distribution (e.g., broadband) of photons at a particular angle of orientation, filtered by the polarizing array 406. Although angles can be of any value between 0-degrees and 360-degrees or multiples thereof, FIGS. 4A and 4B show four specific angles of orientation, namely 0-degrees, 45-degrees, 90-degrees, and 135-degrees merely for the sake of illustration.

In some implementations, the detector pixels 404 may include complementary metal-oxide-semiconductor elements (e.g., CMOS photodiodes). However, the array of detector pixels 404 may be include pixel elements implemented using other technologies, examples being charge coupled devices (CCDs), longwave infrared (LWIR) detectors, X-ray detectors, to name a few. Therefore, depending on the type of pixel elements used for the array of detector pixels 404, the SPI systems 100, 200 may be sensitive to colored EM radiation 104 (e.g., RGB color), monochrome EM radiation 104, or EM radiation 104 having other wavelength ranges such as ultraviolet, visible, near infrared (NIR), medium wavelength infrared (MWIR), long wavelength infrared (LWIR), radio, gamma, X-ray, radiation in the terahertz range, etc. Stated differently, by selecting appropriate detector pixels 404 for the EM detector 400, the SPI systems 100, 200 may be sensitive to EM radiation 104 encompassing any and all wave energy in the spectrum of EM energy. Therefore, the SPI systems 100, 200 may be configured to single or multiple wavelengths or wavebands (e.g., including various separations of specular and diffuse bands) to determine the various features of the object 102. This provides the advantage of upward compatibility with any currently available imaging modality.

In some implementations, the polarizing array 406 may include nanowires having different orientations. For example, the polarizing array 406 may include a 0-degrees polarization filter, as shown in FIGS. 4A and 4B, and the 0-degree polarization filter may be implemented using a metallic grid of nanowires having a 0-degree orientation. Similarly, the polarizing array 406 may include a 90-degrees polarization filter, as shown in FIGS. 4A and 4B, and the 90-degree polarization filter may be implemented using a metallic grid of nanowires having a 90-degree orientation. A similar concept is applicable to the 45-degrees polarization filter and the 135-degrees polarization filter shown in FIGS. 4A and 4B.

In some implementations, the nanowires may be formed from aluminum, copper, tungsten, tin, chromium, indium, gold, a combination thereof, or the like. In some examples, the EM detector 400 can be tuned to detect different wavelengths of the EM radiation 104 by changing the width and pitch of the nanowires, as long as the width and the pitch of the nanowires are less than the wavelength sought to be detected. In general, when this condition is met (i.e., the width and the pitch of the nanowires are less than the wavelength being detected), larger wavelengths can be detected by the EM detector 400 by increasing the width and pitch of the nanowires, and smaller wavelengths can be detected by the EM detector 400 by decreasing the width and pitch of the nanowires. For example, the EM detector 400 can be tuned to detect EM radiation 104 in the visible spectrum by forming nanowires having widths and pitches in a range from about 50 nanometers to about 100 nanometers (e.g., about 70 nanometers wire with 70 nanometer spaces or many other combinations). As another example, the EM detector 400 can be tuned to detect LWIR radiation by forming nanowires having widths and pitches in a range from about 200 nanometers to about 600 nanometers (e.g., in a range from about 400 nanometers to about 500 nanometers).

While the example described above contemplates examples where the polarizing array 406 includes nanowires having different orientations, any type of polarizing array 406 may be used. The preference is to place these grids on the anode and cathode of the respective photodiode elements. Forming the polarization sensitive photodiode yields the advantage of increasing the effective angular signal from the surface and the accuracy of the 3D measurements due to the elimination of noise in the SPI sensor. An advantage of using the polarizing array 406 as a filter for various orientations of the EM radiation 104 is that it allows the SPI systems 100, 200 to generate spatial phase data having a high dynamic range (e.g., since noise in the EM radiation 104 is substantially reduced). Such noise (e.g., scattering) in the EM radiation 104 may, as an example, be generated when the EM radiation is emitted by, reflected off, or transmitted through various features (e.g., diffuse features) of the object 102. As another example, such noise in the EM radiation 104 may be generated by disperse media (e.g., mist, fog, smoke, or other obscurants) located in the environment between the SPI systems 100, 200 and the object 102.

In some examples, the EM detector 400 includes readout circuitry that captures the intensities of the EM radiation 104 recorded by each of the pixels 402*a*, 402*b*, 402*c* and 402*d*.

The readout circuitry provides such intensities of the EM radiation 104 at each of the orientations (e.g., 0-degrees, 45-degrees, 90-degrees, 135-degrees) to its dedicated edge processor 108 or 212 for further processing to generate first- and second-order primitives. As an example, the edge processors 108 or 212 extract angular information and other base "primitive" attributes from known physics. A combination of Stokes equations, with intensity vectors and calibration performed by Mueller matrix approaches coupled with Degree of Linear Polarization and theta measurements allows the edge processors 108 or 212 to derive properties such as normals to surface, elliptical form of surface, index of refraction, material structures, etc. Surfaces and shapes can also be segmented from broad scenes.

For example, supposing that in the examples shown in FIGS. 4A and 4B, i0 is the intensity detected (e.g., in number of counts) at the pixel 402a having the 0-degree polarizer, i45 is the intensity detected at the pixel 402b having the 45-degree polarizer, i90 is the intensity detected at the pixel 402c having the 90-degree polarizer, i135 is the intensity detected at the pixel 402d having the 135-degree polarizer, and iRHC and iLHC are the intensities of right-handed circular polarization and left-handed circular polarization, respectively, then the edge processors 108, 212 may define an intensity array I as follows:

$$I = \begin{pmatrix} i0 \\ i45 \\ i90 \\ i135 \\ iRHC \\ iLHC \end{pmatrix}$$

In the example shown above, it is assumed that the EM detector 400 also includes pixels that are sensitive to the intensities of right-handed circular polarization and left-handed circular polarization.

ential to a 45-degree polarization, and s3 is the amount of EM radiation 104 preferential to a right-handed circular polarization.

The edge processors 108, 212 may define a diattenuation vector D as follows:

$$D = \begin{pmatrix} d0 \\ d45 \\ d90 \\ d135 \\ dRHC \\ dLHC \end{pmatrix}$$

where d0 is the diattenuation of pixel 402a having the 0-degree polarizer, d45 is the diattenuation of pixel 402b having the 45-degree polarizer, d90 is the diattenuation of pixel 402c having the 90-degree polarizer, d135 is the diattenuation of pixel 402d having the 135-degree polarizer, and dRHC and dLHC are the diattenuations of right-handed circular polarization and left-handed circular polarization, respectively.

In general, the diattenuation d for each of the pixels 402a, 402b, 402c, 402d may be determined by the edge processors 108, 212 as follows:

$$d = \frac{p-c}{p+c}.$$

where p is the intensity of a parallel polarized state and c is an intensity of a cross-polarized state. The diattenuation d of each of the pixels 402a, 402b, 402c, 402d may be a measure of an effectiveness of the polarizer, with a perfect polarizer having a diattenuation of 1.

The edge processors 108, 212 may relate the Stokes vectors with the intensity vectors as follows:

$$2 * \begin{pmatrix} i0 \\ i45 \\ i90 \\ i135 \\ iRHC \\ iLHC \end{pmatrix} = \begin{pmatrix} 1 & d0*\cos(2*(0+90)) & d0*(\sin(2*0)) & 0 \\ 1 & d45*\cos(2*(45+90)) & d45*\sin(2*45) & 0 \\ 1 & d90*\cos(2*(90+90)) & d90*\sin(2*90) & 0 \\ 1 & d135*\cos(2*(135+90)) & d135*\sin(2*135) & 0 \\ 1 & 0 & 0 & dRHC*\sin(2*(135-135)) \\ 1 & 0 & 0 & dLHC*\sin(2*(45-225)) \end{pmatrix} * \begin{pmatrix} s0 \\ s1 \\ s2 \\ s3 \end{pmatrix}$$

The edge processors 108, 212 may subsequently determine a Stokes vector, which may be expressed as follows:

$$S = \begin{pmatrix} s0 \\ s1 \\ s2 \\ s3 \end{pmatrix}$$

where s0 in the amount of unpolarized EM radiation 104 (e.g., preferential to a 0-degree polarization), s1 is the amount of EM radiation 104 preferential to a 90-degree polarization, s2 is the amount of EM radiation 104 prefer- For the ideal case where all diattenuations d are equal to 1, the edge processors 108, 212 may relate the Stokes vectors with the intensity vectors as follows:

$$2 * \begin{pmatrix} i0 \\ i45 \\ i90 \\ i135 \\ iRHC \\ iLHC \end{pmatrix} = \begin{pmatrix} 1 & -1 & 0 & 0 \\ 1 & 0 & 1 & 0 \\ 1 & 1 & 0 & 0 \\ 1 & 0 & -1 & 0 \\ 1 & 0 & 0 & 1 \\ 1 & 0 & 0 & -1 \end{pmatrix} * \begin{pmatrix} s0 \\ s1 \\ s2 \\ s3 \end{pmatrix}$$

-continued $$2 * \begin{pmatrix} i0 \\ i45 \\ i90 \\ iRHC \\ iLHC \end{pmatrix} = \begin{pmatrix} 0.4 & -0.5 & -0.1 & 0 \\ 0.4 & 0 & 0.4 & 0 \\ 0.4 & 0.5 & -0.1 & 0 \\ 0.6 & 0 & 0.1 & 0.5 \\ 0.6 & 0 & 0.1 & -0.5 \end{pmatrix} * \begin{pmatrix} s0 \\ s1 \\ s2 \\ s3 \end{pmatrix}$$

$$2 * \begin{pmatrix} s0 \\ s1 \\ s2 \\ s3 \end{pmatrix} =$$

$$\begin{pmatrix} \frac{1}{3} & \frac{1}{3} & \frac{1}{3} & \frac{1}{3} & \frac{1}{3} & \frac{1}{3} \\ -1 & 0 & 1 & 0 & 0 & 0 \\ 0 & 1 & 0 & -1 & 0 & 0 \\ 0 & 0 & 0 & 0 & 1 & -1 \end{pmatrix} * \begin{pmatrix} i0 \\ i45 \\ i90 \\ i135 \\ iRHC \\ iLHC \end{pmatrix} = \begin{pmatrix} 0.5 & 0 & 0.5 & 0.5 & 0.5 \\ 1 & 0 & 1 & 0 & 0 \\ -1 & 0 & 1 & 0 & 0 \\ -1 & 2 & -1 & 1 & -1 \end{pmatrix} * \begin{pmatrix} i0 \\ i45 \\ i90 \\ iRHC \\ iLHC \end{pmatrix}$$

$$2 * \begin{pmatrix} s0 \\ s1 \\ s2 \end{pmatrix} = \begin{pmatrix} 1 & 0 & 1 & 0 \\ -1 & 0 & 1 & 0 \\ 0 & 1 & 0 & -1 \end{pmatrix} * \begin{pmatrix} i0 \\ i45 \\ i90 \\ i135 \end{pmatrix} = \begin{pmatrix} 1 & 0 & 1 \\ -1 & 0 & 1 \\ -1 & 2 & -1 \end{pmatrix} * \begin{pmatrix} i0 \\ i45 \\ i90 \end{pmatrix}$$

For a non-ideal case where at least one diattenuation d is less than 1, the edge processors 108, 212 may relate the Stokes vectors with the intensity vectors as follows:

$$2 * \begin{pmatrix} i0 \\ i45 \\ i90 \\ i135 \\ iRHC \\ iLHC \end{pmatrix} = \begin{pmatrix} 1 & -d0 & 0 & 0 \\ 1 & 0 & d45 & 0 \\ 1 & d90 & 0 & 0 \\ 1 & 0 & -d135 & 0 \\ 1 & 0 & 0 & dRHC \\ 1 & 0 & 0 & -dLHC \end{pmatrix} * \begin{pmatrix} s0 \\ s1 \\ s2 \\ s3 \end{pmatrix} =$$

$$\begin{pmatrix} d0 & \frac{1-d0}{2} & 0 & \frac{1-d0}{2} & 0 & 0 \\ \frac{1-d45}{2} & d45 & \frac{1-d45}{2} & 0 & 0 & 0 \\ 0 & \frac{1-d90}{2} & d90 & \frac{1-d90}{2} & 0 & 0 \\ \frac{1-d135}{2} & 0 & \frac{1-d135}{2} & d135 & 0 & 0 \\ 0 & 0 & 0 & 0 & \frac{1+dRHC}{2} & \frac{1-dRHC}{2} \\ 0 & 0 & 0 & 0 & \frac{1-dLHC}{2} & \frac{1+dLHC}{2} \end{pmatrix} *$$

$$\begin{pmatrix} 1 & -1 & 0 & 0 \\ 1 & 0 & 1 & 0 \\ 1 & 1 & 0 & 0 \\ 1 & 0 & -1 & 0 \\ 1 & 0 & 0 & 1 \\ 1 & 0 & 0 & -1 \end{pmatrix} * \begin{pmatrix} s0 \\ s1 \\ s2 \\ s3 \end{pmatrix}$$

Figure 5:
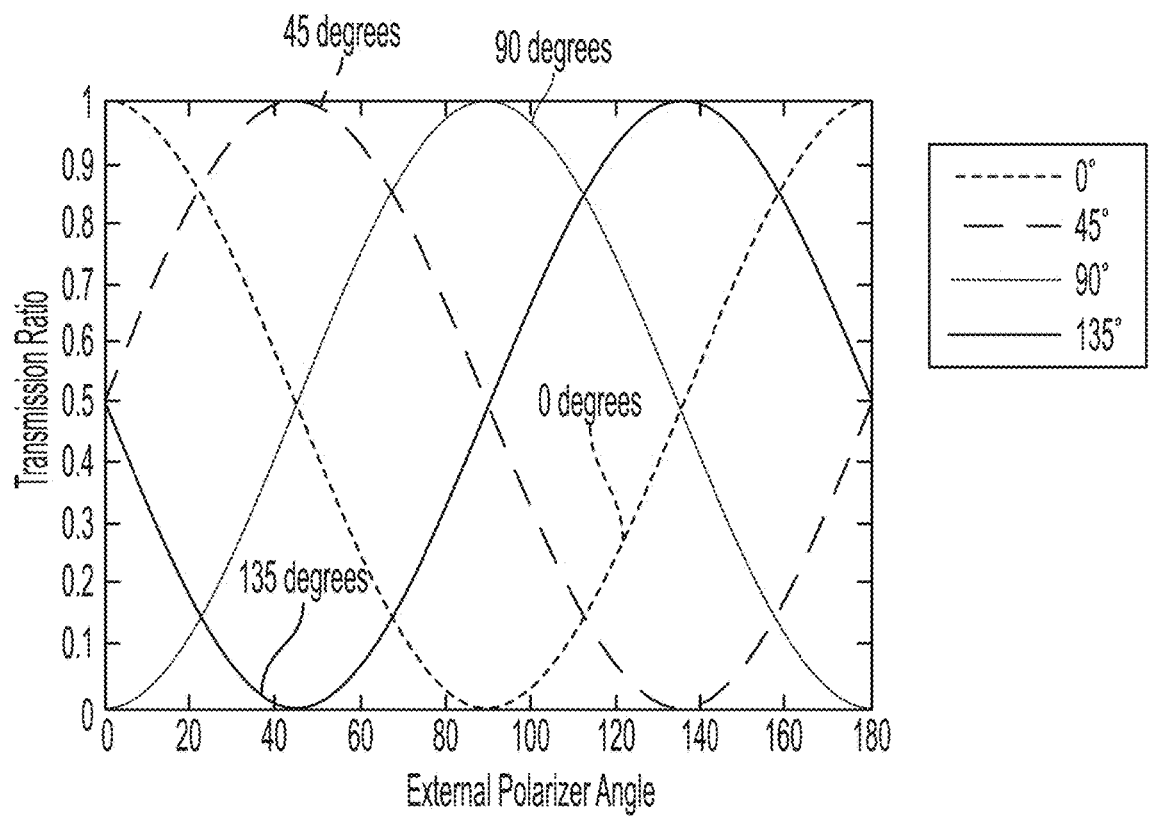
FIG. 5 shows an example plot of an ideal transmission ratio when electromagnetic radiation passes through two polarizers at different orientations.

The edge processors 108, 212 may also be configured to determine a Mueller matrix calibration. For example, when EM radiation 104 passes through two polarizers at orientations $\theta_1$ and $\theta_2$, a theoretical transmission ratio is $\cos^2(\theta_1-\theta_2)$. For the example, for the polarizing array 406 shown in FIGS. 4A and 4B (e.g., having the 0-degree, 45-degree, 90-degree, and 135-degree polarization filters), an ideal transmission ratio is as depicted in FIG. 5. In the example of FIG. 5, the maximum point on the curve is the parallel polarized state while the minimum point is the cross-polarized state. Many other properties can also be derived from this, such as the ratio of unpolarized to polarized, the elliptical form of the surfaces of the object 102, the index of refraction of materials of the object 102, whether the materials of the object 102 is organic or materials, and an indication of the structure of the materials of the object 102, to name a few.

In practice, the intensities i (e.g., included in the intensity array I) have the following form $i=a+b*\cos^2(\theta_1-\theta_2+c)$. The above-mentioned Mueller matrix corrects for rotational errors (e.g. errors in the value c) and diattenuation errors (e.g., errors in the value a) that are induced by a non-ideal polarizing array 406. The corrected intensity array I' may be expressed as follows:

$$I' =$$

$$\begin{pmatrix} i0' \\ i45' \\ i90' \\ i135' \end{pmatrix} = \begin{pmatrix} 1 & -1 & 0 \\ 1 & 0 & 1 \\ 1 & 1 & 0 \\ 1 & 0 & -1 \end{pmatrix} * \begin{pmatrix} 1 & -d0 & 0 \\ 1 & 0 & d45 \\ 1 & d90 & 0 \\ 1 & 0 & -d135 \end{pmatrix}^{-1} * \begin{pmatrix} i0 \\ i45 \\ i90 \\ i135 \end{pmatrix} = \begin{pmatrix} 1 & -1 & 0 \\ 1 & 0 & 1 \\ 1 & 1 & 0 \\ 1 & 0 & -1 \end{pmatrix} *$$

$$\begin{pmatrix} 0.25 & 0.25 & 0.25 & 0.25 \\ -0.5 & 0 & 0.5 & 0 \\ 0 & 0.5 & 0 & -0.5 \end{pmatrix} * \begin{pmatrix} d0 & \frac{1-d0}{2} & 0 & \frac{1-d0}{2} \\ \frac{1-d45}{2} & d45 & \frac{1-d45}{2} & 0 \\ 0 & \frac{1-d90}{2} & d90 & \frac{1-d90}{2} \\ \frac{1-d135}{2} & 0 & \frac{1-d135}{2} & d135 \end{pmatrix}^{-1} *$$

$$\begin{pmatrix} i0 \\ i45 \\ i90 \\ i135 \end{pmatrix} = \begin{pmatrix} 0.75 & 0.25 & -0.25 & 0.25 \\ 0.25 & 0.75 & 0.25 & -0.25 \\ -0.25 & 0.25 & 0.75 & 0.25 \\ 0.25 & -0.25 & 0.25 & 0.75 \end{pmatrix} *$$

$$\begin{pmatrix} d0 & \frac{1-d0}{2} & 0 & \frac{1-d0}{2} \\ \frac{1-d45}{2} & d45 & \frac{1-d45}{2} & 0 \\ 0 & \frac{1-d90}{2} & d90 & \frac{1-d90}{2} \\ \frac{1-d135}{2} & 0 & \frac{1-d135}{2} & d135 \end{pmatrix}^{-1} * \begin{pmatrix} i0 \\ i45 \\ i90 \\ i135 \end{pmatrix}$$

For the case of rotating polarizers or each pixel having different polarization rotations, a corrected diattenuation vector D' may be determined by the edge processors 108, 212 as follows:

$$D' = \begin{pmatrix} i0' \\ i45' \\ i90' \\ i135' \end{pmatrix}, \text{ where } d' = \frac{(p_{max} - p_{min}) - (c_{max} - c_{min})}{(p_{max} - p_{min}) + (c_{max} - c_{min})}$$

where p is the intensity of a parallel polarized state, c is an intensity of a cross-polarized state, the subscript max indicating the brighter backlit intensity, and the subscript min indicating the dimmer backlit intensity.

As discussed above, the percentage of linear polarization in the EM radiation 104 when reflected from a surface of the object 102 (e.g., indicated in FIG. 3A as a degree of linear polarization, DoLP) may be directly correlated to the direction cosine of the original EM energy incident on the object 102. Furthermore, the primary angle of the reflected linearly polarized light, which is indicated as Theta in FIG. 3A, may be mathematically related to the in-plane angle of the reflecting surface. The edge processors 108, 212 may determine the degree of linear polarization DoLP and the angle of linear polarization Theta as follows:

$$\theta = 0.5 * a\tan2(s2, -s1)$$

$$DoLP = \frac{\sqrt{s1^2 + s2^2}}{s0}$$

The angle Theta may be in a range from −π/2 to π/2, with 0 radians indicating a linear polarization pointing up in image space (e.g. as seen in FIG. 3B). Consequently, the angle Theta encodes the in-plane angle of a normal to a surface of the object 102 or portion thereof captured by the pixel. The degree of linear polarization DoLP may be in a range from 0 to 1. The value 0 for the degree of linear polarization DoLP may indicate a completely unpolarized scene, while the value 1 for the degree of linear polarization DoLP may indicate a completely polarized scene. Consequently, the degree of linear polarization DoLP encodes the out-of-plane angle of a normal to a surface of the object 102 or portion thereof captured by the pixel.

In addition to the degree of linear polarization DoLP and angle Theta, several other measures of polarization may be determined by the edge processors 108, 212. For example, the edge processors 108, 212 may determine a degree of circular polarization (DoCP) and a total degree of polarization (DoP) as follows:

$$DoCP = \frac{s3}{s0}$$

$$DoP = \frac{\sqrt{s1^2 + s2^2 + s3^3}}{s0}$$

In general, the degree of circular polarization DoCP may be in a range from −1 (indicating a 100% left circular polarization) to +1 (indicating a 100% right circular polarization), with 0 indicating no circular polarization. The total degree of polarization DoP indicates the degree of both circular and linear polarization and may be in a range from 1 (representing a completely polarized scene) to 0 (representing a completely unpolarized scene).

Based on the above-described measures, the edge processors 108, 212 may determine the surface normal vector for each for each pixel as follows:

$$\begin{pmatrix} nx \\ ny \\ nz \end{pmatrix} = \begin{pmatrix} -\sin(\gamma)*\sin(\theta) \\ \sin(\gamma)*\cos(\theta) \\ \cos(\gamma) \end{pmatrix}$$

where nx, ny, nz are the x, y, and z coordinates of the surface normal vector, where γ is the out-of-plane angle, and θ is the in-plane angle.

As seen from the discussion above, the edge processors 108, 212 generate first- and second-order primitives based on the spatial phase data from their respective image sensors 106, 204. In the example above, first-order primitives include the above-described intensities i0, i45, i90, and i135, and the intensities of red, blue, and green light (e.g., in implementations where a color-sensitive EM detector 700 is used). In the example above, second-order primitives include the above-described Stokes parameters s0, s1, s2, and s3; the diattenuation values d0, d45, d90, and d135; the angle of linear polarization Theta; the degree of linear polarization DoLP; the out-of-plane angle γ of the surface normal vector; the x, y, and z coordinates of the surface normal vector (e.g., nx, ny, nz described above); the ideal surface normals calculated for an ideal surface; the corrected surface normals; and the variables in the Mueller matrix.

With each pixel now being able to represent various attributes of the object 102 (e.g., as expressed through the first- and second-order primitives), the edge processors 108, 212 can cluster pixels having similar attributes into panels and can segment these panels from other dissimilar pixels or panels. The clustered and segmented parameters form a family of representations called pXSurface and pXShape, where "X" defines the attribute type. In the example discussed above, the attribute set associated with the normals to the surfaces of the object 102 and the corresponding frequency broadband distribution captured for each pixel is denoted as a pNSurface and pNShape description of the object 102, where "N" denotes the surface normal vectors or orientations.

The above-described surface normal vectors or orientations in the x-, y-, and z-directions are merely one example of the attributes of the object 102 that may be determined by the edge processors 108, 212. Other examples of first- and second-order primitives that can be determined by the edge processors 108, 212 include: the shapes and surface anomalies of the object; surface roughness of the object; material analysis of the object; lighting analysis of the object; edges, occlusions, blobs, masks, gradients, and interior volume features of the object; surface/pixel geometry of the object; a frequency distribution of the EM radiation 104 received from the object; color and intensity information of object; EM spectrum information of the object (from any band of the EM spectrum); the degree of linear polarization, angle of polarization, angle of linear polarization, angle of incidence, angle of reflection, angle of refraction, depolarization factor, principal curvatures, mean curvature, Gaussian curvature, synthetic skin or lighting, unpolarized scatter, ellipticity, albedo, the index of refraction, cluster of angles, surface angles, slope vectors, angular relationships, rate of slope, surface scattering, specular/diffuse scattering, propagation scattering of the object; pixel-to-pixel clusters; 3D object or scene detection; distance tracking; scene reconstruction; object mapping; surface characterization; and others. Therefore, the object 102 may be represented by a broad number of parameters and by the family of pXSurface and pXShape representations. The object can also be represented by any other shape-based data, examples being depth values, point cloud sets, mesh sets, etc. The other shape-based data can be integrated into the approaches described in this disclosure. This data can be captured by other sensor systems such as lidar, structured light, etc.

In a specific example drawn from the example first- and second-order primitives presented above, principal curvatures (which measure the maximum and minimum of the normal curvature at a given point on a surface) can be calculated by the edge processors 108, 212 as:

$$K = 1/R,$$

where R is the radius of curvature at the given point if the curvature at the given point is fitted to a circle. The maximum principal curvature ($K_1$) and the minimum principal curvature ($K_2$) are the maximum and minimum values, respectively, of this function at the given point. In the SPI systems 100, 200, the principal curvatures may describe whether changes in surfaces are presented compared to an expected surface.

In another specific example drawn from the example first- and second-order primitives presented above, Gaussian curvature can be calculated by the edge processors 108, 212 from the product of the maximum principal curvature ($K_1$) and the minimum principal curvature ($K_2$) as follows:

$$K=K_1/K_2.$$

In the SPI systems 100, 200, the Gaussian curvature may be used to describe a shape around each pixel, thus informing expected shape, deviation from shape, and estimation of surface roughness.

In another specific example drawn from the example first- and second-order primitives presented above, mean curvature, H, can be calculated by the edge processors 108, 212 as the average of the maximum principal curvature ($K_1$) and the minimum principal curvature ($K_2$) as follows:

$$H=0.5(K_1+K_2).$$

In the SPI systems 100, 200, the mean curvature can be used to describe the degree of change in curvature around a cluster of pixels.

In another specific example drawn from the example first- and second-order primitives presented above, surface roughness can be useful both as an input for sensor data parameter handling and as an output for surface analysis. In the SPI systems 100, 200, surface roughness estimation can utilize polarization information in a bi-directional reflectance distribution function. For example, the edge processors 108, 212 can estimate surface roughness using Mueller matrix calculus to relate Stokes parameters calculated from polarization values to S (which is the Stokes parameter describing total intensity) as follows:

$$\lim_{I_i \to 0}\left(\frac{\Phi_r}{I_i}\right) = f_r \Phi_i \theta_r,$$

where $\phi_r$ is the average scattered Stokes vector power; where $I_i$ is the power of the EM radiation incident on a surface (which could be estimated through a combination of analysis of shadows and lighted areas, off-the-shelf lighting estimation, user input, and sensor auto-exposure settings; where $f_r$ is the Mueller matrix BRDF function; where $\phi_i$ is the Stokes vector describing total power calculated from sensor input; and where $\theta_r$ is the angle of polarization. Another method to estimate surface roughness can be measuring the variability in surface normals derived from a shape from polarization approaches.

Figure 6:
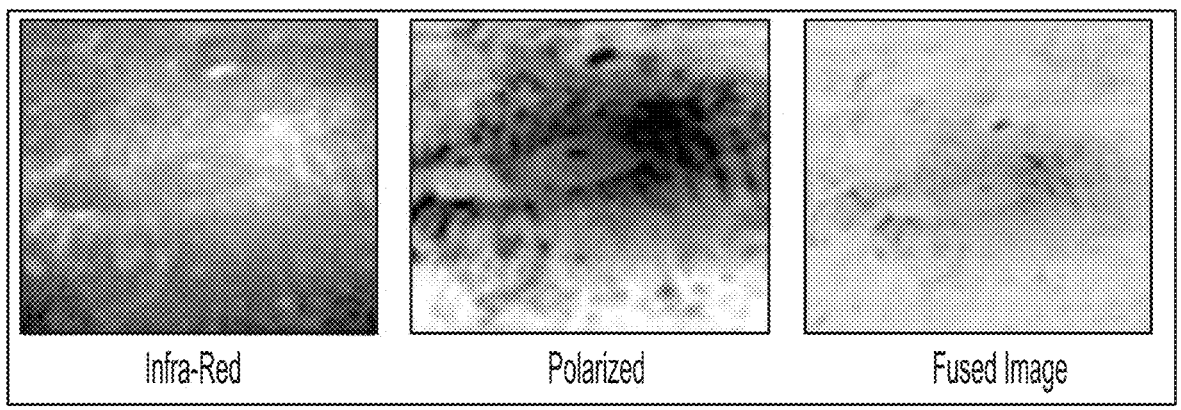
FIG. 6 shows an example of images obtained from EM radiation passing through a gradient layer.

In another specific example drawn from the example first- and second-order primitives presented above, plane fit smoothing can be calculated by the edge processors 108, 212 and used to smooth a rough mesh by considering only those points within a small neighborhood around each pixel. An example method of performing plane fit smoothing is the following series of steps:

108, 212. The representations pXSurface and pXShape are distinct from traditional point cloud or mesh representations of shape. For example, the normal to the surface and the frequency of the spectrum are captured for each pixel in the SPI systems 100, 200, thus creating a frequency distribution as well as the normal distribution. The raw sensor output is also converted in real-time or near-time to create the pNSurface and the pNShape representations. The pixel normal surface (pNSurface) is the topological representation of pure reflection from a surface of the object 102, or the passage of EM radiation through a gradient layer which can then also be represented as the pNSurface. For example, FIG. 6 shows an example of images obtained from EM radiation passing through a gradient layer. Specifically, the images shown in FIG. 6 depict the infrared, polarized, and fused images of a land mine (the object of interest) buried in 4 to 6 inches of soil. Consequently, the SPI systems 100, 200 can capture the actual surfaces of the object 102 (regardless of whether or not it is surrounded by a gradient layer) as a distinct entity in real-time or near-time. In contrast, current sensors can only capture pure reflection from a surface of the object 102 and create the "surface" of the object 102 as a set of points (e.g., in a point cloud representation) or a mesh (triangular interconnected wedges) representing the surface which must be created as post-processing of the raw data capture. In addition to providing pixel normal surface (pNSurface) and frequency information, the example SPI systems 100, 200 also provide the advantage of upward and downward compatibility with any currently available imaging modality. The 3D distribution of the normal provides added insight into the relationships among the surfaces. Specifically, the relationship among these pixels are invariant to orientation in the physical world allowing for tracking of shapes of the object 102 (as discussed in further detail below).

The edge processors 108, 212 can also perform first derivative analysis (e.g., analysis of first-order primitives) and second derivative analysis (e.g., analysis of second-order primitives) on a shape or surface in a single frame, and also perform analysis in a time sequence allowing for vector information (e.g., acceleration, speed, and orientation) to be provided for analysis at the shape level. Consequently, the edge processors 108, 212 can perform calculations at the pixel level all the way up to pXSurface and pXShape levels, both in a single frame and over a time sequence of multiple frames.

A significant number of applications (e.g. autonomous driving, scene segmentation, etc.) can be constructed based on just this set of data (e.g., pXSurface and pXShape) without any further analysis, since these applications don't require any further knowledge about the surface other than its existence, extent and location in a defined coordinate space.

---

Start
1. Set the kernel size (k) for the local neighborhood (e.g. k = 65 would yield a 65 × 65 pixel kernel).
2. Set a maximum Z difference (DeltaZMax) (e.g, DeltaZMax = 1 mm)
3. For each pixel (p_target) in the mesh:
   3a. Line of sight (LOS) = line pointing from (0, 0, 0) to the (x, y, z) position for that pixel.
   3b. Consider all other pixels (p_i) within a kernel of size k centered on p_target, such that:
     The p_i is not masked out, and
     The absolute value of the difference in the z-components of p_i and p_target is no greater than DeltaZMax.
   3c. Fit a plane (P) to the set of all valid p_i.
   3d. The new position of p_target is the point of intersection between LOS and P.
End

---

The above examples represent some of the numerous parameters that can be calculated by the edge processors FIGS. 7A to 7G illustrate how pXSurface and pXShape data can be used to achieve autonomy in various contexts.

Figure 7A:
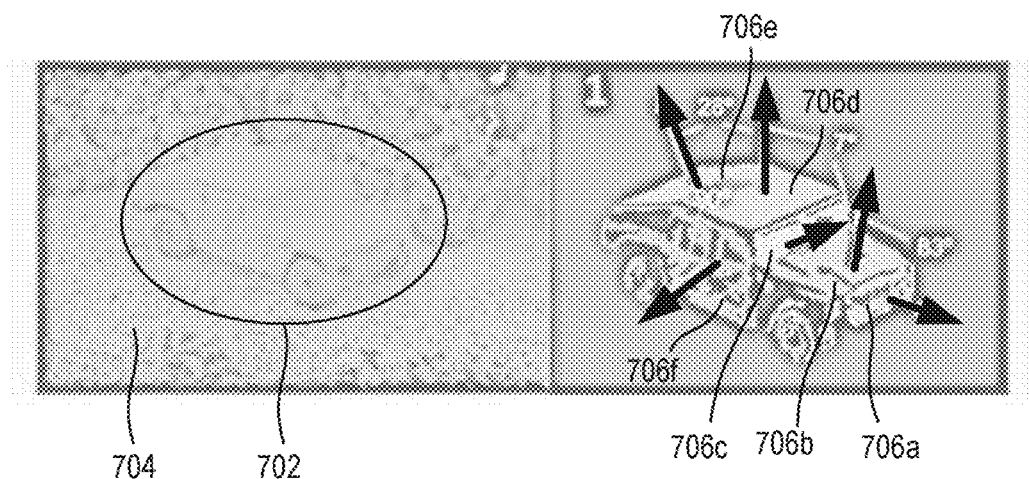
FIGS. 7A to 7C illustrate how the concept of surface and shape orientation invariance can be used in autonomous tracking.
Figure 7B:
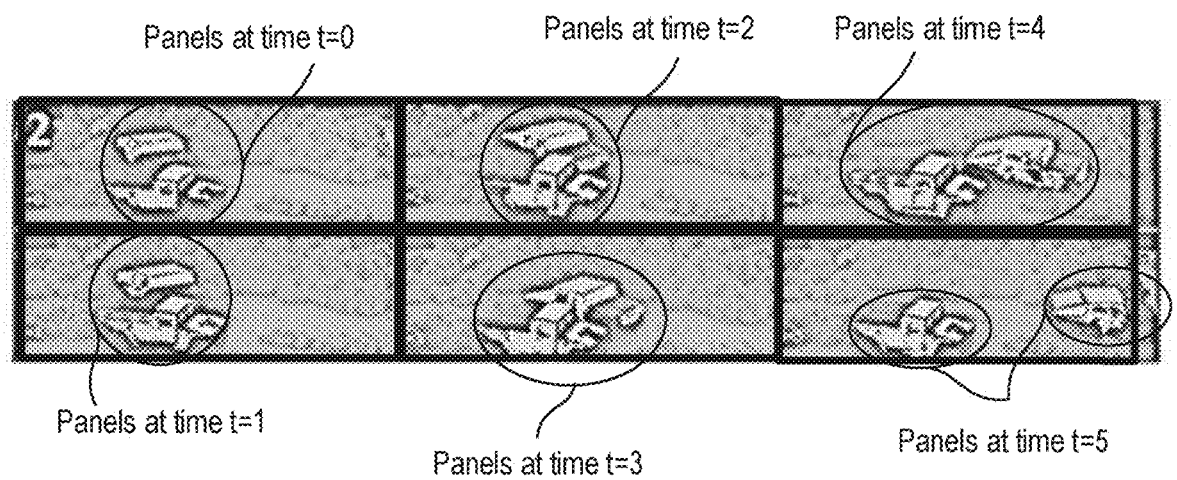
Figure 7C:
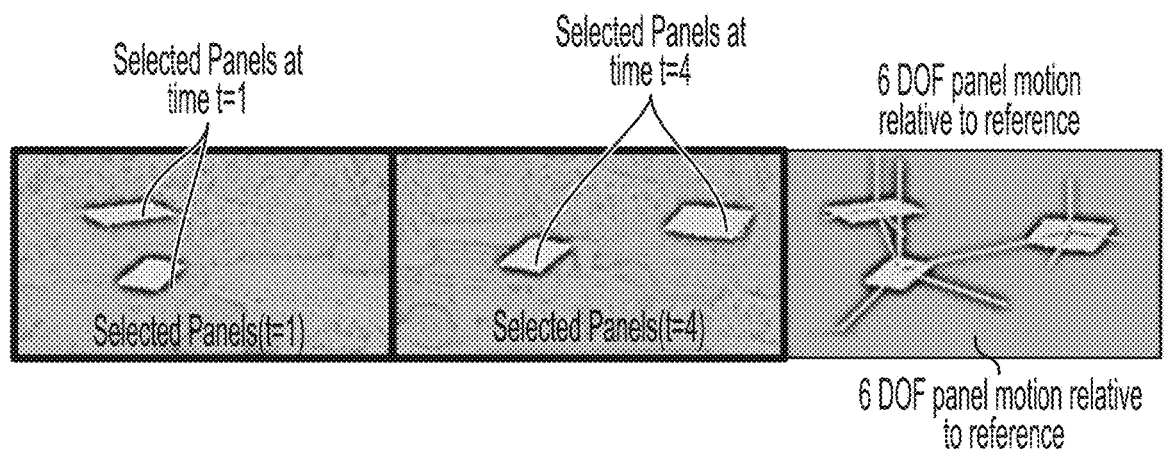

Specifically, FIGS. 7A to 7C illustrate how the concept of surface and shape orientation invariance can be used in autonomous tracking. FIGS. 7D to 7G illustrate how the concept of surface and shape range invariance can be used in autonomous tracking.

Referring first to FIGS. 7A to 7C, FIG. 7A shows an example of calculating shape identities of an object (e.g., a Humvee) in a single frame. FIGS. 7B and 7C show examples of autonomously tracking shape identities of an object (e.g., a Humvee) over a time sequence of multiple frames. FIGS. 7A to 7C illustrate the concept of surface-shape orientation invariance, with a focus on angular relationships. The examples shown in FIGS. 7A to 7C use the example of visible and ambient infrared (IR) emissions, although, as discussed above, SPI imaging works over all wavelengths of the EM spectrum. Furthermore, FIGS. 7A to 7C focus on identification of an object in a scene and the invariant relationship of flat panels to translation, rotation & distance. As discussed above, each pixel represents some attribute of the object 702 (e.g., the Humvee), and the edge processors 108, 212 can cluster pixels having similar attributes into panels 706 and can segment these panels 706 from other dissimilar pixels or panels. For example, the target object 702 (e.g., the Humvee) is extracted or segmented from the cluttered background 704 and clustered into panels 706a, 706b, 706c, 706d, 706e, 706f, each having an associated normal vector.

As seen in FIG. 7A, the angle relationship among the various panels 706 of the object (e.g. between the top panel 706d, the side panel 706f, and the windshield 706c) does not change. Stated differently, the geometric relationship among the various panels 706 of the object is invariant to orientation, translation and distance, regardless of the coordinate system used. This invariant geometric relationship can now be stored and processed as a surface panel with a normal for the entirety of the panel, slope vector set, and extent of pixels without the need to repeatedly process each and every pixel. This approach dramatically reduces the compute time and the size of the data that needs to be stored compared to conventional approaches.

FIGS. 7B and 7C show examples of calculating shape identities of an object (e.g., two Humvees) over a time sequence. As the target (e.g., the two Humvees) and camera move relative to each other, subsequent frames add more data and allow newly visible panels to be built and appended to the old. This capability allows for increased accuracy in target recognition from a priori panel catalogs as well as decreased occurrence of false positives. The ability to uniquely identify enrolled flat panels, independent of orientation angle, provides enhanced ability to determine speed, direction, and range. The relative motion of panels of known size between time-correlated data frames can provide target information (speed, heading, range, etc.). As illustrated in FIG. 7C, the movement of the object (e.g., the two Humvees) can be determined autonomously by processing only one of the panel relationships, thus resulting in significant reduction in compute time and enabling real time capability. For example, in FIG. 7C, the top panel of the Humvees is selected to determine the speed, direction, and range of the respective Humvees.

Figure 7D:
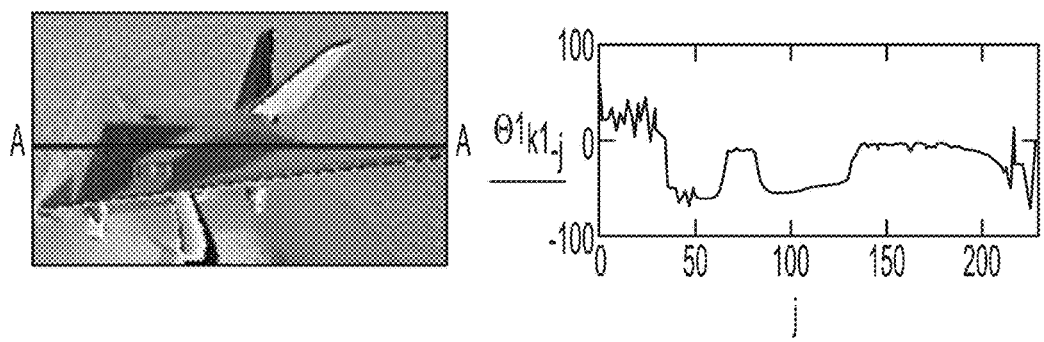
FIGS. 7D to 7G illustrate how the concept of surface and shape range invariance can be used in autonomous tracking.
Figure 7E:
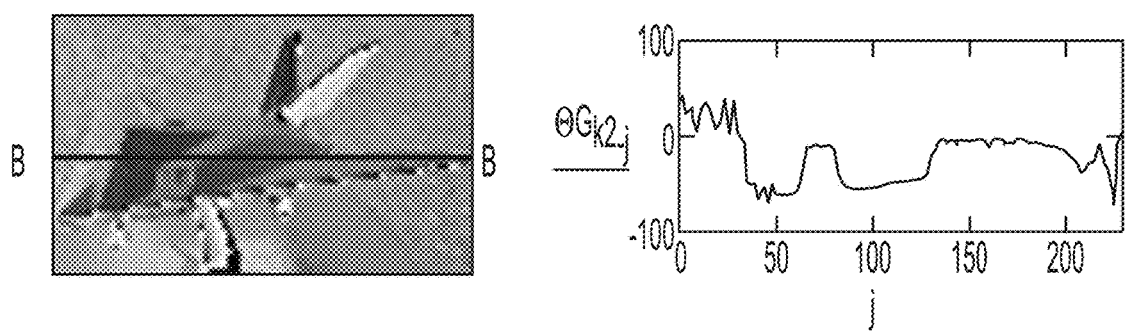
Figure 7F:
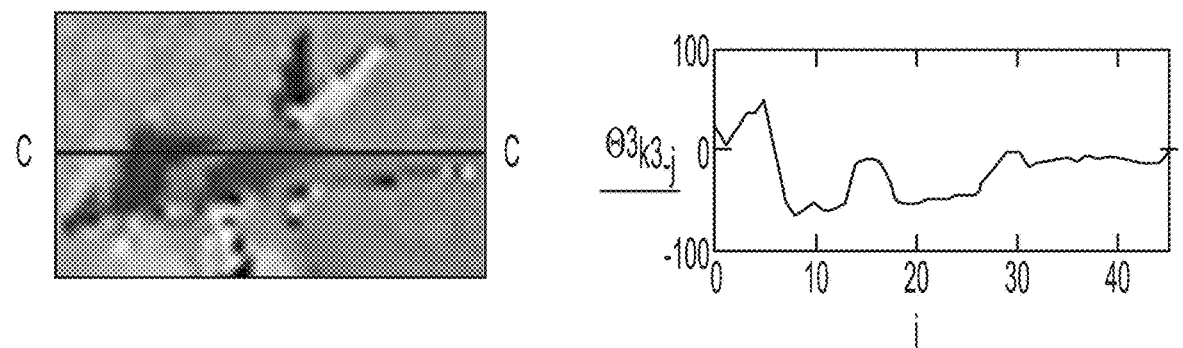
Figure 7G:
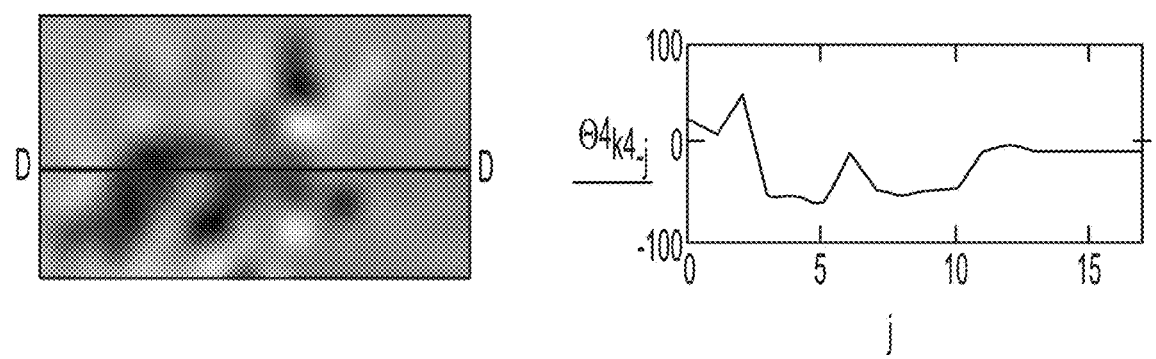

Referring now to FIGS. 7D to 7G, which show pNSurface images of an object (e.g., an aircraft) at various pixel resolutions. Range is simulated in FIGS. 7D to 7G by decreasing the number of pixels used to depict the object. In FIG. 7D, the object is depicted using 219×139 pixels, and a line plot of angular pixel data along the line A-A is also shown. In FIG. 7E, the object is depicted using 91×55 pixels, and a line plot of angular pixel data along the line B-B is also shown. In FIG. 7F, the object is depicted using 45×27 pixel resolution, and a line plot of angular pixel data along the line C-C is also shown. In FIG. 7G, the object is depicted using 17×10 pixel resolution, and a line plot of angular pixel data along the line D-D is also shown. As observed from the line plots shown in FIGS. 7D to 7G, angular data relationship among the various surfaces of the object is invariant to object orientation and range. For example, the peaks of the angular data plots (as well as the relative shape of the angular data plots) remain substantially the same even as the range changes. The concept of surface and shape range invariance can be used to autonomously track objects regardless of the ranges (or distances) from an SPI sensor.

The surface and shape identities and invariances work over all wavelengths of the EM spectrum and provide passive real-time or near-time: ranging; terrain mapping; classification & identification; and tracking. The surface and shape identities and invariances are usable any time in all types of lighting and most weather conditions; significantly reducing the challenges current sensor types have based on temperature, chemical composition, geometry and atmospheric conditions as well as data capture based on aperture, position, measurement modes and sensor performance. The benefits of the shape identities include, but are not limited to: complete 3D surface orientations and shapes with or without point clouds; objects can be recognized by kilobytes of data; the AI-enhanced object identifications and navigation can be applied in IR; the processing and solution are in real-time or near-time; complete 3D surface orientations and shapes with or without point clouds; and objects can be recognized using kilobytes of data-orders of magnitude less data for solutions. Further characterization of the object is possible from the richness of detailed information from the first- and second-order primitives. Examples include degree of linear polarization, theta, albedo, index of refraction, etc. which can be used to determine characteristics such as metal, wood, plastic, foliage to name a few.

The surface and shape orientation invariance (as well as the surface and shape range invariance) of pXSurface and pXShape data can be used to improve the current state of vehicle autonomy. Although existing sensors and autonomy routines remove some of the burden from the driver, the driver must be in control most of the time. However, new technological approaches are needed to get to Level 3 autonomy and beyond. As an example, scene segmentation requires a paradigm shift from high latency, compute intensive, 2D-to-3D active signal conversion to inherently 3D data that can be processed in real-time or near-time (e.g., in the millisecond range) and that can be obtained through passive surface and shape signal acquisition. As discussed above, SPI systems can calculations at the pixel level all the way up to pXSurface and pXShape levels (which are inherently 3D), both in a single frame and over a time sequence of multiple frames. Therefore, 3D SPI data can easily be used to improve the current state of vehicle autonomy.

As an example, in vehicle autonomy, at least three interaction areas can be identified. In the first interaction area, a vehicle has no a priori knowledge of a scene, and relies on real-time (or near-time) interpretation of the environment. In this first interaction area, data from onboard devices and vehicle sensors are reactively processed to provide awareness of the scene. Examples of data used in the first interaction area include data from GPS, speed, or other types of data providing real-time or near-time trajectory of the vehicle. In this example, real-time or near-time interpretation of the scene can include segmentation of major static features such as roads, buildings, signage elements, road markings and distances. Furthermore, real-time or near-time identification and tracking of mobile features include identification and tracking of vehicles, people, animals and other objects in motion—this includes speed, direction and distance information for each allowing for trajectories to be created and used for motion prediction. All these aspects can benefit from the use of pXSurface and pXShape data, which, as discussed above, exhibit surface and shape orientation invariance (as well as the surface and shape range invariance.

In the second interaction area, persistent static 3D information (e.g., trees, road markers, etc.) is also used by the vehicle to be aware of the scene. For example, awareness of the scene utilizes existing 3D data of area (e.g., street view) to process initial route planning, process real time localization, and augment navigation for GPS-denied situations. Real-time or near-time SPI sensor data can also be used to update 3D persistent data for future use. In an illustration, a vehicle's path is pre-planned from prior 3D information saved either locally or in cloud. In this example, the vehicle interprets real time data with prior expected information to determine modifications to navigation path. As an example, the vehicle can use persistent data previously captured in that region, both in pre-planning route navigation and real-time during movement. This persistent data can be accessed real time from cloud or downloaded for use in areas not providing internet access. Pre-planning route paths can be analogous to current mapping algorithms, but have the added feature of using the full 3D SPI data set to augment GPS with more precise location information from static markers in scene (e.g.—specific buildings, road signs and other "markers"). Furthermore, as mentioned above, there can be an upload of new as-is information from the vehicle back to the cloud to update the persistent scene information for future use.

In the third interaction area, routines update and use 3D information from multiple sources to provide a rich, updated situational awareness data set. For example, a vehicle path is pre-planned from prior multiple vehicle 3D information and saved in the cloud. The subject vehicle interprets real time data with prior expected information and new real time information shared by other vehicles traversing same region. Consequently, the third interaction area includes the first and second interaction areas and adds "as-is" data uploaded from other vehicles in the vicinity. Data shared directly with the subject vehicle (including static data and movement data from other vehicles) can be uses by the subject vehicle to better modify their navigation (e.g. a nearby vehicle could see a person behind a car that the subject vehicle couldn't see). Furthermore, in this scenario, static objects in scene could have sensors on them, thus providing information to the moving vehicle (e.g. a traffic light could let the subject vehicle know of impending change to signal, intersection congestion, etc. so the subject vehicle can slow down).

Figure 8:
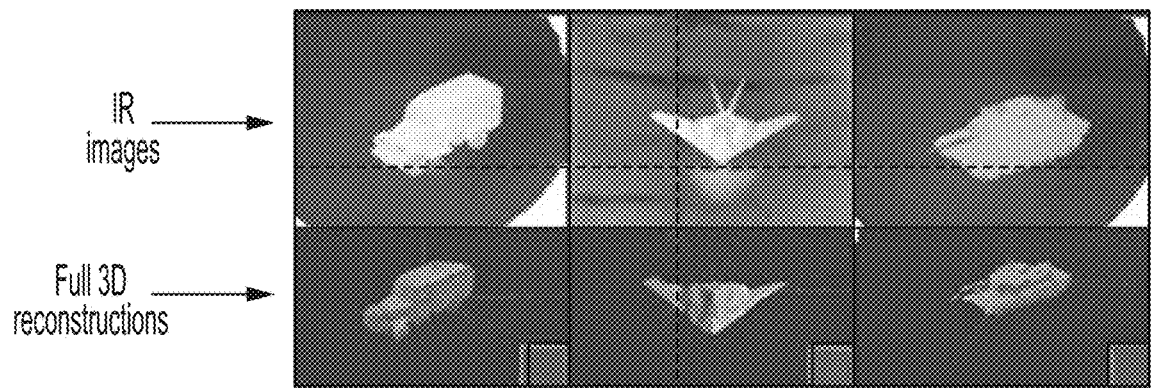
FIG. 8 shows an example of reconstructing a full 3D rendering from IR data.
Figure 9:
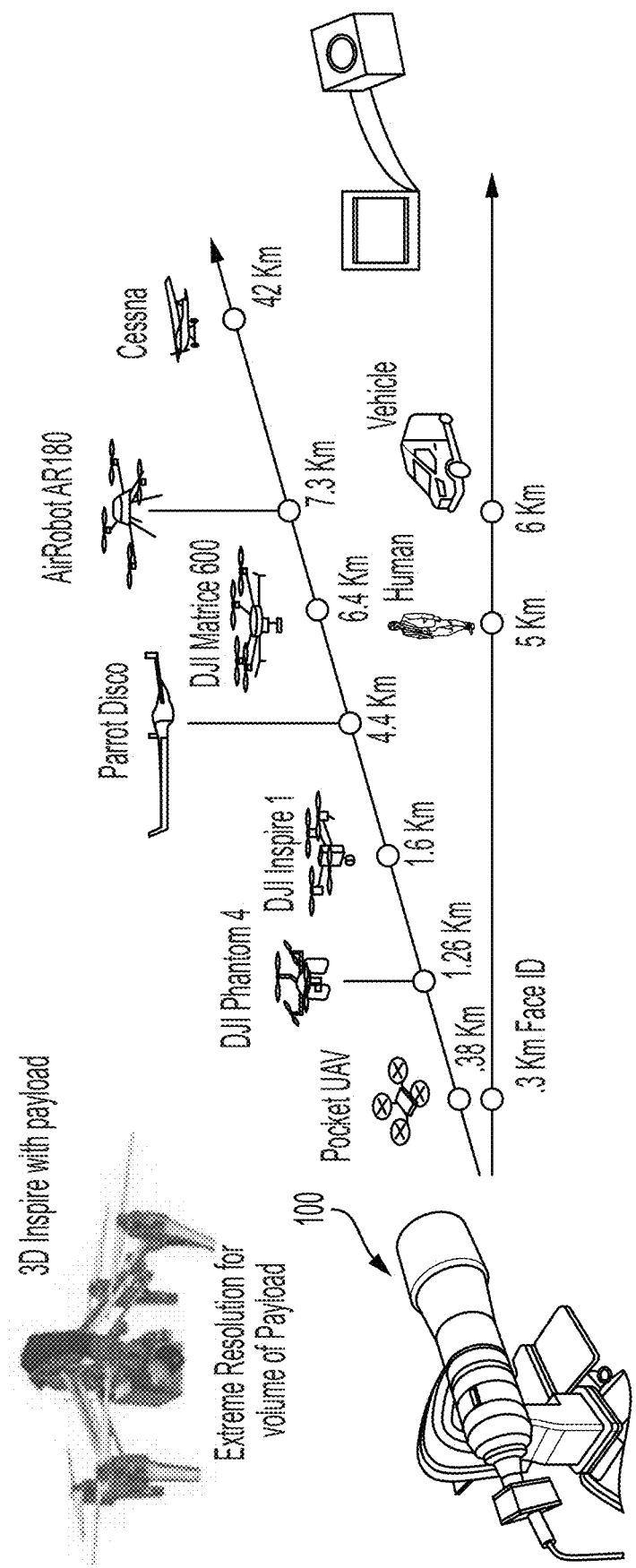
FIG. 9 shows an example of passive ranging, where an SPI system can identify, track, and analyze objects and scenes in three dimensions and at various distances.

FIG. 8 shows an example of reconstructing a full 3D rendering from IR data. Specifically, when required, a full 3D reconstruction can quickly be built with IR data alone. Combinations of IR data (e.g., SWIR, MWIR, LWIR) with visual data greatly improves the 3D reconstructions; however, 3D renderings are not a prerequisite to understand scenes and provide an autonomous solution. Terrain mapping can also be performed using IR data. In terrain mapping, the SPI systems 100, 200 capture and utilize: circular polarization with sensor components: index of refraction; material types; elliptical vectors; broadband color; 3D shape-based detection; 2D shape-based detection; occlusion boundary shapes; and surface normal. Other sensor data & analytics can also be included such as passive hyperspectral (active: laser & radar), as well as analytics from agriculture sector: terrain solutions, plant identifications, etc. Passive ranging can also be accomplished without 3D rendering or using a point clouds. FIG. 9 shows an example of passive ranging, where the SPI systems 100, 200 can identify, track, and analyze objects and scenes in three dimensions and at various distances. Passive ranging can be based on static objects or objects in motion. Passive ranging can be accomplished using the SPI systems 100, 200 through: motion in scene or motion of sensor; AI with a priori database; estimated through generic size models and parameters, and via 3D capture.

The example applications discussed above are merely some of a large, broad set of application areas for the SPI systems 100, 200. Other example of applications for the SPI systems 100, 200 include metrology, inspection, maintenance, navigation, facial recognition, security, situational awareness, entertainment, 3D printing, autonomy, healthcare, wound care, tracking, ranging to name a few. For example, the SPI systems 100, 200 may be used for: astronomy; research; nuclear analysis; material integrity analysis (e.g. to detect cracks and other material defects or anomalies); foreign object detection (e.g., to detect foreign objects that should not exist in specific materials); unique pattern identification (e.g., fingerprint matching or to identify other unique patterns on objects or areas of interest); material wear and tear (e.g., to analyze material surface condition); materials discrimination (e.g., to determine material properties and verification of finite element analysis); optical 3D dimensional deformation detection (e.g., to monitor real-time vehicle roof deformation that occurs in a high impact collision); bruise damage measurement and analysis, ice detection (e.g., to detect ice at various distances over various weather conditions); extended range 3D facial recognition; assessment of body conditions (e.g., to visualize fundamental aspects of muscle conditions in surfacing whales); identification of infrastructure states (e.g., to identify degradation of infrastructure components such as pipes, bridges, and rails); 3D volumetric body motion analysis (e.g., to map the trajectory of areas of the body without tagging); quality control and inspection of aircraft parts (e.g., to determine defects, wear and tear of parts, and preventative maintenance); determining angle of incidence on missile targets (e.g., to accurately determine measured difference between weapon body axes and the target axes of impact); scattering media visualization (e.g., to image under poor environmental conditions such as fog and haze); terrain navigation of unmanned vehicles (e.g., in complex terrain and urban environments where access to GPS and communications may be limited); face muscle tracking (e.g., for facial gesture recognition and tracking; camouflage discrimination (e.g., to discern camouflaged targets from scene surroundings); metal loss calculation (e.g., where a region of interest is identified, area and depth calculations are made, and comparison with ground truth results are within 98% of each other); corrosion blister calculations; surface profile calculations; etc.

Figure 10:
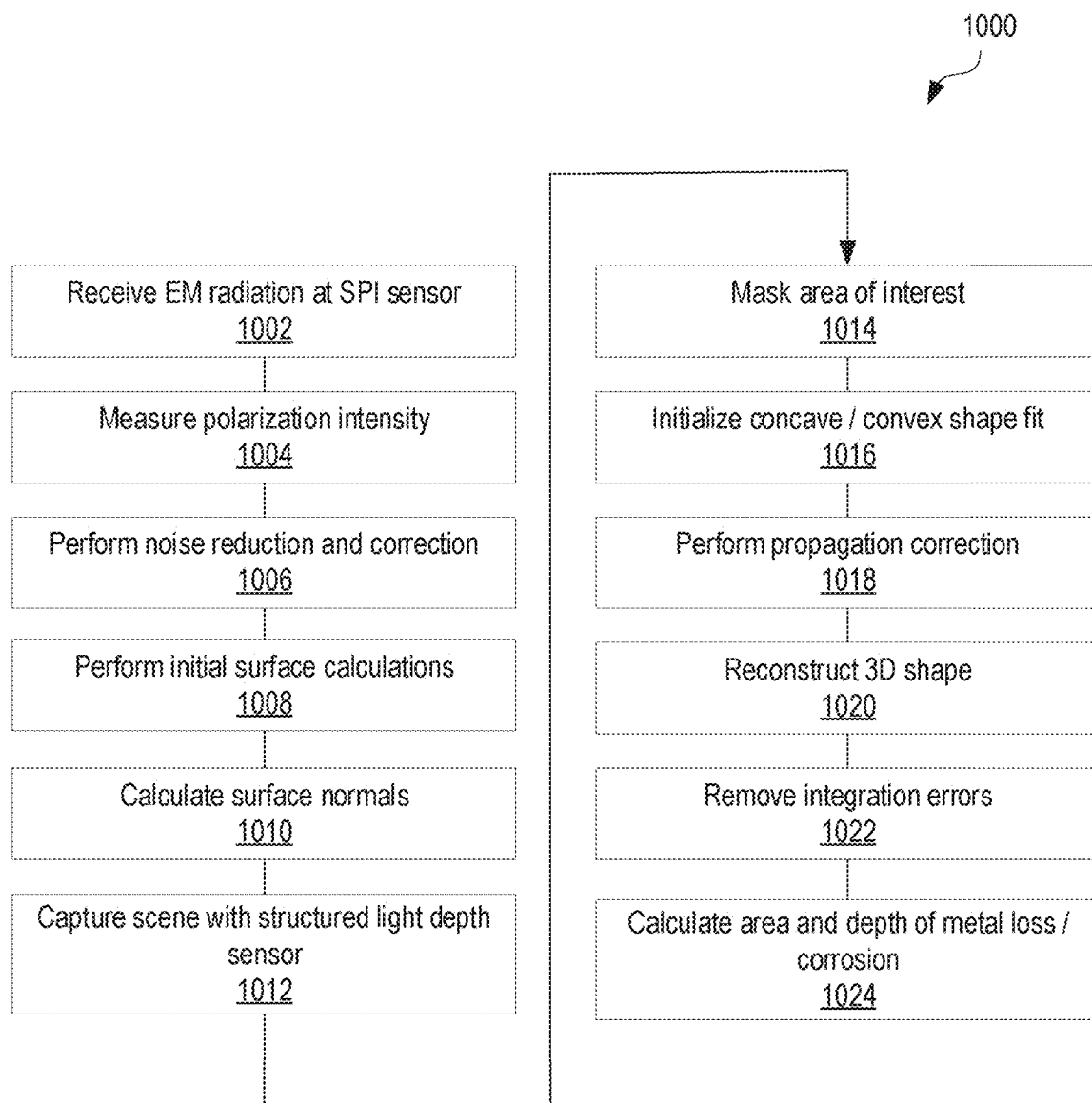
FIG. 10 shows a flowchart illustrating an example series of steps that can be performed for metal loss calculation or for corrosion blister calculation.

FIG. 10 shows a flowchart 1000 illustrating an example series of steps that can be performed for metal loss calculation or for corrosion blister calculation. In implementations where the flowchart 1000 is used for metal loss calculation, the flowchart 1000 can identify a region of interest and calculate the area and depth of metal loss. Comparison with ground truth results can be within 98% of each other. In implementations where the flowchart 1000 is used for corrosion blister calculation, the flowchart 1000 can identify bare metal, normal coating, and disturbed coating and corrosion, thereby enabling quantification of anomalies using ISO standards. In such examples of corrosion blister calculation, the flowchart 1000 also enables change measurement and deep analysis, performs multiple measurements per capture, and allows for 3D-referencing in a digital twin coordinate frame.

In the example of FIG. 10, steps 1002, 1004, and 1012 represent sensor data and initial processing; steps 1006, 1008, 1010, 1016, 1018, 1020, and 1022 represent processing by the edge processors 108, 212; and steps 1014 and 1024 represent information that is depicted or obtained from a user interface.

At step 1002, EM radiation reflects onto the SPI sensor. Specifically, at step 1002, EM radiation reflects off surfaces, and the reflected light is polarized by the surface and captured by the SPI sensor. At step 1004, the SPI sensor measures polarization intensity. Specifically, at step 1004, each pixel of the SPI sensor detects polarization intensity at various angles (e.g., 0-degrees, 45-degrees, 90-degrees, and 135-degrees). In some examples, if the scene and camera containing the SPI sensor are stationary, then a temporal average is used to assist in noise reduction. At step 1006, noise reduction and correction is performed. For example, software validates and corrects the data. Furthermore, dark frame correction, flat field correction, and Mueller correction is performed.

At step 1008, initial surface calculations are performed. Specifically, at step 1008, the degree of linear polarization (DoLP) and the angle of linear polarization (Theta) are determined. At step 1010, surface normals are calculated (e.g., using the DoLP and Theta determined at step 1008). As described above, in some cases, the SPI sensor can operate in cooperation with another type of sensor. Consequently, the example flowchart 1000 includes step 1012 of capturing a scene with a structured light depth sensor. In some examples, the structured light depth sensor is calibrated with the SPI sensor, and captured at the same time as the SPI sensor. The depth image is re-rendered with the polarization image for pixel matching. At step 1014, the area of interest is masked (e.g., manually masked) and separated from the whole image.

At step 1016, a concave or convex shape fit is initialized. In some examples of metal loss calculation, the concave shape is created by initializing the top- and bottom-most pixel surface normals as lower and upper hemispheres, respectively. In some examples of corrosion blister calculation, the convex shape is created by initializing the top- and bottom-most pixel surface normals as upper and lower hemispheres, respectively.

At step 1018, propagation correction is performed. In some examples, hemispherical correction of adjacent pixels is simultaneously done, with this step 1018 being repeated until all pixels in the feature have been corrected. At step 1020, a 3D shape is reconstructed. In some examples, using an integration method, SPI surface normals are reconstructed to reveal the underlying concave shape of the metal loss feature (e.g. in the case of metal loss calculation) or to reveal the underlying convex shape of the metal loss feature (e.g. in the case of corrosion blister calculation).

At step 1022, integration errors are removed. In some example, a multi-quadratic radial bias function removes ideal and SPI surface integration errors, while keeping high-frequency polarization reconstruction in the integrated shape. At step 1024, area and depth of the metal loss or corrosion is calculated. Depth can be determined by taking the difference in height between the crest or peak and the average height of the pixels at the circumference. Area can be calculated as a function of the number of pixels, FOV, and distance to target (e.g., depth sensor or manual entry).

Figure 11A:
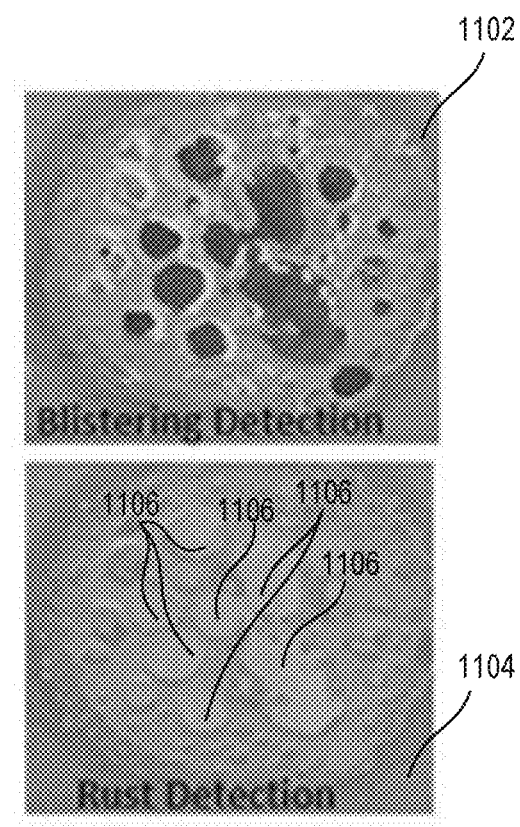
FIG. 11A shows example images obtained when the flowchart in FIG. 10 is applied to corrosion blister calculation.
Figure 11B:
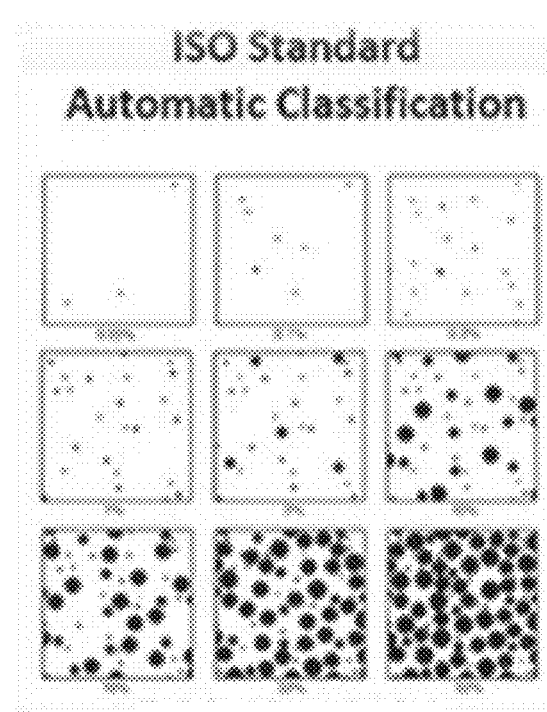
FIG. 11B shows the ISO standard of classification for the percentage of rust.

FIG. 11A shows example images obtained when the flowchart 1000 is applied to corrosion blister calculation. For example, the image 1102 illustrates the extent of blistering in an object or region of interest, while image 1104 illustrates regions 1106 where rust is detected. FIG. 11B shows the ISO standard of classification for the percentage of rust. In some implementations, the images shown in FIG. 11A can be easily obtained and compared to the ISO standard of classification shown in FIG. 11B to quantify the percentage of rust using ISO standards.

Figure 12:
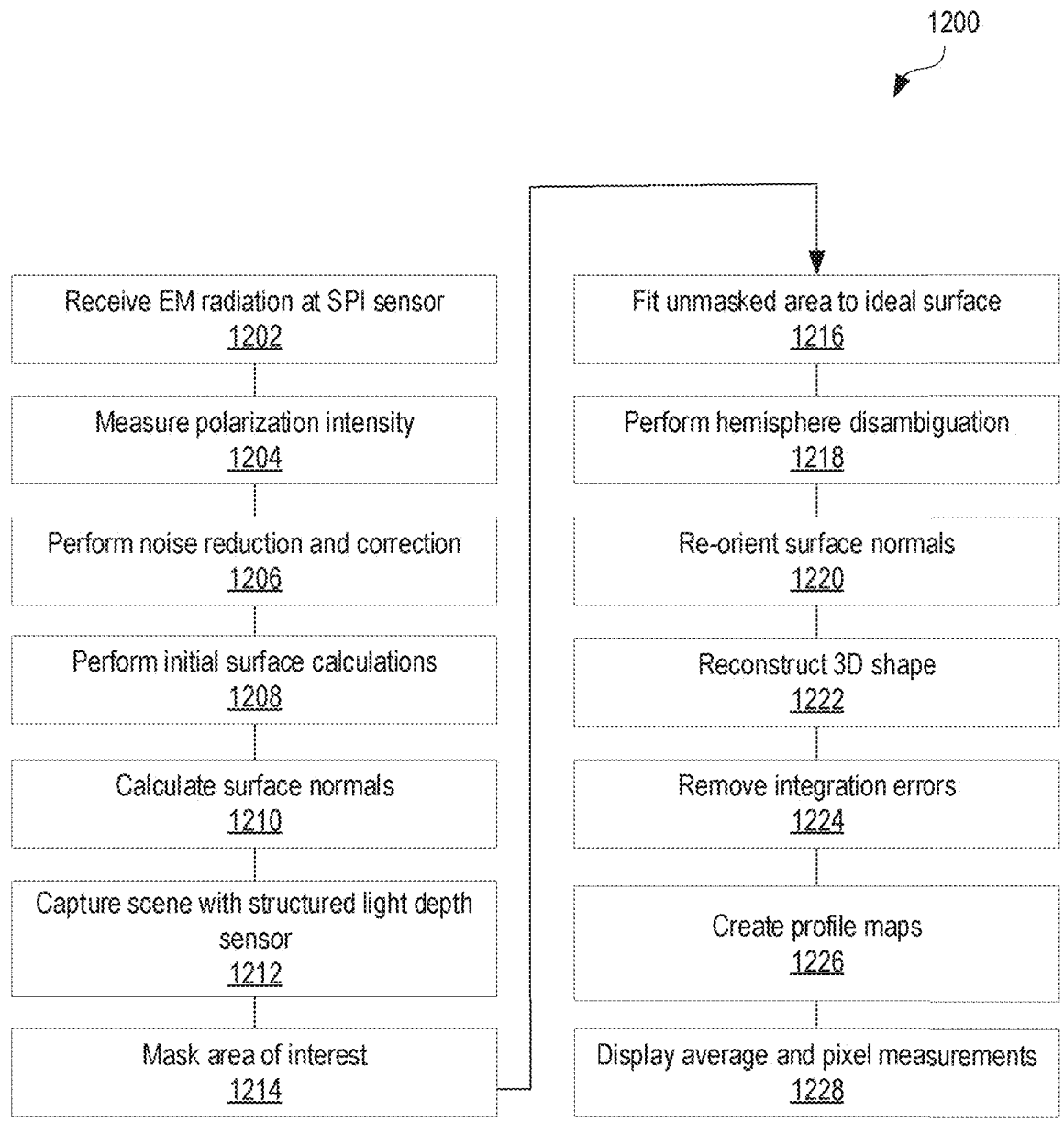
FIG. 12 shows a flowchart illustrating an example series of steps that can be performed for surface profile calculations.

FIG. 12 shows a flowchart 1200 illustrating an example series of steps that can be performed for surface profile calculations. In implementations, the method depicted in FIG. 12 can measure the surface profile across an entire area of interest, a specifically defined area, or over a single pixel. In the example of FIG. 12, steps 1202, 1204, and 1212 represent sensor data and initial processing; steps 1206, 1208, 1210, 1216, 1218, 1220, 1222, 1224, and 1226 represent processing by the edge processors 108, 212; and steps 1214 and 1228 represent information that is depicted or obtained from a user interface.

At step 1202, EM radiation reflects onto the SPI sensor. Specifically, at step 1202, EM radiation reflects off surfaces, and the reflected light is polarized by the surface and captured by the SPI sensor. At step 1204, the SPI sensor measures polarization intensity. Specifically, at step 1204, each pixel of the SPI sensor detects polarization intensity at various angles (e.g., 0-degrees, 45-degrees, 90-degrees, and 135-degrees). In some examples, if the scene and camera containing the SPI sensor are stationary, then a temporal average is used to assist in noise reduction. At step 1206, noise reduction and correction is performed. For example, software validates and corrects the data. Furthermore, dark frame correction, flat field correction, and Mueller correction is performed.

At step 1208, initial surface calculations are performed. Specifically, at step 1208, the degree of linear polarization (DoLP) and the angle of linear polarization (Theta) are determined. At step 1210, surface normals are calculated (e.g., using the DoLP and Theta determined at step 1208). As described above, in some cases, the SPI sensor can operate in cooperation with another type of sensor. Consequently, the example flowchart 1200 includes step 1212 of capturing a scene with a structured light depth sensor. In some examples, the structured light depth sensor is calibrated with the SPI sensor, and captured at the same time as the SPI sensor. The depth image is re-rendered with the polarization image for pixel matching. At step 1214, the area of interest is masked (e.g., manually masked) and separated from the whole image.

At step 1216, the unmasked area is fit to an ideal surface. At step 1218, hemisphere disambiguation is performed. In some examples, SPI normals are compared to ideal surface normals, and SPI normals closest to the ideal surface normals are selected. At step 1220, surface normals re-orientation is performed. In some examples, both SPI and ideal normals are averaged. The transformation routine at step 1220 rotates the average SPI normals to average ideal normals, thus removing global bias from SPI normals. At step 1222, a 3D shape is reconstructed. In some examples, using an integration method, SPI surface normals are reconstructed to reveal the underlying shape of the target.

At step 1224, integration errors are removed. In some example, a multi-quadratic radial bias function removes ideal and SPI surface integration errors, while keeping high-frequency polarization reconstruction in the integrated shape. At step 1226, a profile map is created. For example, each pixel is set to the maximum value of the difference between polarization and ideal surface values with a quarter-inch radius of that pixel. At step 1228, the average measurements and pixel measurements are displayed. For example, the difference between polarization and ideal surface values for the whole area or region of interest is average, and values at each pixel can be displayed by hovering a mouse cursor over the pixel of interest.

Figure 13:
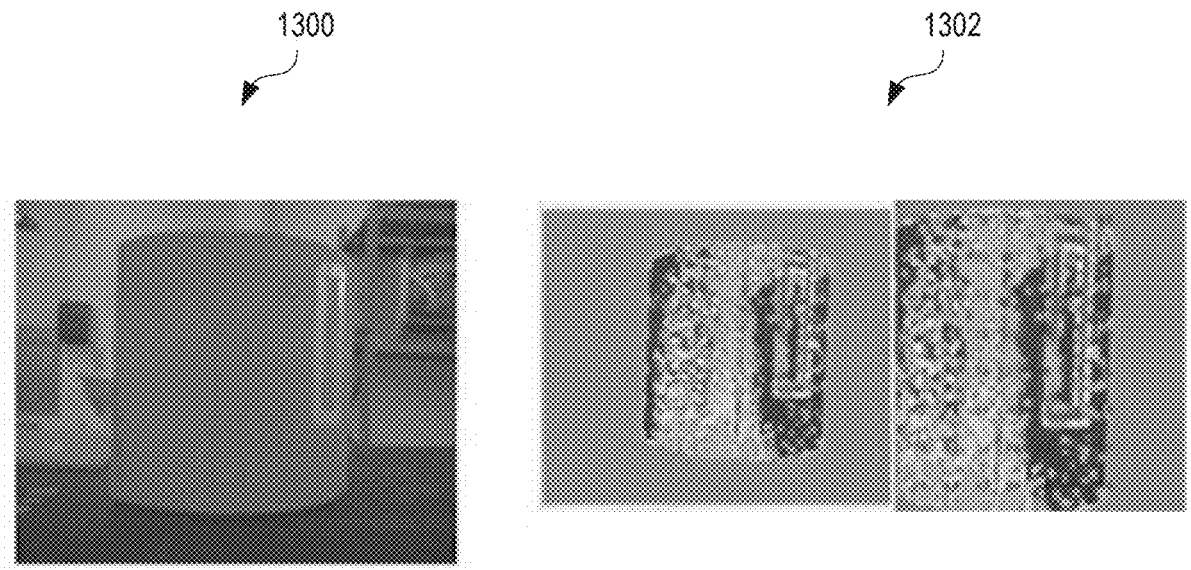
FIG. 13 shows an example of surface profile calculations made for an object of interest.

FIG. 13 shows an example of surface profile calculations made for an object of interest. In the example of FIG. 13, image 1300 shows an area of interest that is placed in the SPI sensor's field of view. Image 1302 shows the surface profile that is measured across the area of interest, a specifically defined area in the area of interest, or over a single pixel in the area of interest. In some examples, the process of calculating a surface profile can be accomplished in as few as 3 minutes and could be shortened as workflows are defined.

Figure 14A:
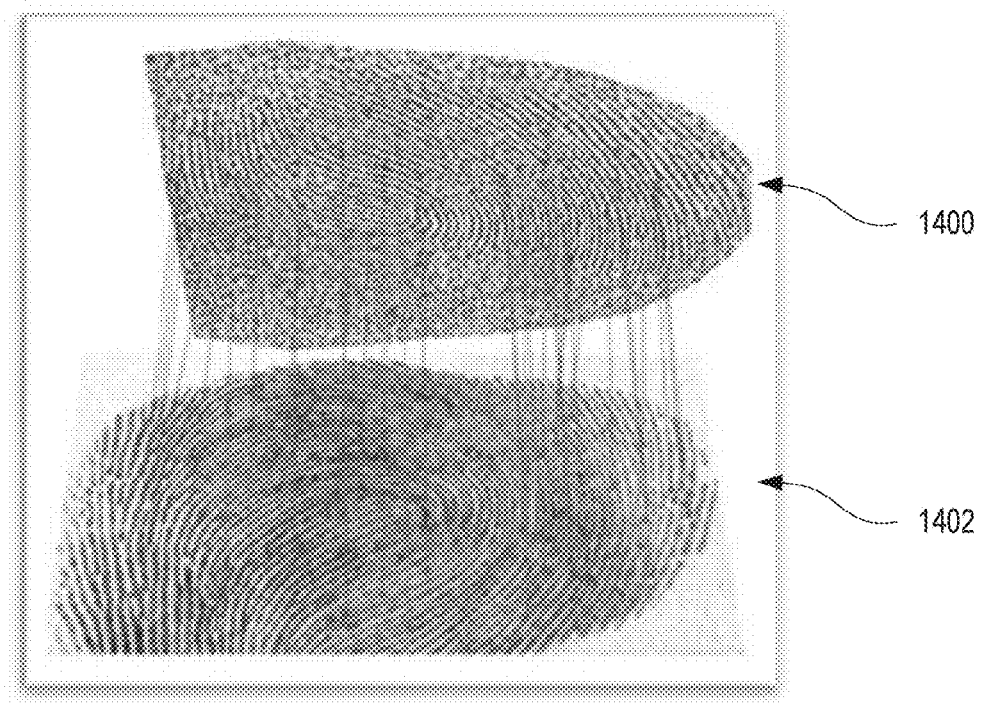
FIG. 14A shows an example of a touchless 3D fingerprint captured using SPI sensing technology.
Figure 14B:
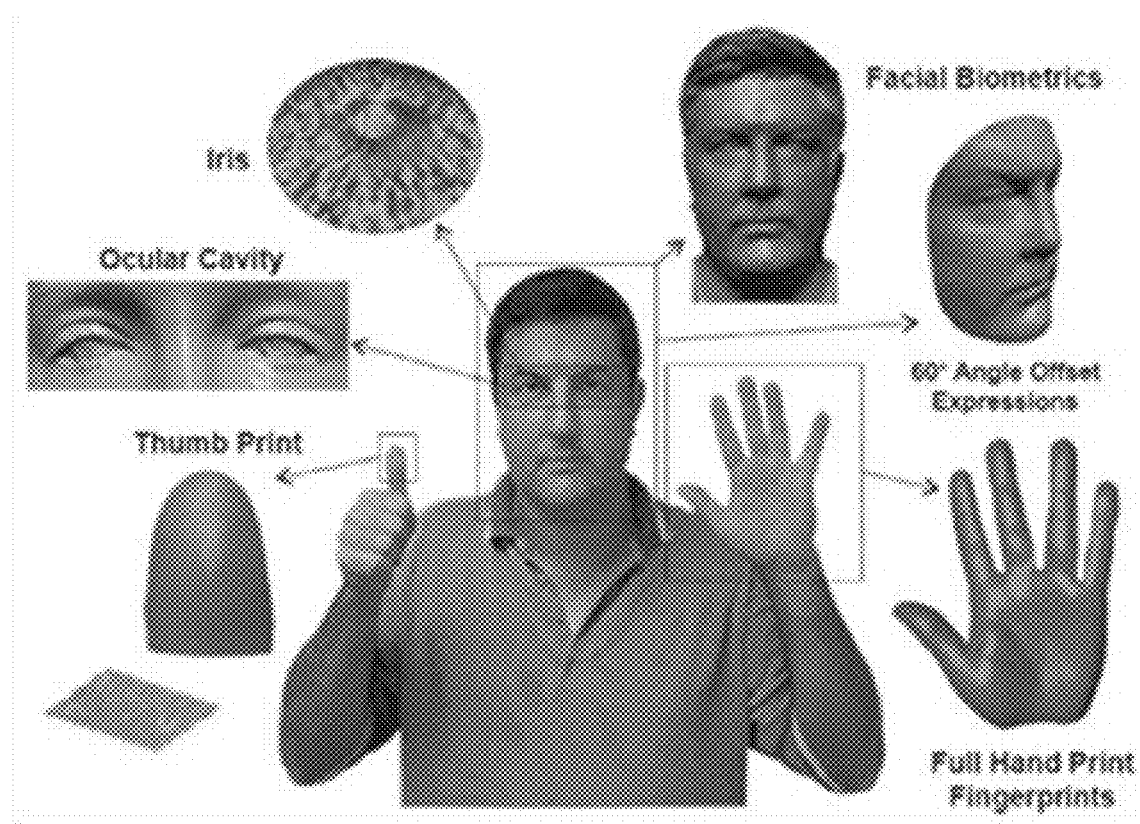
FIG. 14B illustrates other aspects of a human body that can be captured using SPI sensing technology in the context of biometric recognition and security.

A further application of SPI sensing technology is in biometric recognition and security. One example of this is the acquisition of touchless 3D fingerprints. FIG. 14A shows an example of a touchless 3D fingerprint 1400 captured using SPI sensing technology. For the sake of comparison, a conventional ink-captured fingerprint 1402 is also shown in FIG. 14A. FIG. 14B illustrates other aspects of a human body that can be captured using SPI sensing technology in the context of biometric recognition and security. For example, FIG. 14B illustrates that SPI sensing technology can be used for ocular cavity imaging, iris imaging, facial biometrics, recognition of angle offset expressions, and full handprint fingerprints. In some examples, SPI biometric applications can use SPI CMOS sensor technology (e.g., the SPI systems 100, 200 described above), output 3D surface data, and use 3D shape data analytics to provide very high-resolution facial recognition. Apple ID uses about 30,000 data points for facial recognition. However, SPI biometric applications can use up to about 1,000,000 data points (depending upon the distance to the face). This is a 33-times improvement in resolution as well as a large reduction in the manufacturing cost of the phones. Furthermore, SPI biometric applications can use autonomous high-resolution 3D surface data acquisition and AI analytics to improve performance.

As described in many of the applications described above, the SPI systems 100, 200 can be equipped with an AI framework to improve performance. As an example, SPI includes the use of polarization information collected by sensors. In addition to informing 3D shape, polarization information also enables AI-based analysis of, for example, specular and diffuse reflection, scattering of electromagnetic waves on complex surfaces, surface reflectance, material refractive indices, birefringence properties, analysis of Brewster's angle of materials, and analysis and removal of specular glint from surfaces, including water and glass. In addition, polarization information enables analysis of and modification of light properties in a captured image to improve image quality, resulting in improved image data in AI processes. SPI uniquely enables the application of these and other attributes of polarization as both novel inputs and image filtering in AI and machine learning processes in computer vision applications. An example of how polarization information is used in SPI-enabled AI processes (in addition to 3D shape from polarization) is in the analysis of surface materials and surface properties using reflectance and refraction information.

In some examples, the SPI systems 100, 200 are configured to perform hybrid AI analytics that are a combination of first-generation AI methodologies, second-generation AI methodologies, and third-generation AI methodologies. In some examples, first-generation AI methodologies can include existing algorithms, library routines, and first principle analytics gleaned from physics. Second-generation AI methodologies can include machine-learning, data driven AI methods, examples of which include supervised, unsupervised, semi-supervised, and reinforcement learning using Bayesian networks, support vector models, neural nets, nearest neighbor, etc. Second-generation AI methodologies utilize all the variants of machine learning and create new learning engines based on SPI's 3D data set and pixel intensity. Furthermore, second-generation AI methodologies generate an output that can be used in segmentations, identification, and characterization. Third-generation AI methodologies can be 3D AI solutions that are surface- or shape-driven. Third-generation AI methodologies is based on ingesting surface and shape data and utilizes new mathematical routines such as differential geometry and topology. As an example, third-generation AI methodologies use similar mathematical techniques and analytics as machine learning but use vectors and surface information over scalar and point values.

Figure 15:
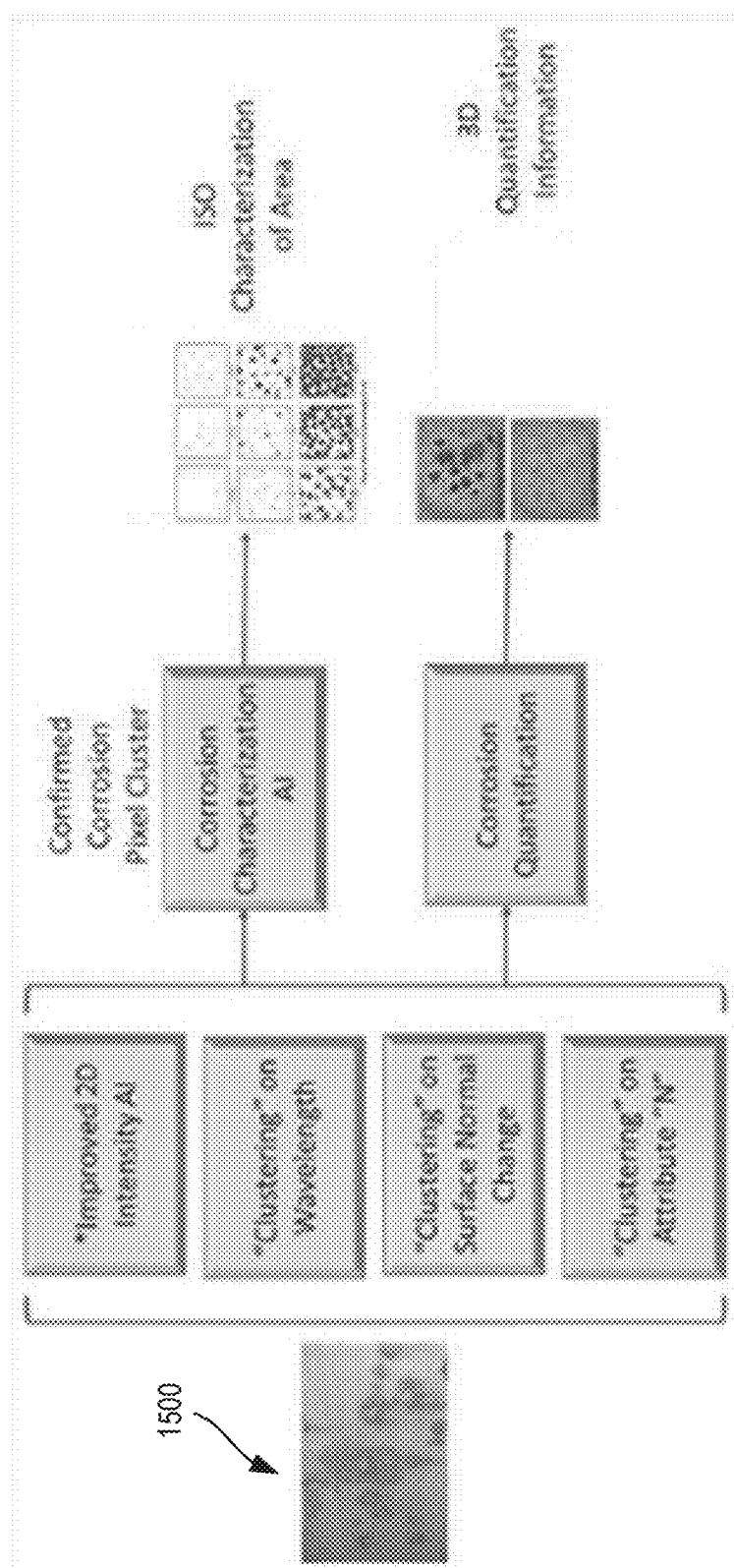
FIG. 15 shows an example of applying hybrid AI analytics to corrosion blister calculation.

FIG. 15 shows an example of applying hybrid AI analytics to corrosion blister calculation. In FIG. 15, a region of interest 1500 is imaged using the SPI imaging technology. The 3D data set and the intensity image are subjected to analytics. For example, hybrid AI routines are run on the intensity image. Furthermore, clustering is performed on wavelength, surface normal change, and any attribute "N." Based on the analytics, corrosion characterization and corrosion quantification can be performed. Hybrid AI can be utilized in corrosion characterization to confirm a corrosion pixel cluster and to characterize the corrosion according to ISO standards. Corrosion is quantified (e.g., using the process 1000 described above) to generate 3D quantification information.

Figure 16:
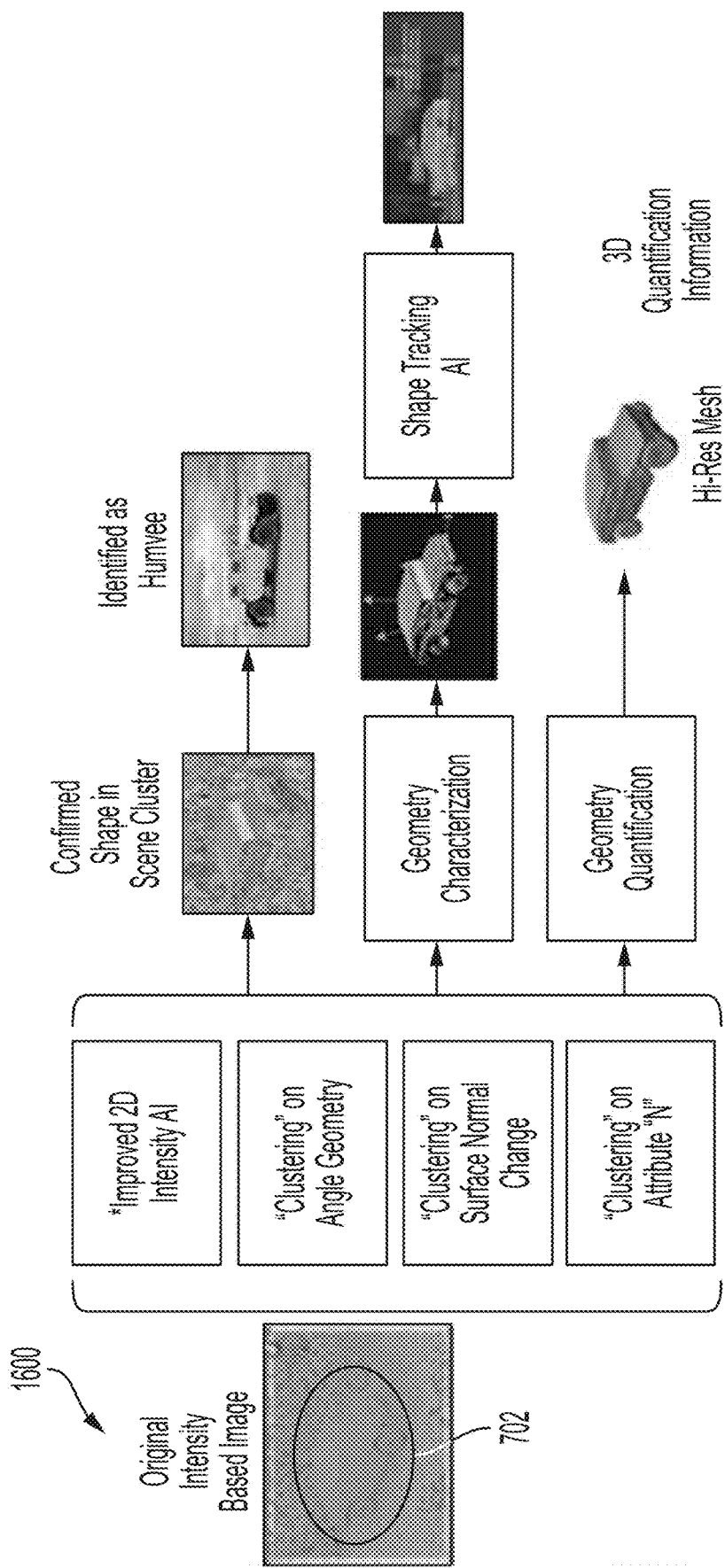
FIG. 16 shows an example of applying hybrid AI analytics to tracking an object of interest (e.g., a Humvee).

FIG. 16 shows an example of applying hybrid AI analytics to tracking an object of interest (e.g., the Humvee 702). In FIG. 16, an original intensity-based image is obtained using the SPI imaging technology. The 3D data set and the intensity image are subjected to analytics. For example, hybrid AI routines are run on the intensity image. Furthermore, clustering is performed on angle geometry, surface normal change, and any attribute "N." Based on the analytics, a shape can be confirmed in the scene cluster and subsequently identified as the object of interest (e.g., a Humvee). Furthermore, geometric characterization and geometric quantification can be performed based on the analytics. As an example of geometric characterization, panels of the object of interest can be constructed, and hybrid AI analytics can be used for tracking of the object's panels. As an example of geometric quantification, a high-resolution mesh can be constructed.

Figure 17:
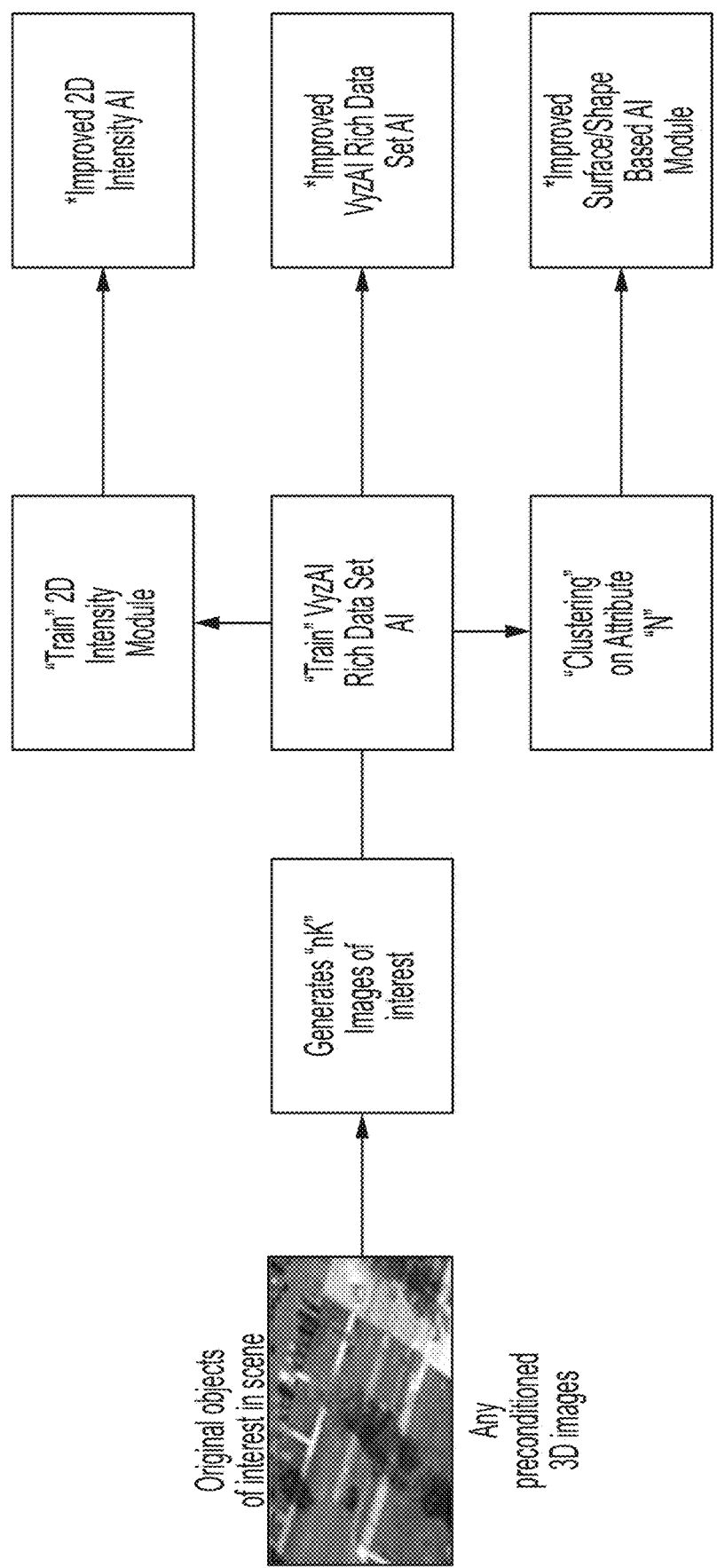
FIG. 17 shows an example of a synthetic AI routine that can be used to improve learning routines.

In addition to hybrid AI, synthetic AI can be used in the AI framework used by the SPI systems 100, 200. Synthetic AI provides the ability to simulate and generate thousands of 2D and 3D images based on changing environmental parameters such as lighting and location, shadows, angles, etc., that can be used to dramatically improve the time taken to create, and the confidence in, existing learning routines (e.g., supervised, unsupervised, and surface- or shape-based learning routines). FIG. 17 shows an example of a synthetic AI routine that can be used to improve learning routines. In FIG. 17, original objects of interest are depicted in a scene and used as an. Any preconditioned 3D image can be used as an input. Subsequently, images of interest are generated, and are used to train the rich 3D data set obtained from the SPI systems 100, 200, thus yielding an improved rich 3D data set AI engine. Furthermore, clustering can be performed on any attribute "N," thus yielding an improved surface- or shape-based AI engine. Additionally, the 2D intensity engine can be trained, thus yielding an improved 2D intensity AI engine.

Many of the applications referenced earlier represent part of a bigger solution comprised of a wealth of digital information, analytics and workflow. The enablement of SPI allows for both real-time or near-time 3D surfaces and shape capture as well as real time analysis of that information. Most of the current solutions are achieved in many steps of data capture, data movement, data analysis, interpretation to final insight and recommendation which could take in some cases on the order of months. The SPI systems 100, 200, however, allow for immediate analysis of an object in scene.

Figure 18:
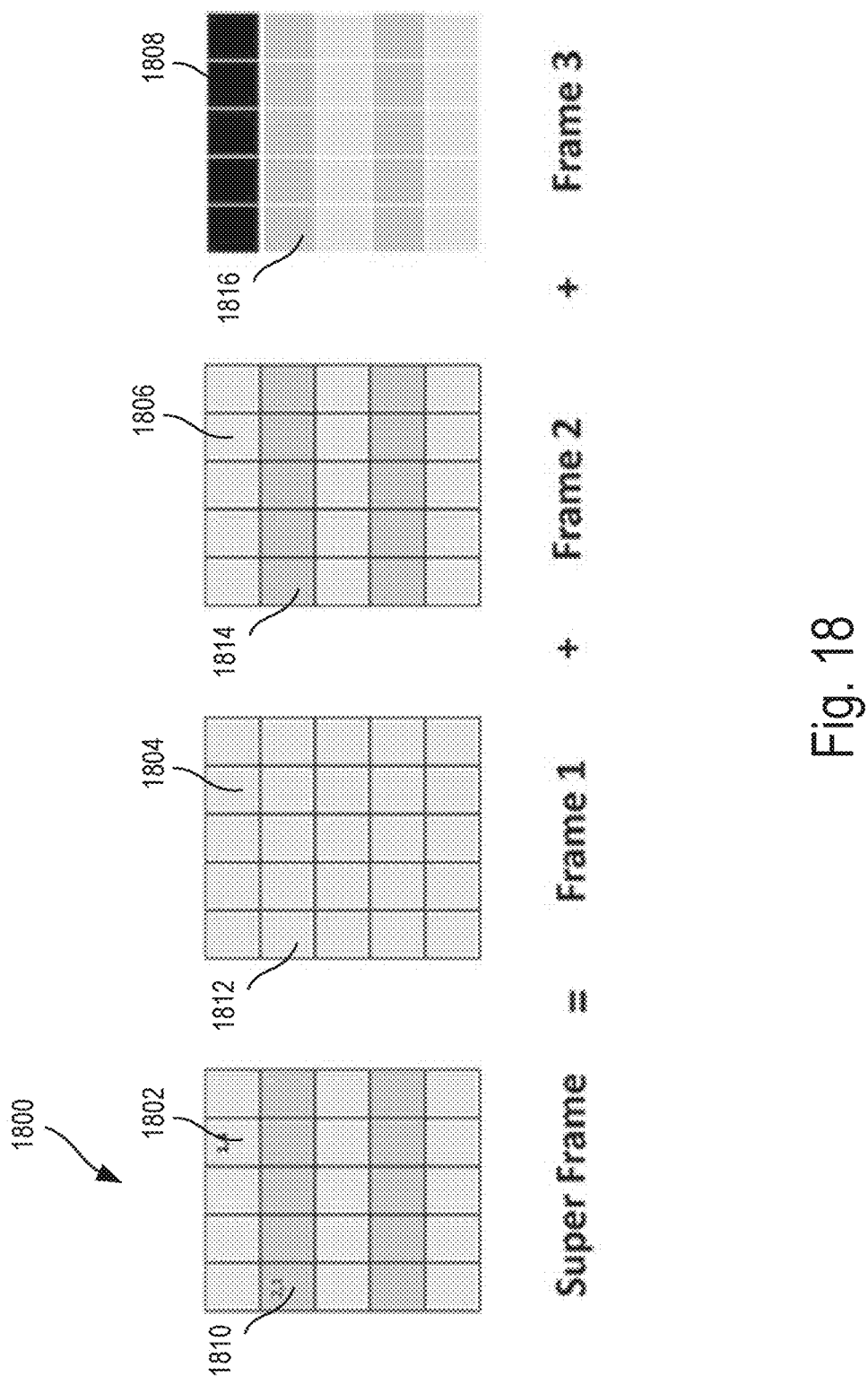
FIG. 18 shows an example of constructing a super surface or super frame from one or more frames and associating a confidence value with each pixel of the super surface of super frame.

The performance of the SPI systems 100, 200 (as well as the many applications described above) can be further improved by associating a degree of confidence with the 3D values at each pixel of a surface or frame. FIG. 18 shows an example of constructing a super surface or super frame from one or more frames and associating a confidence value with each pixel of the super surface of super frame. In the example of FIG. 18, the super surface (or super frame) 1800 may be a set of pixels ascribed to a surface (or the entirety of all pixels within a frame) whose pixel level values are calculated through various mathematical approaches (e.g., described above) from multiple pixels and surfaces from one or more frames. Furthermore, the confidence value can be a normalized value between 0 and 1, for each primitive, derived value, etc., which could be used in various mathematical approaches such as weighting factor, etc. The confidence value mathematically defines a confidence that the value accurately represents a real-world attribute. As an example, the super surface (or super frame) 1800 is depicted as a combination of Frame 1 (acquired at time t1), Frame 2 (acquired at time t2), and Frame 3 (acquired at time t3). In FIG. 18, the "=" represents some mathematical value derived from the similarly-located pixels in all the frames (e.g., an average or a weighted sum), while the "+" represents a mathematical operation of the inherent value and the confidence value. For example, in the illustration of FIG. 18, the pixel 1802 of the super surface (or super frame) 1800 is composed of the same angular value from pixel 1804 of Frame 1 and pixel 1806 of Frame 2 averaged with a confidence value of 0.7. The angular value from pixel 1808 of Frame 3 has a low confidence value (e.g., 0.1) because of a measurement of specular reflection indicating the angular value was of very low confidence. With regards to pixel 1810 of the super surface (or super frame) 1800, an average of all corresponding pixels 1812, 1814, 1816 in the other frames has a high confidence value as all values in Frames 1 to 3 indicate a high confidence value for each of their individual pixel measurements. The overall outcome of the use of the super surface (or super frame) 1800 and the confidence value is a high degree of confidence that the 3D values at each of the pixels represents the true nature of the physical scene whether it's angle, intensity, slope vector, etc.

Given the vast amount of data that can be generated and processed (e.g., in real-time or near-time) by the SPI systems 100, 200, this disclosure proposes a data management system to manage and store the data. Specifically, this disclosure proposes ways of organizing the data under a working structure to manage and manipulate the data. The data management system can take the form of an operating system or an application-specific system. In either case, the data management system provides technical improvements and advantages over existing approaches. For example, the data management system allows an SPI system (e.g., the SPI systems 100, 200) to reduce manual interventions and effectively and seamlessly manage large volumes of data generated by the SPI system. For example, in some implementations, the data management system may allow the SPI system process the 3D data and generate, in real-time or near-time (e.g., in a range from one millisecond to about 5 seconds), first- and second-order primitives that convey information about the object 102. Furthermore, the data management system can be easily applied to a variety of applications and can also be used for applications that rely on autonomy and AI.

In one example, combinations of data at various levels such as pixel, surface, shape and combinations of mathematical routines and approaches at these levels can also be organized into a digital architecture approach. This digital architecture can manifest as: an operating system at the core level (referred to as a shape operating system and abbreviated "ShapeOS"), providing access to these layers of information and processing thru a software developer kit (SDK) or calling approach; a portal where a human can interact and access with those data layers and transform the data into other data types thru a human directed approach; or a specific set of combinations to create a standalone application-level platforms providing a limited set of outputs. These combinations of data collection, data processing and digital architectures can be executed on any existing digital platform such as mainframe processors, edge processors, GPUs, etc. and new platforms such as quantum based, photonic based, biological based, etc.

Figure 19:
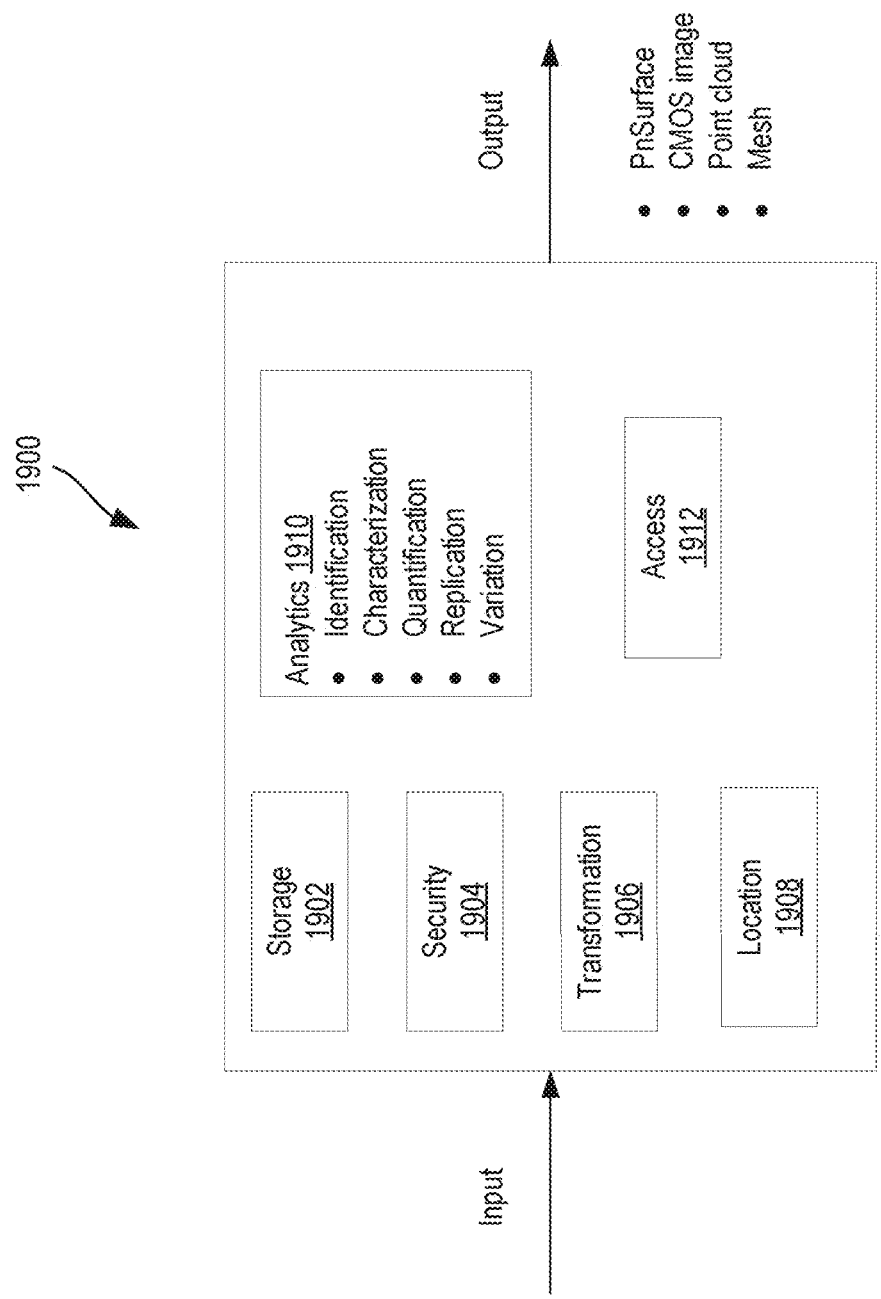
FIG. 19 shows various engines of a shape operating system.

As mentioned above, the digital architecture for organizing the data under a working structure to manage and manipulate the data can manifest as a shape operating system at the core level. FIG. 19 shows various engines of a shape operating system 1900. The shape operating system 1900 provides digital access to SPI based data and time series information. The shape operating system 1900 also provides a managed repository of historical data which can be accessed for future analysis as analytical routines are developed. The shape operating system 1900 further provides a secure environment using pnSurface information as biometric security, and the ability to transform pXSurface information to current file formats utilized extensively for existing 3d approaches (which provides an upward and downward compatible roadmap to convert over time to pXSurface information).

The shape operating system 1900 receives an input, which can be pXSurface and pXShape digital information where "X" defines any attribute type obtained from first- and second-order primitives. For example, information related to surface normal vectors or orientations of the object 102 may be clustered or segmented, thus resulting in a pNSurface and pNShape description of the object 102, where "N" denotes the surface normal vectors or orientations.

The shape operating system 1900 includes a storage engine 1902. In some examples, the input to the shape operating system 1900 includes the digital forms of the rich data set (e.g., CMOS images and pXSurface and pXShape pixel surface). The input data is received by the storage engine 1902 and stored in a record format with an associated suffix (e.g., ".pXSx"). In addition to the actual surface image (which, for example, includes the normal to the surface and the frequency of light for each pixel), the following can also be stored by the storage engine 1902: the date/time of acquisition; location in a specified coordinate system; sensor type; and other relevant meta data appropriate to the acquired signal.

Figure 20:
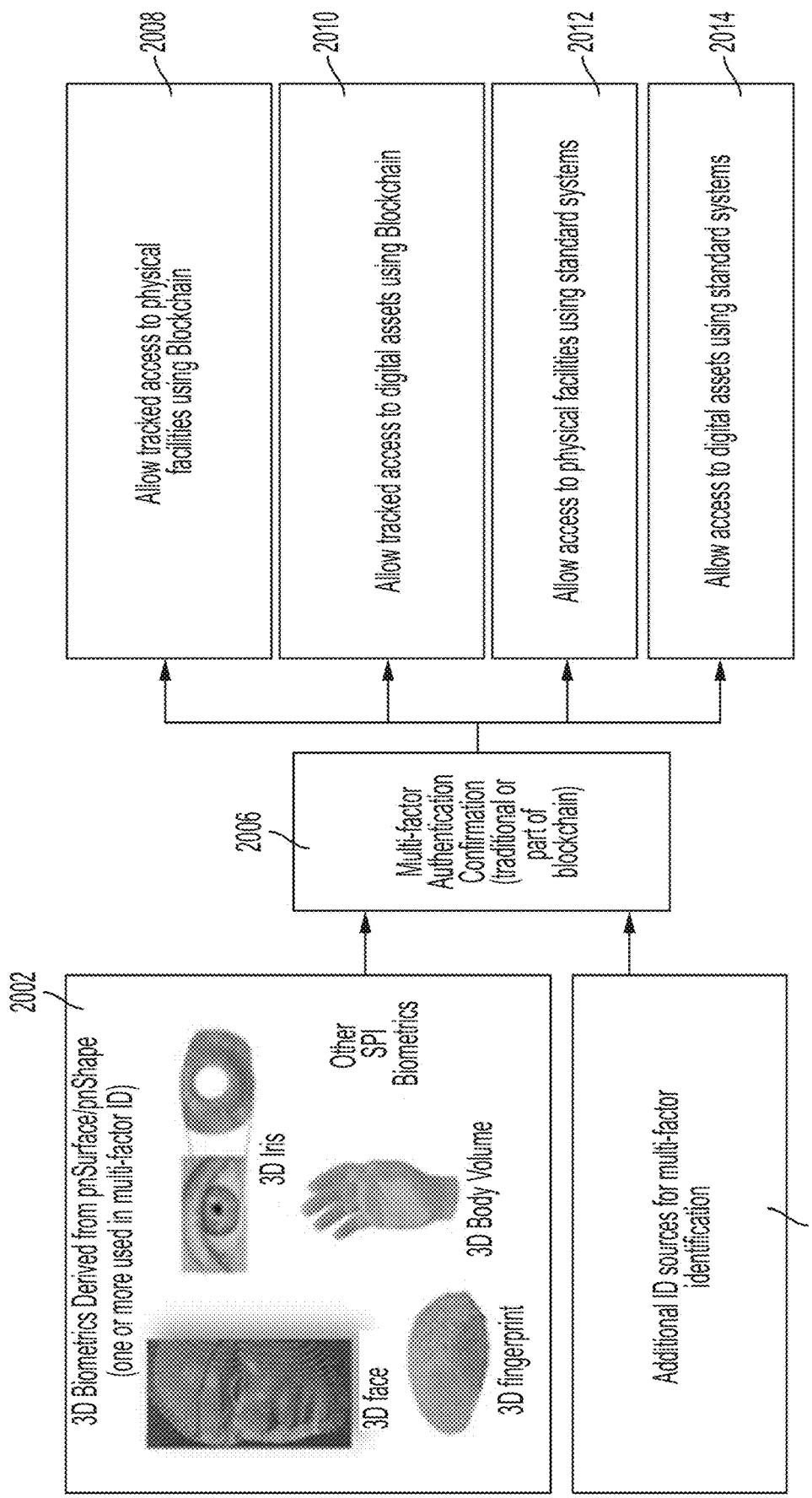
FIG. 20 shows an example of SPI-based biometrics for multi-factor authentication with blockchain or traditional methods.

The shape operating system 1900 includes a security engine 1904. In some examples, the security engine 1904 can use single- or multi-factor biometric pXSurface, pXShape, and CMOS information to identify an individual who "owns" the record that is stored by the storage engine 1902. FIG. 20 shows an example of SPI-based biometrics for multi-factor authentication with blockchain or traditional methods. As seen in FIG. 20, 3D biometric data can be obtained from the record information (e.g., pXSurface, pXShape, and CMOS information) stored by the storage engine 1902. As depicted in FIG. 20 (and in FIG. 14B), the biometric data 2002 can include pXSurface or pXShape files for face, iris, fingerprint, a body volume, etc. FIG. 20 also shows that additional identification sources 2004 can be used for multi-factor identification. The additional identification sources can include a password, a key card, a RSA (or similar) token, other biometric information, a code texted to the individual's mobile device, a required VPN, a USB key, a personal identification number (PIN), a security question, a mobile application, or any combination of these. FIG. 20 illustrates that multi-factor authentication confirmation 2006 can be accomplished using standard systems or part of blockchain.

For example, in 2008, multi-factor authentication allows tracked access to physical facilities using blockchain. In 2008, an initial block's hash can be created by biometric data as part of multi-factor authentication. Subsequently, each access point updates the blockchain (which maintains access history). Attempts to circumvent security can invalidate the blockchain.

As another example, in 2010, multi-factor authentication allows tracked access to digital assets using blockchain. In 2010, an initial block's hash can be created by biometric data as part of multi-factor authentication. Subsequently, each file access updates the blockchain (which maintains access history). Attempts to circumvent security can invalidate the blockchain.

As another example, in 2012, multi-factor authentication allows tracked access to physical facilities using standard systems. As yet another example, in 2014, multi-factor authentication allows tracked access to digital assets using standard systems. In 2012 and 2014, pNSurface or pNShape biometric data serves as an access key or unlocks other access methods. Access can be tracked using biometric data and existing access-tracking methods. Furthermore, pNSurface and pNShape biometric data creates a unique digital key that follows the user.

Figure 21:
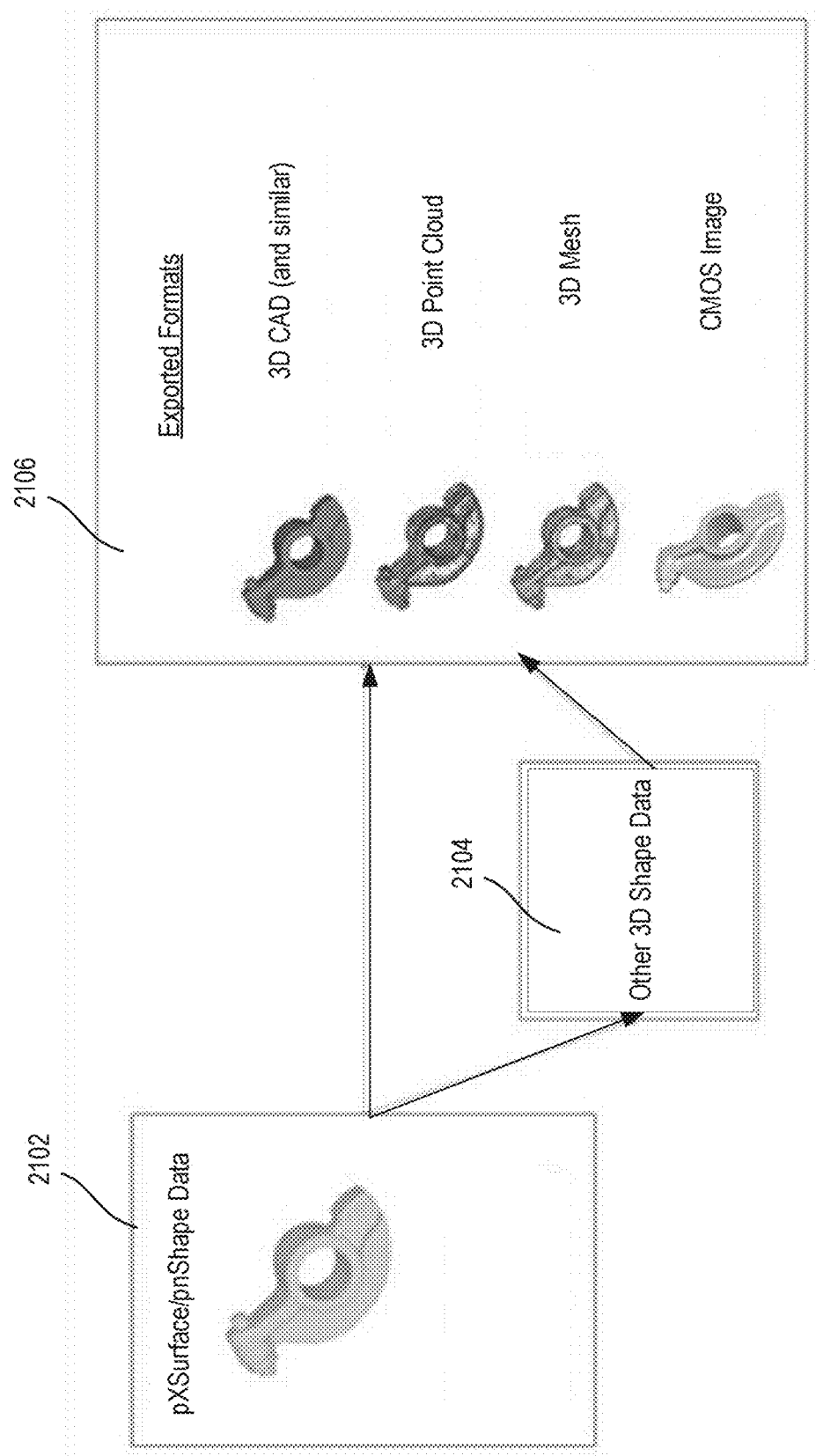
FIG. 21 shows an example of various conversions of 3D pXSurface and pXShape data to formats usable by other systems.

The shape operating system 1900 includes a transformation engine 1906. In some examples, the digital attributes of the rich data set (e.g., CMOS images and pXSurface and pXShape pixel surface) can be transformed to formats usable by other systems (e.g., commonly-used image formats such as point cloud or mesh representations). Existing 3D modelling solutions cannot directly use 3D pXSurface and pXShape data; however, by operation of the transformation engine 1906, the shape operating system 1900 can export 3D pXSurface and pXShape data (and optionally other 3D shape data) to formats usable by other solutions. For example, the SPI imaging technology produces both the pXSurface data along with a traditional CMOS image. The CMOS image can be output directly without transformation while the pXSurface data can be transformed to an appropriate point cloud or mesh file format of choice. Transformation rules can be specified for this translation, since the pXSurface data can be of higher resolution than the more traditional mechanisms used to date. As an example, pXSurface data can have micron-level resolution (e.g., which can be useful in imaging carbon fiber structures). FIG. 21 shows an example of various conversions of 3D pXSurface and pXShape data to formats usable by other systems. In 2102, 3D pXSurface and pXShape data is made available. The 3D pXSurface and pXShape data is based on surface capture using an SPI system (e.g. systems 100, 200) without point cloud or mesh representations. In 2104, other 3D shape data may optionally be combined with the 3D pXSurface and pXShape data. Examples of other 3D shape data include laser scanning point cloud data, photogrammetry data, time-of-flight data, sonic data, or other forms of 3D shape data. In 2106, the 3D pXSurface and pXShape data (and optionally other 3D shape data) are transformed to formats usable by other systems. One example is 3D CAD (or similar) data, where a 3D surface model is created for import into common 3D design solutions (e.g., AutoDesk). Another example is 3D point cloud data (which can be similar to laser scanning results) in standard formats. Another example is 3D mesh cloud data in standard formats. Another example is a CMOS image. Therefore, in addition to 3D formats, photographic imagery captured by the SPI sensor may be exported.

Figure 22:
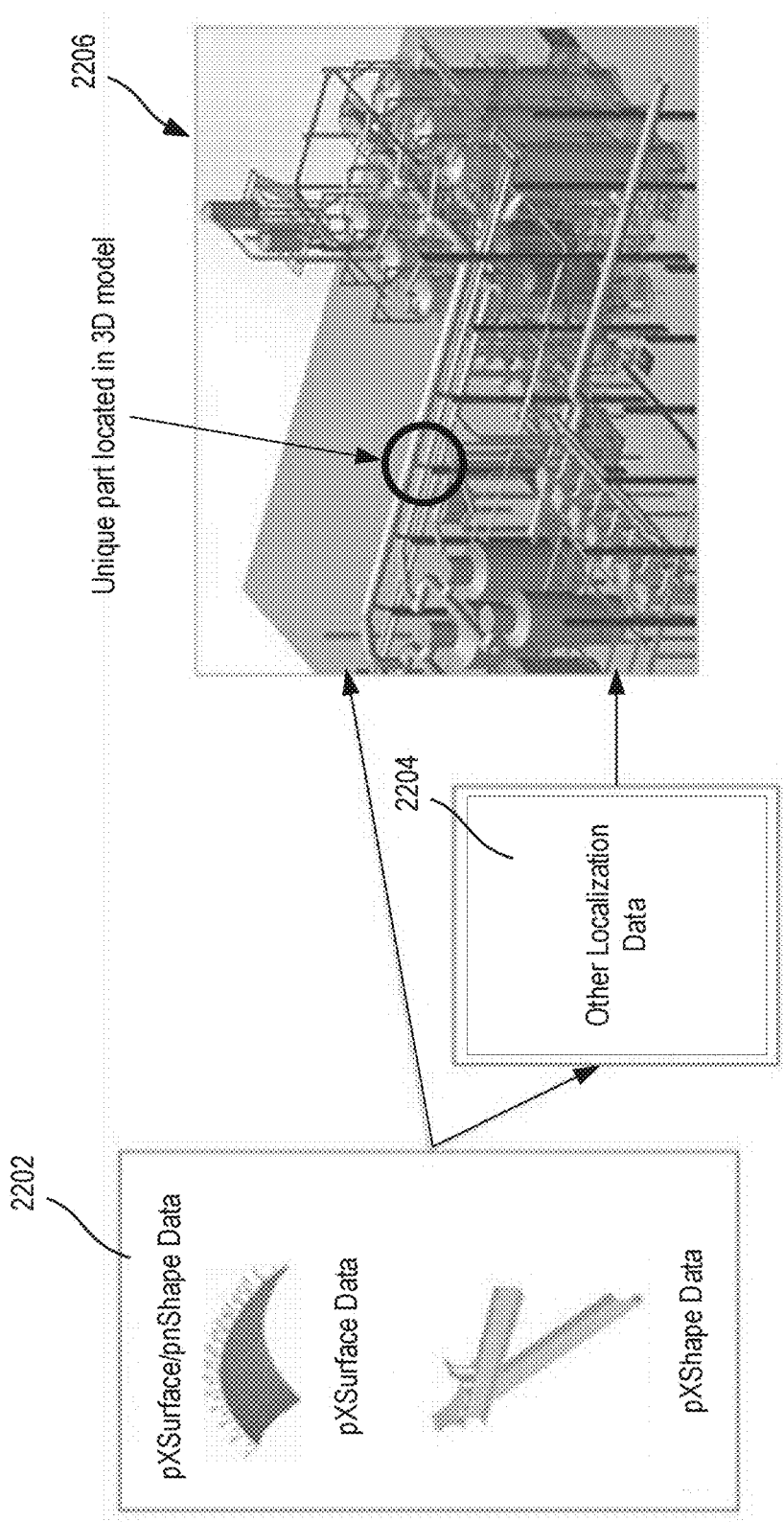
FIG. 22 shows an example of identifying a location using 3D pXSurface and pXShape data.

The shape operating system 1900 includes a location engine 1908. In the location engine 1908, the 3D pXSurface and pXShape data and the CMOS image attributes can be oriented in various coordinate systems. For example, an underlying universal coordinate system can be used to locate the pXSurface and pXShape in the world, while routines can be used to translate from this universal frame to a coordinate system of choice (which can include site coordinate systems, registration to existing point cloud monument points, etc.). FIG. 22 shows an example of identifying a location using 3D pXSurface and pXShape data. In 2202, 3D pXSurface and pXShape data is made available. In some examples, a unique 3D surface is captured using an SPI system and converted to 3D pXSurface data, while an object with a unique 3D surface is captures using an SPI system and converted to 3D pXShape data. In 2204, other localization data may optionally be combined with the 3D pXSurface and pXShape data. Examples of other localization data may include markers lie barcodes, QR codes, etc; physical markers identified in the 3D model; navigation information like GPS and ground beacons; and localization information from other sensors. In 2206, the unique part is located in the 3D model based on the 3D pXSurface and pXShape data (and optionally other localization data). In some examples, the 3D model can be updated with new 3D pXSurface and pXShape data. Furthermore, the SPI camera and sensor position can be calculated using this approach.

The shape operating system 1900 includes an analytics engine 1910. In some examples, the 3D pXSurface and pXShape data is analyzed by a plurality of techniques that are run by the analytics engine 1910, which can include the use of first principle routines as well as artificial intelligence approaches. The output of the analytics engine 1910 can enable multiple data views, which include, but are not limited to, the following: RGB color data (which provide surface and shape information); monochrome data (which provide high-contrast surface and shape details); LWIR data (which provide thermal information contributing to analysis and calculations); z-surface normals (which identify otherwise invisible boundaries and features); xy-surface normals (which find edges and boundaries and help determine whether an anomaly exists); xyz-surface normals (which enable calculations of 3D data to determine shape and surface anomalies); maximum and minimum principal curvature data (which indicate whether a surface is more curved or flat); mean curvature data (which inform expected surface characteristics); Gaussian curvature data (which describe whether the shape around a given pixel is elliptic, hyperbolic, or parabolic); synthetic skin and lighting data (which help identify depth of anomalies and other capabilities); 3D model data (which enable 3D measurement and analysis and serve to digitally tie other data layers to points in the real 3D environment); segmentation and masking (which separate elements within the same scene, examples being rails, ties, ballasts, etc.); roughness estimates (which help estimate surface roughness).

Furthermore, the output of the analytics engine 1910 can include, but is not limited to, the following: identification information; characterization information; quantification information; replication information; and variation information. To generate identification information, the analytics engine 1910 can execute routines that segment a scene into surfaces and objects of interest in the real world (e.g., to separate surfaces from each other). For example, routines exist in the analytics engine 1910 that identify the surface/shape as distinct from other objects in the scene and ultimately associate a type of real world object or segment of a real world object. For example, the set of pixels with the same normals are identified as a distinct surface from an adjacent set of pixels with a different normal, and those two sets retain the same angular relationship frame to frame indicating they are part of a bigger whole.

To generate characterization information, the analytics engine 1910 can execute routines that characterize features of the surface, examples being type of feature/defect (e.g. corrosion blister) or real world objects (e.g., elm tree leaf, specific human face, specific drone type, etc.). To generate quantification information, the analytics engine 1910 can execute routines that calculate quantifiable results such as volume of a feature or object, area covered, shape, etc. To generate replication information, the analytics engine 1910 can execute routines that generate location information for overlaying identified feature in time/space (e.g., thus providing the ability to overlay the captured image with prior images in the same location). To generate variation information, the analytics engine 1910 can execute routines that calculate results of changes to the object or to its shape over time including first and second derivative analysis (e.g., velocity, acceleration, changes in quantification information such as changes in volume, area, etc.).

Some routines that can be executed by the analytics engine 1910 to generate identification, characterization, quantification, replication, and variation information include, but is not limited to, the following: standard polarimetric surface normals reconstruction; look-up table polarimetric surface normals reconstruction; 3D reconstruction from 3+ strobed light sources; hemisphere disambiguation; polarimetric calibration; polarimetric confidence quantification; normals to 3D surface reconstruction; surface reconstruction warped with vertices from another scan modality; compressed 3D file storage; polarimetric bar code tracking; SPI face modeling; surface profile measurement; and biometrics.

Figure 23:
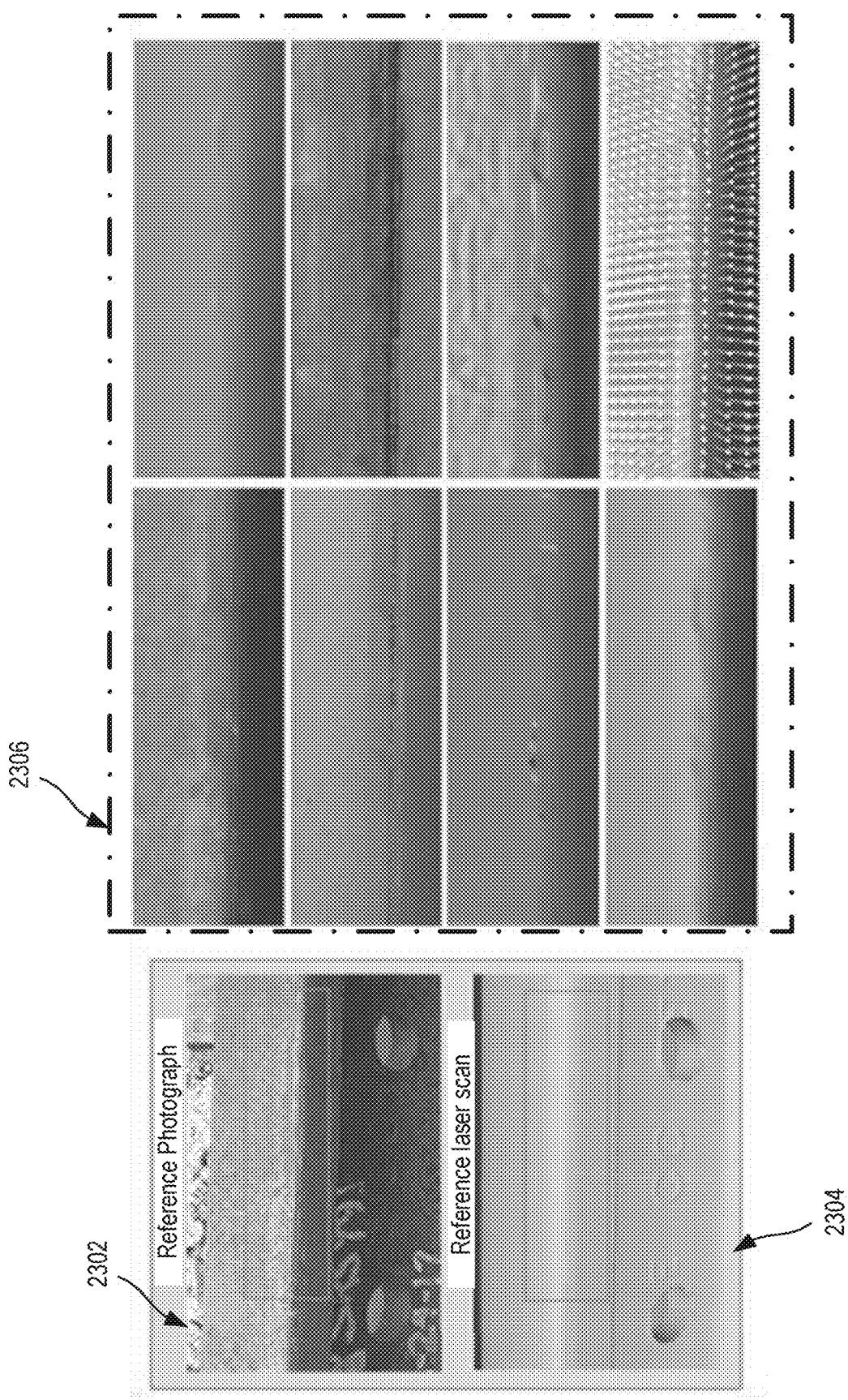
FIG. 23 shows an example of a field-capable 3D analysis generated by the analytics engine of the shape operating system shown in FIG. 19.

FIG. 23 shows an example of a field-capable 3D analysis generated by the analytics engine 1910 of the shape operating system 1900. In the example of FIG. 23, a portion of a rail is analyzed. For example, a reference photograph 2302 and a reference laser scan 2304 are compared to the variety of 3D data representations 2306 that can be generated by the analytics engine 1910 from SPI data. As seen in FIG. 23, the 3D data representations 2306 generated by the analytics engine 1910 from SPI data provides rich information about the surface and anomalies of the portion of the rail that would otherwise not have been available from the reference photograph 2302 and reference laser scan 2304.

Figure 24:
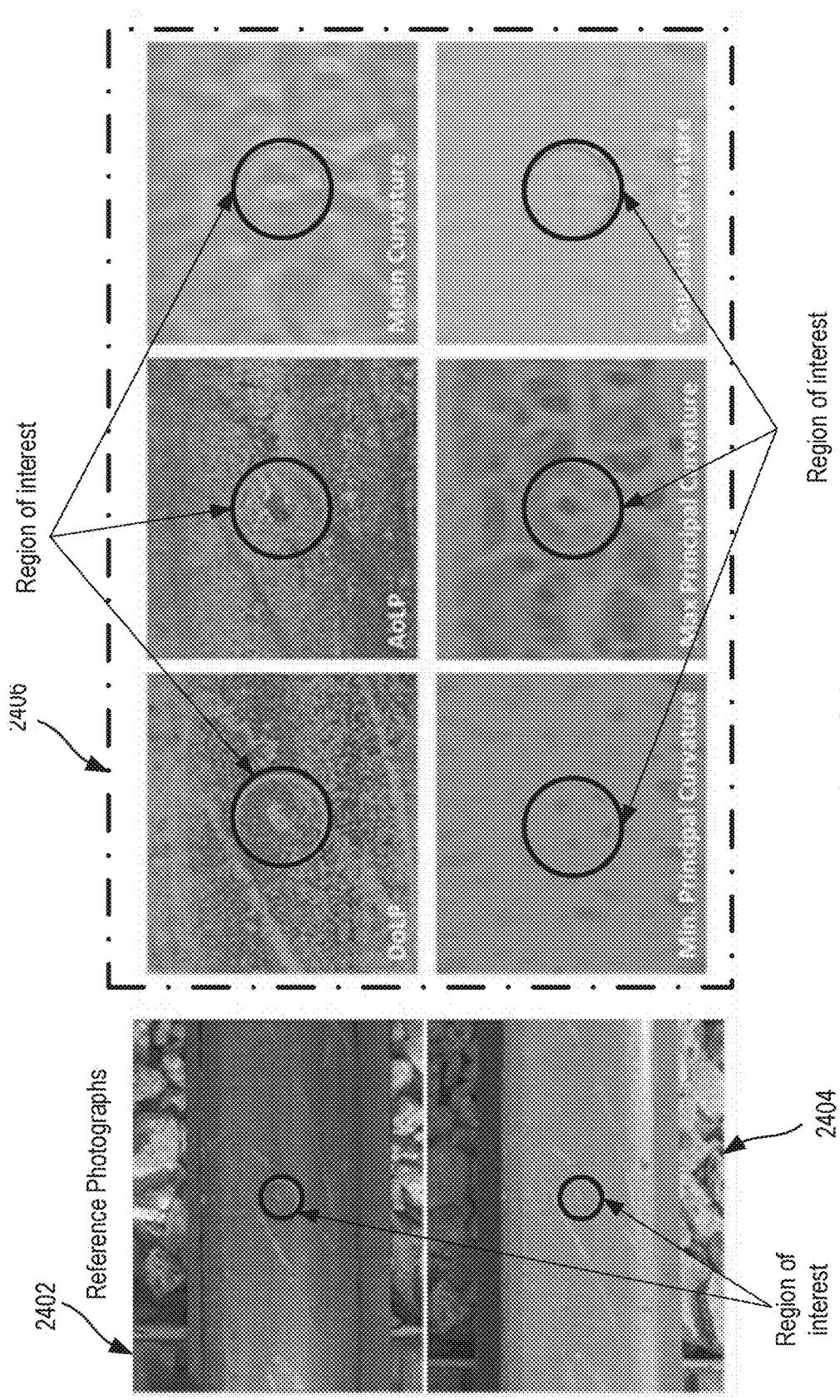
FIG. 24 shows an example of identification and characterization of an anomaly using the analytics engine of the shape operating system shown in FIG. 19.
Figure 26A:
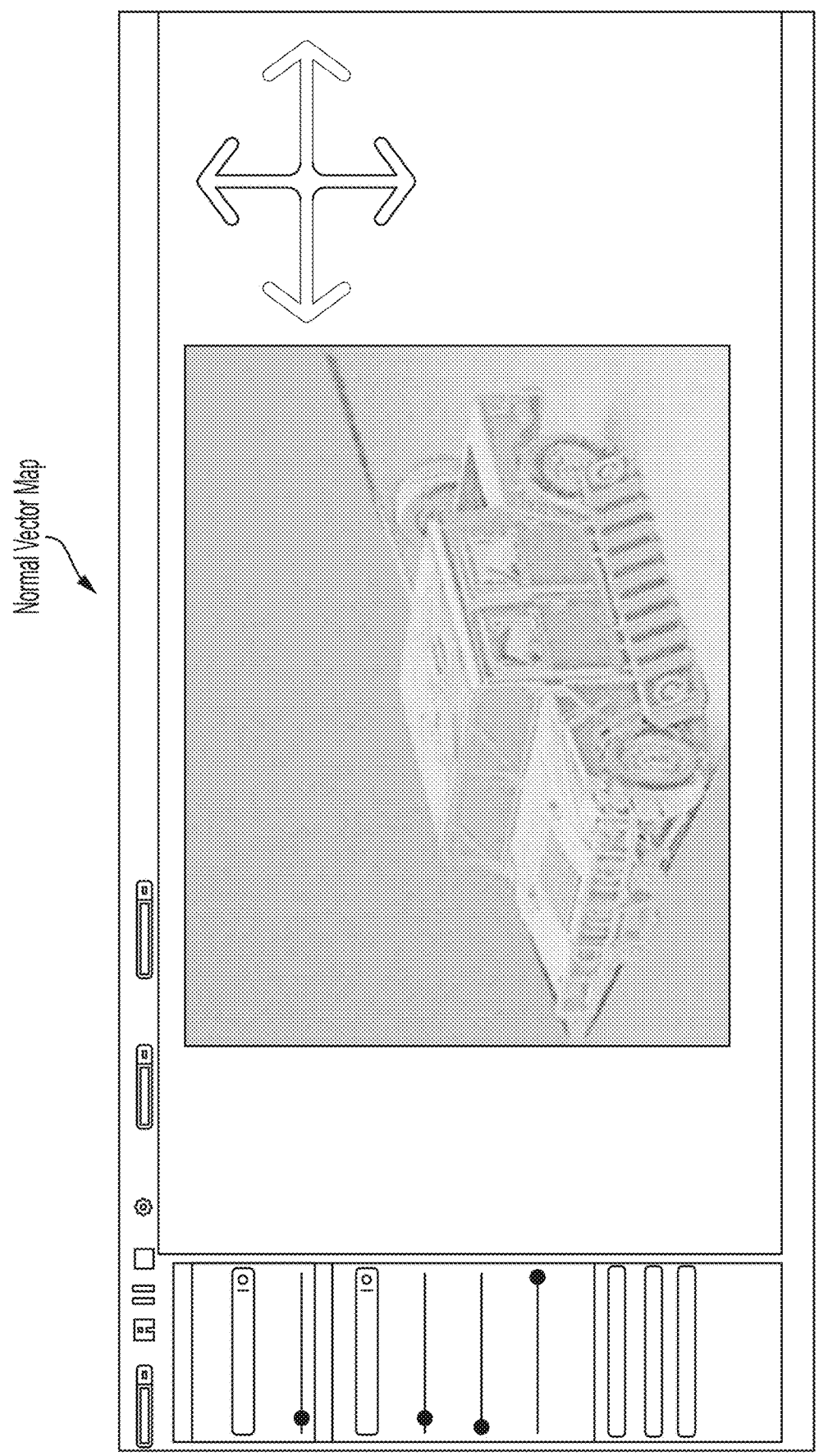
FIGS. 26A to 26D show visualizations in several modes including a normal vector map, edge map, light vector map, and angles map.
Figure 26B:
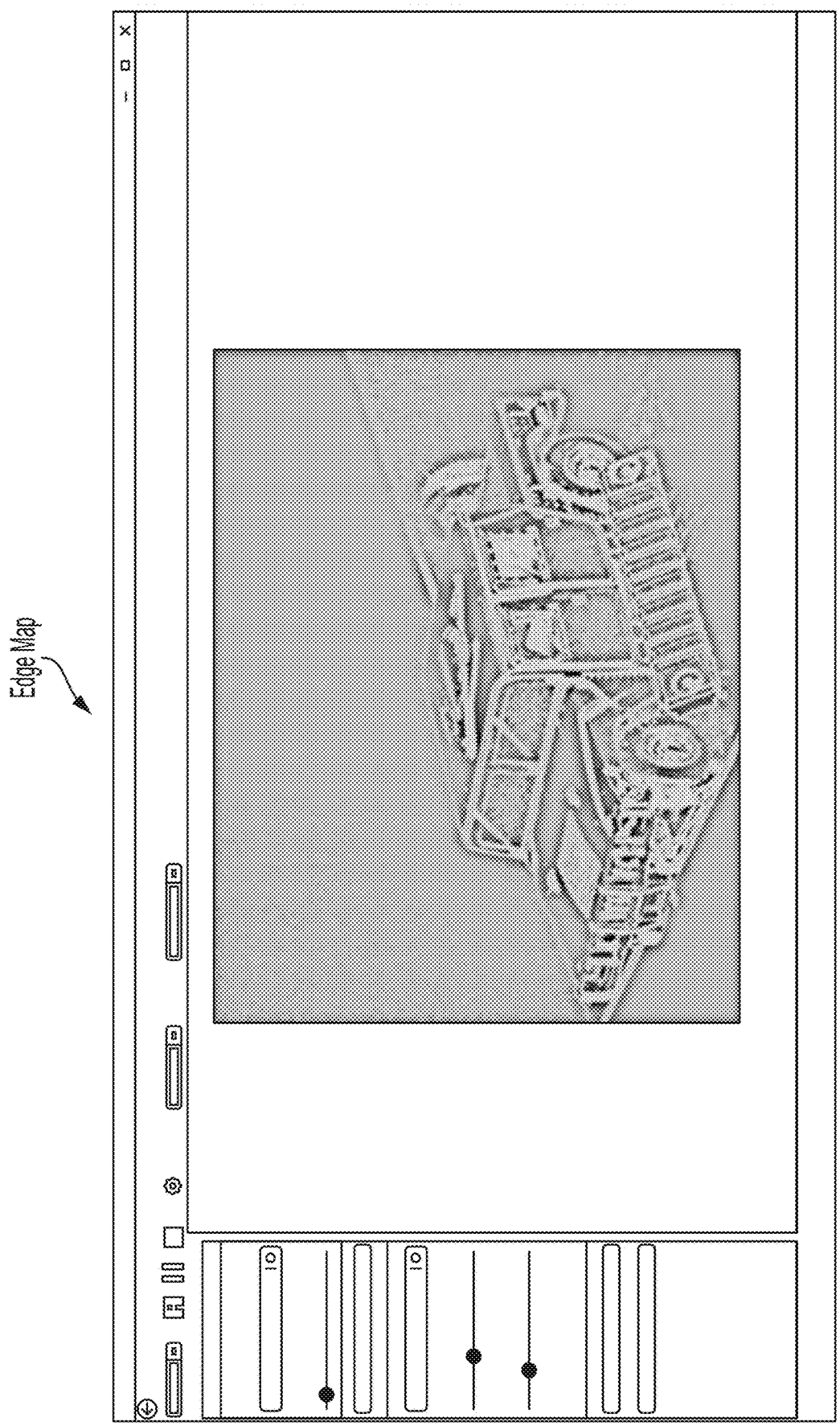
Figure 26C:
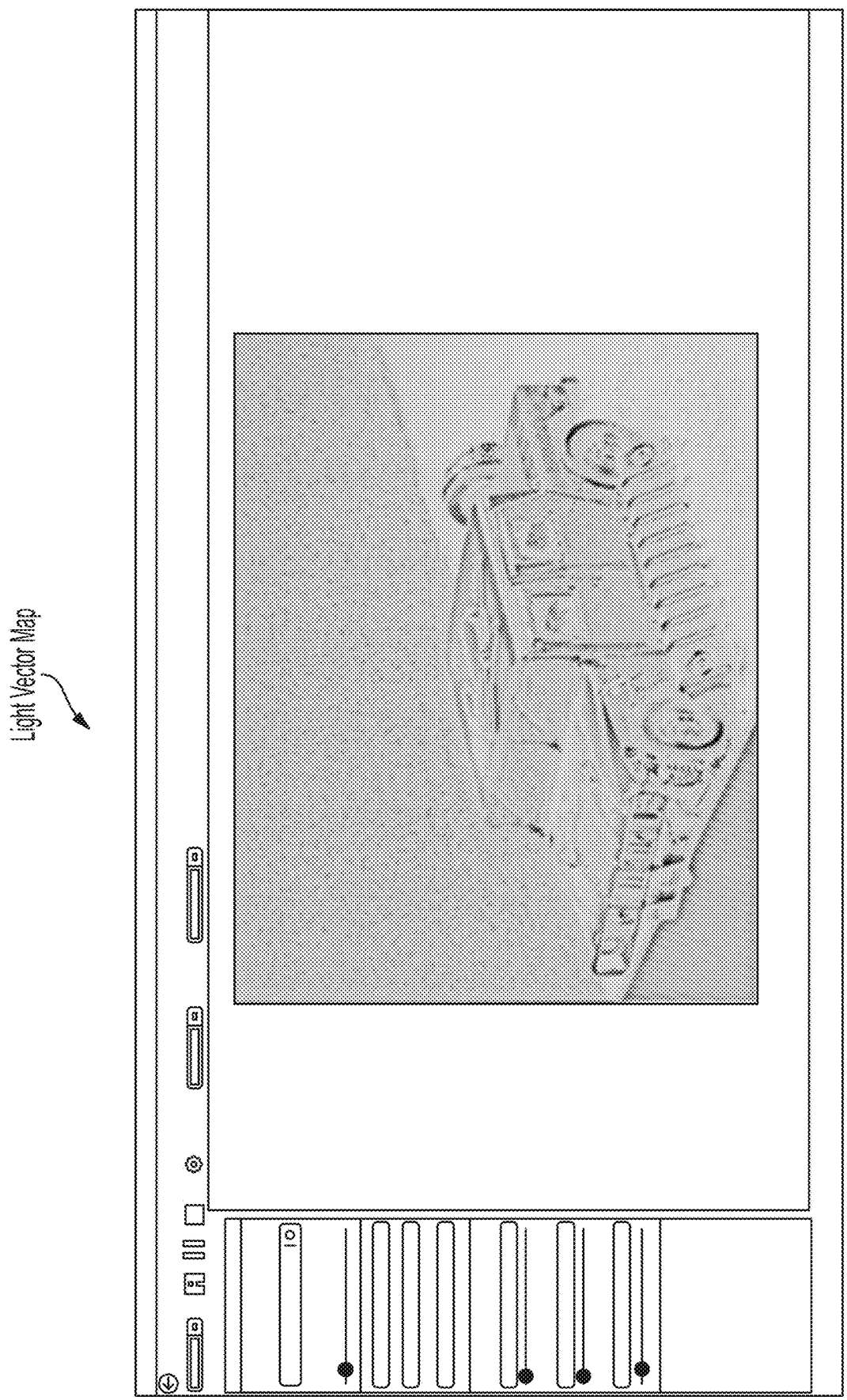
Figure 26D:
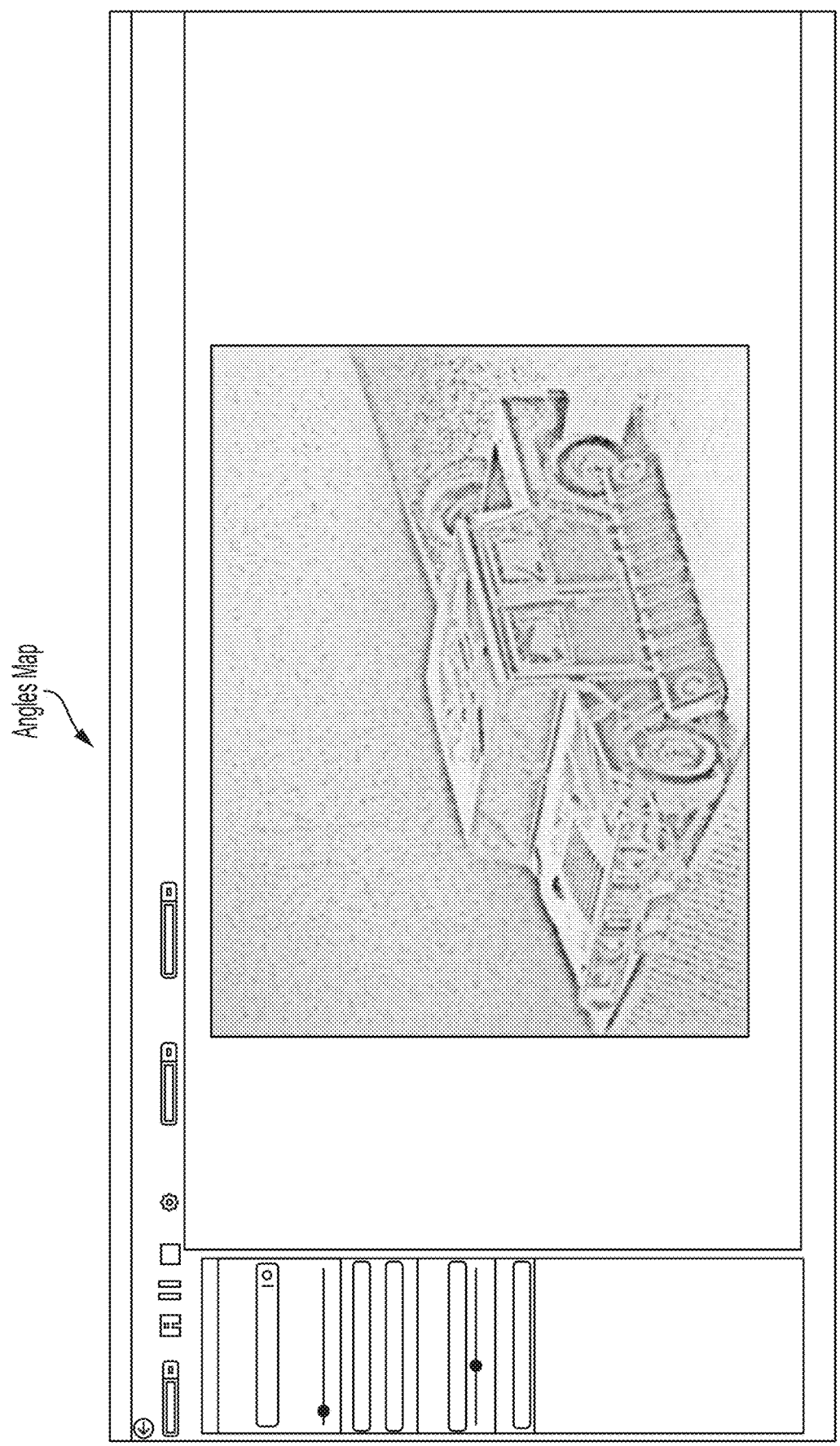

FIG. 24 shows an example of identification and characterization of an anomaly using the analytics engine 1910 of the shape operating system 1900. In the example of FIG. 24, a portion of a rail is analyzed. For example, reference photographs 2402, 2404 are compared to the variety of 3D data representations 2406 that can be generated by the analytics engine 1910 from SPI data. For example, the region of interest in the reference photographs 2402, 2404 show an anomaly; however, the 3D data representations 2406 generated by the analytics engine 1910 from SPI data provides rich information about the region of interest that would otherwise not have been available from the reference photographs 2402, 2404. In the example of FIG. 24, the 3D data representations 2406 generated by the analytics engine 1910 include a DoLP image, an AoLP image, a mean curvature image, a minimum principal curvature image, a maximum principal curvature image, and a Gaussian curvature image.

The shape operating system 1900 includes an access engine 1912. In an example, the access engine 1912, provides access to the functionalities in the analytics engine 1910, location engine 1908, transformation engine 1906, security engine 1904, and storage engine 1902. This access can be provided through the following: an SDK layer or through cloud services, thus providing other developers access to query, filter the information into output information for further analysis, storage, etc.; through a portal (e.g. described below) for human data management and interpretation; through application vertical using algorithms and technology approaches; or any combination thereof.

FIGS. 23 and 24 illustrate examples where a portion of a rail is analyzed. In these examples (and other examples where a portion of a rail is analyzed), a single 3D surface can, for example, be reconstructed by the following steps:

To Reconstruct a single 3D surface:
Capture polarization images from images from stereo cameras.
Undistort all images and rectify all stereo pairs.
Find corresponding points in stereo pairs to estimate disparity range required for stereo algorithm.
Calculate disparity, depth map, and 3D for all stereo pairs using stereo algorithm.
Calculate initial mask from the stereo data to remove outlier blobs, missing data, and other likely erroneous data.
Remove edges with edge length exceeding threshold as these are likely occlusion boundaries.
Smooth the stereo 3D to remove noise and other artifacts.
Average left and right polarization images (using the disparity estimate) to reduce noise.
Calculate polarization normals from images averaged above.
Use normals from smooth stereo to label the hemisphere of the polarization normals.
Smooth the polarization normals to remove noise.
Using smooth stereo as the initial 3D vertex locations, refine the shape by integrating the polarization surface normals.

Additionally, registration of multiple frames of the portion of the rail analyzed can be performed, for example, by the following steps:

To Register multiple frames:
Estimate a rotation and translation (R/T) matrix from 2D point correspondence between the current frame and the previous frame captured from this stereo camera. The R/T matrix can achieve both image rotation and pixel translation in a single function using a consistent coordinate frame defined by the first image in a set of 2 or more images.

Temporarily remove points not near each other (and points with normals not pointing roughly in the same direction) from the current frame from stereo pair #1 and the current 3D frame. These temporary meshes are used to improve the accuracy of the ICP convergence below.

Refine R/T matrix from ICP using the current frame from stereo pair #1 as the bash mesh and the current 3D frame as the surface to be aligned.

Transform the mesh using the R/T matrix, such that all meshes are aligned in the world coordinate system.

Additionally, integration of multiple frames of the portion of the rail analyzed can be performed, for example, by the following steps:

To Integrate multiple frames:
For the current oldest 3D frame, find the plane that separates vertices only visible in this frame from vertices also visible in the next frame. When saving data, only this "unique" slice may need to be saved out.

For the current oldest 3D frame, render all overlapping meshes from the perspective of the current oldest 3D frame. Record the vertex value for each pixel.

Remove vertex values that have the same pixel value, but are far away from the current vertex. Also remove vertex values whose normals don't point in roughly the same direction as the current vertex.

Record remaining vertex values for all successive 3D scans in the same frame. These can be deleted when processing future frames to avoid duplication of points when saving data.

For each rendered mesh, compute a vertex weight equal to the inverse of it's squared distance (in number of edges) to an edge of the mesh.

Average rendered vertices with identical pixel locations using the weights of the previous step and add them to the 3D slice for this frame.

Connect near vertices in the current mesh slice with the previous mesh's slice (to remove gap introduced by our cutting plane).

Repeat until all frames have been processed.

FIG. 25 shows an example portal 2500 that can be used to provide access to functionalities in the shape operating system 1900. The portal 2500 can be used by a user to preview, record, and process data in real time. It offers visualization in several modes including a Normal Vector Map (e.g., shown in FIG. 26A), Edge Map (e.g., shown in FIG. 26B), Light Vector Map (e.g., shown in FIG. 26C), and Angles Map (e.g., shown in FIG. 26D). In some examples, the portal 2500 includes four main panes that helps users acquire and process frames with flexibility, the example panes being a main pane 2502, a settings pane 2504, a multi-view display pane 2506, and a reports pane 2508. The various modes (e.g., Normal Vector Map, Edge Map, Angles Map, and Light Vector Map) can be displayed in the multi-view display pane 2506, as seen in FIGS. 26A to 26D.

As discussed above, the digital architecture approach can also manifest as a technical platform approach (e.g., a specific set of combinations to create a standalone application-level platforms providing a limited set of outputs). The platform approach is a structured collection of existing digital information as well as the new surface, shape and application level capabilities bundled in such a fashion as to present a comprehensive solution for a major activity set such as inspection workflows, dermatological assessment, etc. The platform approach can be implemented as an operating system and at the application level with a digital twin that provides a platform for fully autonomous inspection and maintenance of a physical asset. In some examples, a healthcare platform provides a platform for self-awareness, assessment, and recommendations for the human body.

In an example, a digital twin autonomy platform is provided. The digital twin cognitive autonomy platform can provide passive, high-resolution, dynamic, real-time or near-time 3D sensing and analytics for advanced 3D surface inspections, predictive analysis, and digital twins, and the technology can serve as the base platform for additional functionalities.

The core of the digital twin cognitive autonomy platform is SPI technology and sensors. The SPI sensors capture the additional rich dataset (e.g., described above). With this added dataset and corresponding analytics, inspections have a verified 10× improvement over traditional general inspection technologies and provide time-based to risk-based data, to integrity-based capture. For example, traditional inspection methods are labor intensive and subjective to each inspector. Furthermore, data obtained using traditional inspection methods are generally collected without a 3D reference and expressed in the form of written reports. With traditional inspection methods, digital twin creation and updates require separate, expensive, and complex workflows to interoperate with manual inspections. In contrast, in the digital twin cognitive autonomy platform, inspections are automated and repeatable. Furthermore, all collected data is referenced in a 3D frame. Inspection data are 3D referenced to enable time-series analysis, re-engineering, computational modelling, and other advanced activities. Furthermore, in the digital twin cognitive autonomy platform, inspections are easily automated using drones, crawlers, permanently-installed sensors, and other automation systems.

The digital twin cognitive autonomy platform, as a whole, offers inspection, maintenance, and change workflows that are more efficient and effective than current systems. As such, maintenance and data integration costs are lower, data can be more effectively updated and analyzed over time (change analysis, deep analysis for new insights, etc.), and safety is increased. Autonomous inspections and simultaneous digital twins can also be a reality.

The digital twin cognitive autonomy platform can eliminate inspection and maintenance processes and replace them with the concept of continuous monitoring as the digital architecture evolve to a capability of not only performing high-quality autonomous non-destructive testing (NDT) and digital twinning but also to find, track, locate, and uniquely identify multiple fast-moving objects and extract objects from their environments. As SPI sensors capture and output 3D real-time surfaces at the pixel level, the benefits of the technology include, but are not limited to, improved personnel tracking and monitoring, robotic data capture devices recognition and ranging, streamlined real-time or near-time processing. This enables facilities to be "self-aware" and "self-healing" through highly autonomous approaches.

Figure 27:
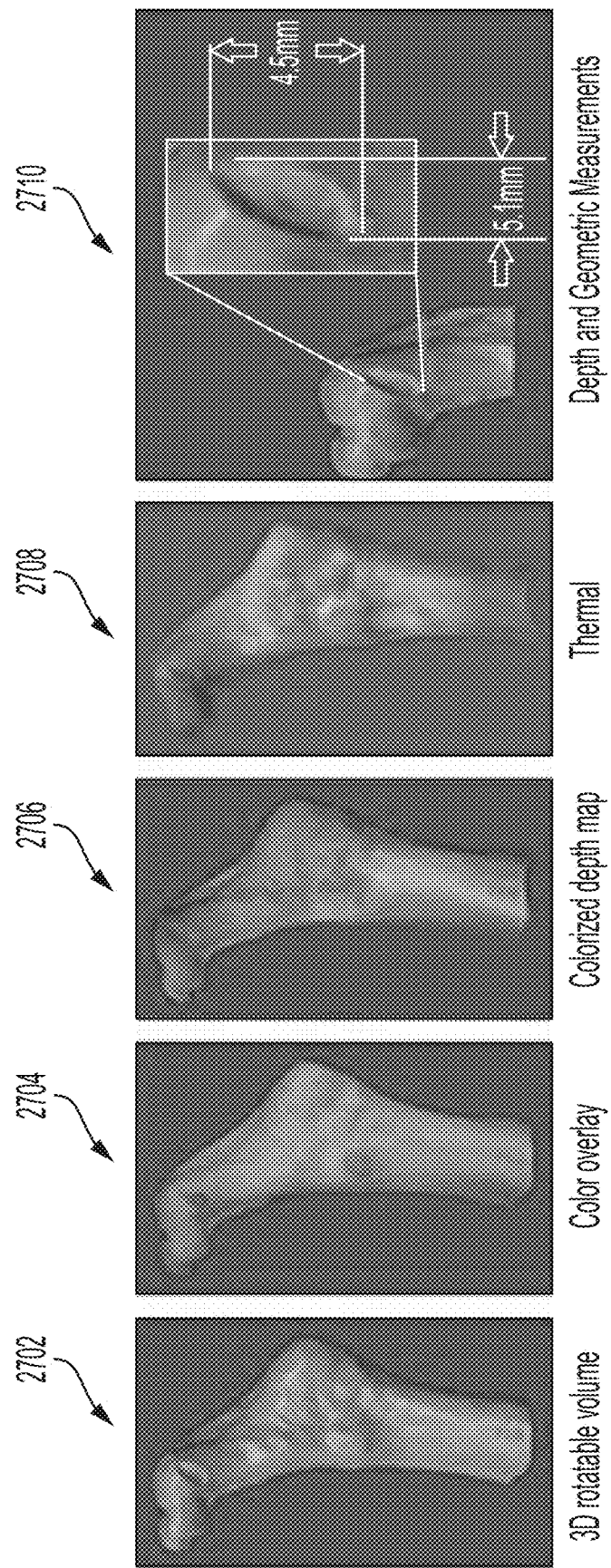
FIG. 27 shows an example of multi-layered image correlation in a 3D rotatable volume, color overlay, colorized depth map, and thermal image.

In another example, a healthcare platform is provided. As seen from the various examples above, SPI provides healthcare providers with the breakthrough capability of multi-spectral wound, pathogenic and metabolic assessments. The SPI 3D data can fill the gap at the point-of-care by creating tissue data that current medical imaging modalities (e.g., X-Ray, MRI, CT) do not address. The healthcare platform can passively and remotely detect, identify, classify, and track certain diagnostic parameters. The system can include an SPI-enhanced cluster of miniaturized sensors. Blockchain-enhanced data encryption combined with the above-described biometric identification applications can be added to the system to provide a patient's unique identity and confidentiality. Capabilities of the healthcare platform include: multi-layered image correlation in 3D, thermal, full color; multifactor identification (e.g., face & finger identification) with a blockchain network; wound care assessment; epidermal scanner; thermal scanner; and the ability to tie into existing healthcare databases. As an example, FIG. 27 shows an example of multi-layered image correlation in a 3D rotatable volume 2702, color overlay 2704, colorized depth map 2706, and thermal image 2708. Furthermore, the healthcare platform can perform depth and geometric measurements 2710, as seen in FIG. 27.

The healthcare platform can operate in conjunction with 3D AI-enhanced touchless medical devices that are equipped with SPI sensors. The benefits of 3D AI-enhanced touchless medical devices include: determination of the color, size, and depth of the medical issue; accurate blood flow observations; treatment or wound care tracking over time; no longitudinal analysis of progression over time; and the provision of new diagnostic information of 3D wound images for patient and doctors. Additionally, 3D data may be preferred for accurate Artificial Intelligence (AI).

The healthcare platform can operate in conjunction with minimally invasive 3D optical/AI sensors that are also equipped with SPI sensors. The benefits of 3D AI-enhanced minimally invasive medical devices include: accurate determination of the color, size, and depth of the medical issue; accurate vessel and nerve positions; treatment or wound care tracking over time (e.g., colonoscopies); and more accurate robotic manipulations. Additionally, 3D data may be preferred for accurate Artificial Intelligence (AI).

In another example, a public health monitoring platform is provided. In some examples, the public health monitoring platform is a real-time or near-time platform of applications and hardware capabilities that analyze and manage storage, privacy, distribution, and transformation of public health specific biometric information captured from SPI sensors. The public health monitoring platform includes facial, iris, fingerprint recognition security capabilities as well as vital health data captured contactlessly via the SPI sensor suites (e.g. health assessment of individuals entering a major sporting event). The public health monitoring platform also incorporates integration and interoperability with a healthcare operating system platform. The public health monitoring platform also includes the use of the system for monitoring and tracking public health information such as pandemic spread (e.g. COVID-19) or other world interest health items.

The public health monitoring platform can improve healthcare by providing a high-resolution, real-time or near-time 3D sensor, analytics, and AI diagnostic platform. The public health monitoring platform enhances touchless telehealth and minimally invasive diagnostics or surgeries by enabling patients to receive a higher quality of care while providing doctors with not only remote/secure diagnostic information but also real-time or near-time 3D minimally invasive tools. Furthermore, in the public health monitoring platform, 3D surface mapping technology is incorporated into drones, security systems and other consumer IoT products to apply specific AI algorithms that can detect temperature, oxygenation, blue lips, sweating, cough, shortness of breath to build specific viral detection. With a wide distribution of SPI sensors in many platforms, the public health monitoring platform can track the spread of any virus and infectious diseases. The data can be immediately uploaded to tracking systems that can create immediate reporting to help rapid containment.

Figure 28:
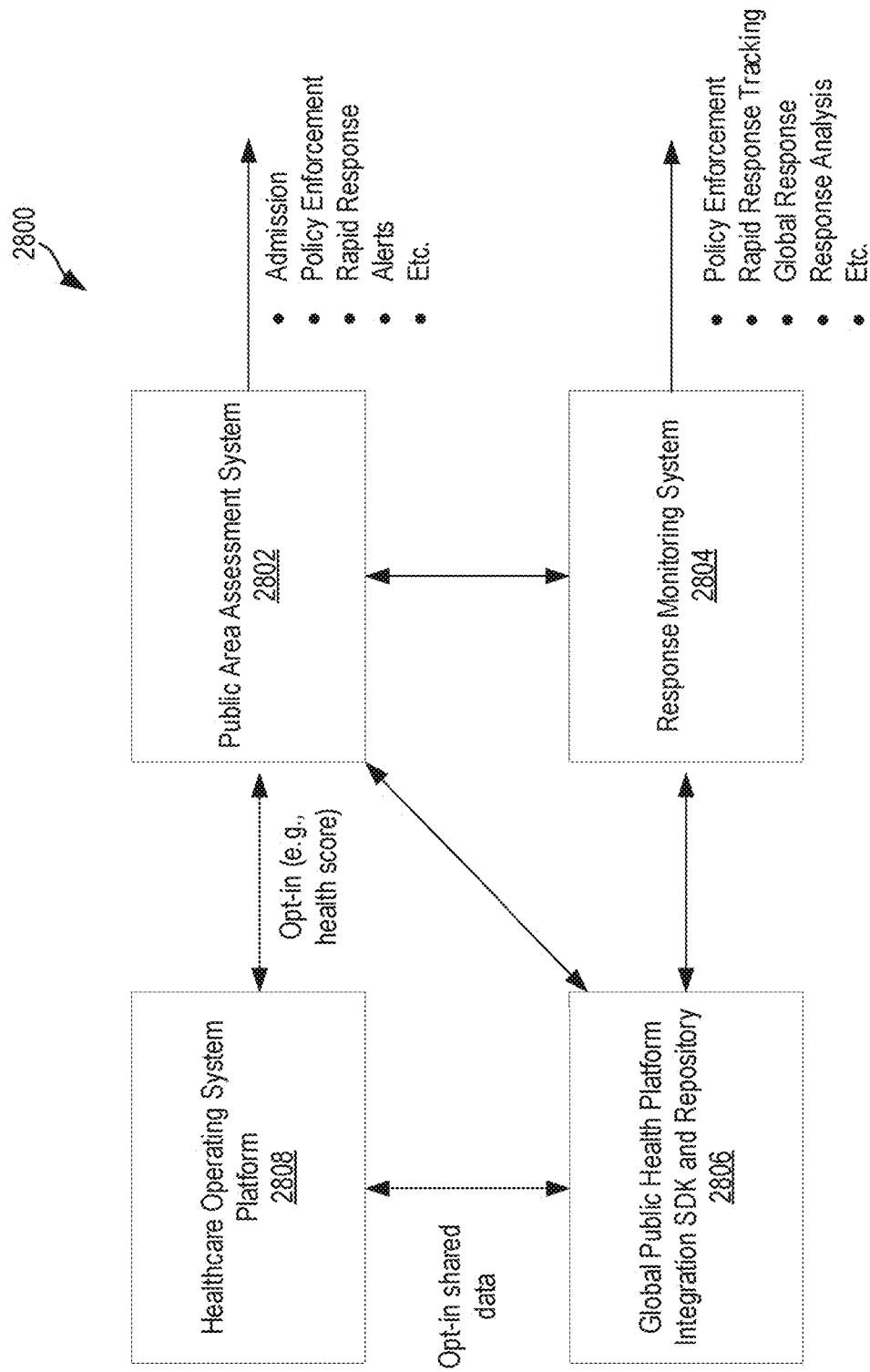
FIG. 28 shows example components of a public health monitoring platform.

FIG. 28 shows example components of a public health monitoring platform 2800. In some implementations, the public health monitoring platform includes a public area assessment system 2802, a response monitoring system 2804, a global public health platform integration SDK and repository 2806, and a healthcare operating system platform 2808.

Referring to the public area assessment system 2802, SPI sensor technology can be incorporated into drones, security systems and other consumer IoT products in many platforms, thus creating the ability to assess the condition of individuals and surfaces such as bathroom and food areas in real time. Furthermore, touchless capability provided by SPI sensor technology allows diagnostics at safe distances, applying specific AI algorithms that can detect, for example, temperature, oxygenation, blue lips, sweating, cough, shortness of breath. This data can be used to build specific viral detection databases which can be uploaded to tracking systems for immediate reporting of spread, thus allowing for rapid containment procedures to be applied. Biometric vitals obtained in a 3D approach allows different parts of the human body to show context of the vitals to the body (e.g. forehead thermals vs. cheeks vs. neck vs. lips), thus providing a greater level of precision and accuracy for improved assessment leading to diagnostics. SPI sensor technology can be used in the public area assessment system 2802 to monitor surface conditions of sinks, doorknobs, restaurant areas, etc. In some implementations, the public area assessment system 2802 is configurable to new health threats and new policy directives and allows for a policy-based outcome from the health score assessment (e.g. don't let someone into a sporting event until they have been examined on site by a medical professional). In some implementations, the public area assessment system 2802 can provide real time alerts of potential health threats of individuals including tracking information. The public area assessment system 2802 can provide health analytics at each facility, which can be passed on to the response monitoring system 2804 and/or the global public health platform integration SDK and repository 2806.

In some implementations, the response monitoring system 2804 can be a combination of multiple facilities' health analytics to have a local, nationwide and global assessment. The response monitoring system 2804 can also manage critical supply logistics. For example, autonomous driving and navigation of trucking, transportation and movement of people with 3D AI surface mapping systems can map the world at an effective resolution to have actionable intelligence on what is ahead and what to expect. Supply chains can be enhanced through the application of 3D shape-based AI to find, track, and identify packages and people, review the same for damages, provide enhanced biometric, facility and vehicle security and analysis, and provide real-time or near-time 3D AI for autonomous deliveries. The response monitoring system 2804 can also include an additional set of AI applications can monitor persons for emotion, fatigue, deception, and pain. For example, as the Corona Virus-COVID-19 epidemic grows, other pandemics can be monitored and compared (e.g., the H1N1 (Spanish flu) and SARS) to observe whether these contagious diseases are spreading faster and wider. A touchless, multi-modal, AI-enhanced telemedicine solution provided with the response monitoring system 2804 can assist doctors and facilities not only with in-remote diagnostics but also in alleviating the overcrowding in emergency rooms and clinics.

In some implementations, the global public health platform integration SDK and repository 2806 provides public area surveillance and assessment (e.g., for events, parks, airports, etc.). The data uploaded to tracking systems can be immediately analyzed and reported to help rapid containment. The global public health platform integration SDK and repository 2806 includes a tracking system including a database that links to other systems such as WHO, government databases, insurance databases, etc. which can show the spread of the pandemic over time and geography and allow for quicker determination of risk areas and individuals carrying the pandemic. The global public health platform integration SDK and repository 2806 also allows the sharing of data with emergency, crisis response teams, local hospitals, government agencies, etc. for incorporation into existing response systems. Furthermore, global public health platform integration SDK and repository 2806 provides analysis and integration of personal and physician background vital information of the individual under an opt-in approach for improved medical analysis and individual treatment and response.

In some implementations, there may be opt-in interactions with the healthcare operating system platform 2808. In some examples, opt-in interactions may be based on a health score, which can be a medically vetted health score based on algorithms to analyze biometric vitals into potential symptomatic categories such as cold, flu, heat exhaustion, pre-existing conditions, etc. Opt-in of individuals allow their private, continuously monitored health information be provided to the components of the public health monitoring platform 2800. Health information that is monitored include coughing, sneezing, blue lips, body temperature, shortness of breath, emotion and pain recognition, oxygen levels, bacteria monitoring and other medical data. Furthermore, vitals trending over long periods of time provide further information for correct diagnosis (e.g. single measurement in time of an individual captured by the public area assessment system for entry to a sporting event may indicate an elevated temperature and sweating condition but that individual may have just sprinted to the gate in order to meet up with a friend; likely resulting in an incorrect flagging for more medical assessment prior to entry). Security and privacy can be addressed through blockchain capability in the healthcare operating system platform 2808, ensuring privacy concerns of the individual are under control of that individual. Healthcare specific routines that can be run by the healthcare operating system platform 2808 include, but are not limited to the following: wound care; epidermal scanning; temperature profiles; blockchain security; doctor-patient portal; oxygenation; bacteria monitoring and identification; podiatry routines; ocular routines; shape and weight analysis; vein analysis; tissue analysis; analysis of stroke symptoms; healing assessment; assessment of ENT vitals; monitoring of glucose levels; and monitoring of blood pressure.

Figure 29:
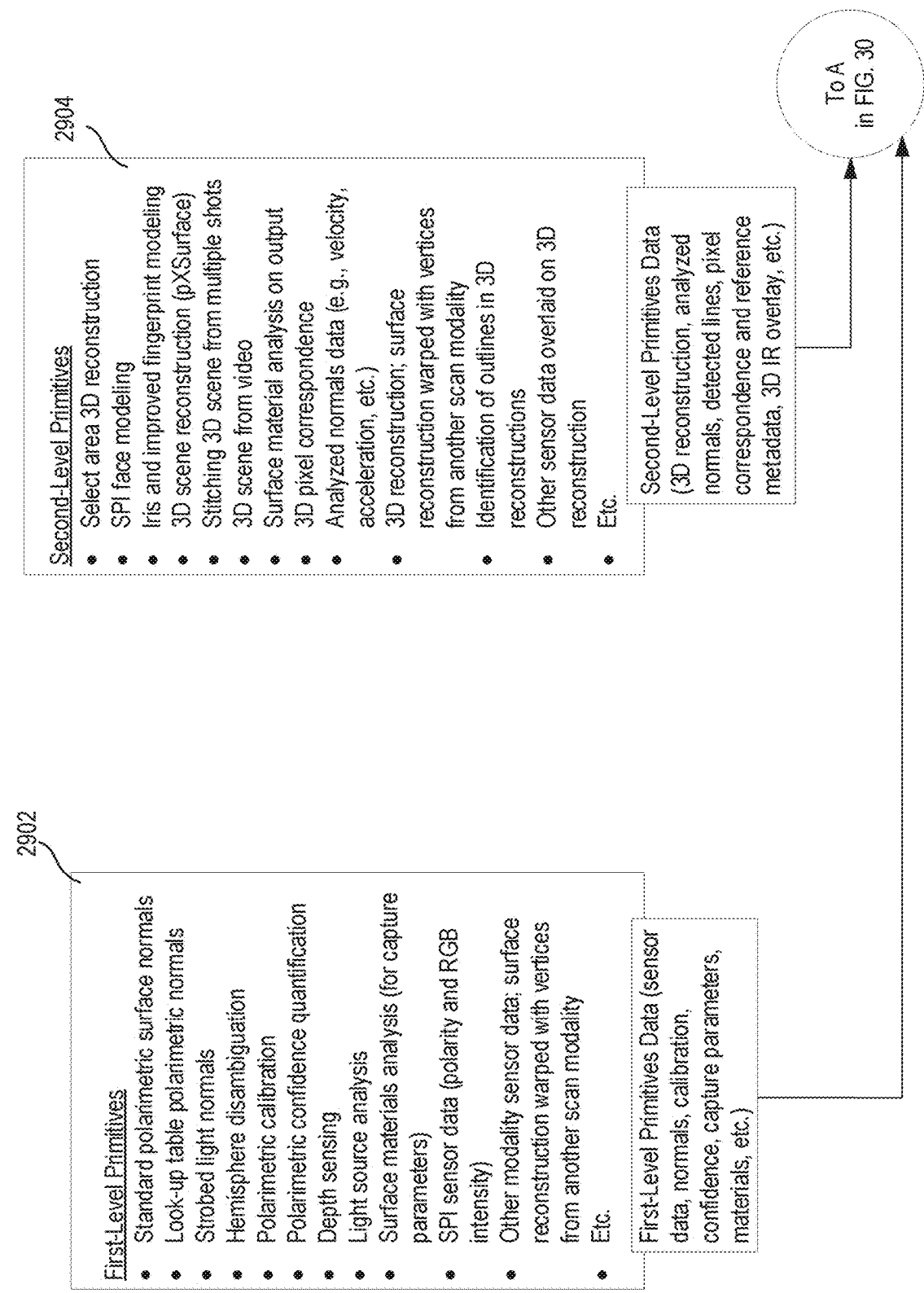
FIGS. 29 and 30 show an example framework for an SPI system.
Figure 30:
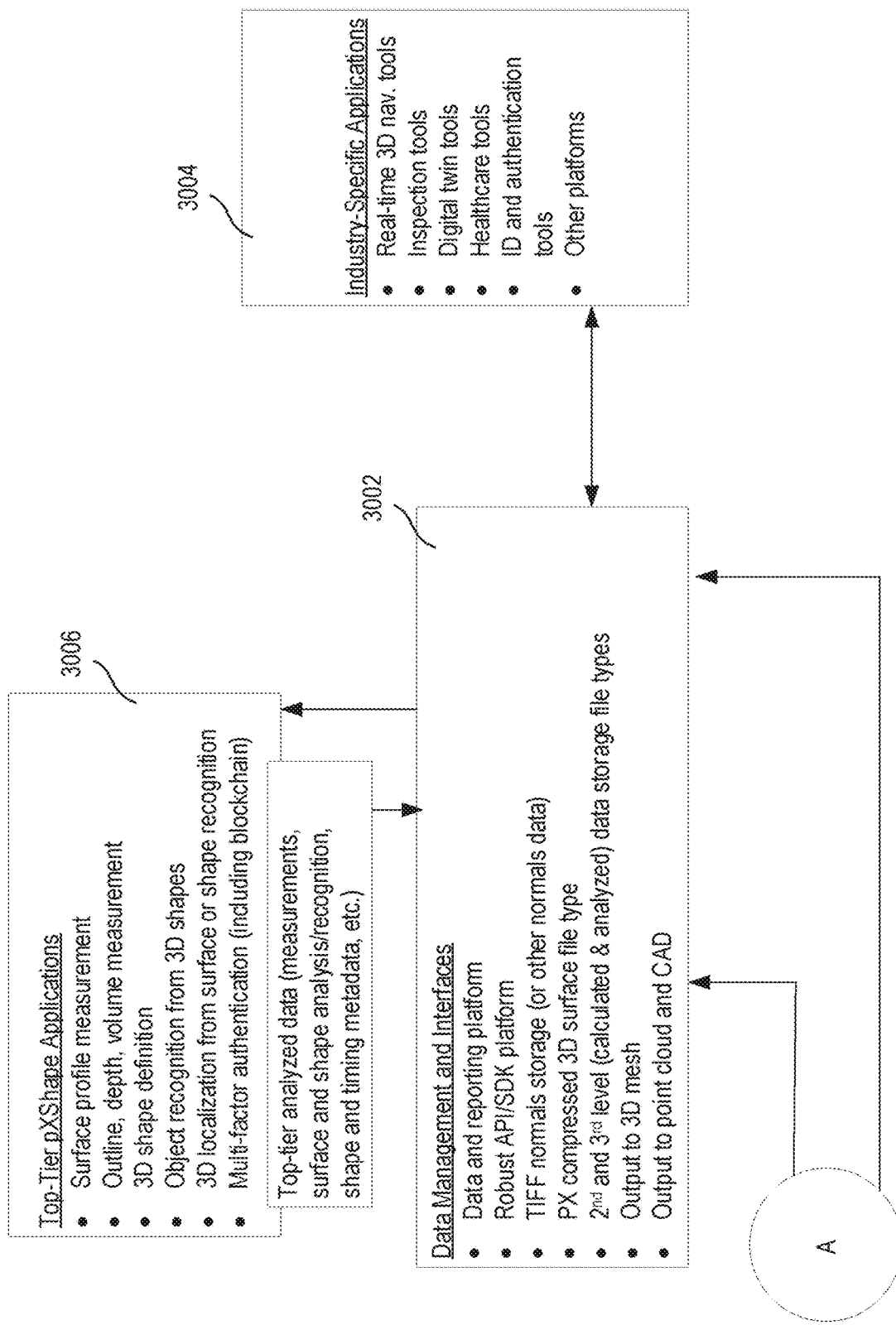

FIGS. 29 and 30 show an example framework for an SPI system (e.g., the SPI systems 100, 200). FIGS. 29 and 30 harmonizes the various aspects described above. In FIG. 29, first-level primitives 2902 and second-level primitives 2904 are generated from SPI and other sensor data. The first-level primitives 2902 and second-level primitives 2904 listed in FIG. 29 are merely examples and can further include other primitives described above. The first-level primitives 2902 and second-level primitives 2904 are provided to data management and interfaces 3002 (shown in FIG. 30). Industry-specific applications (e.g., platforms) access the first-level primitives 2902 and second-level primitives 2904 via the data management and interfaces 3002. Similarly, top-tier pXShape applications also access the first-level primitives 2902 and second-level primitives 2904 via the data management and interfaces 3002.

Some of the subject matter and operations described in this specification can be implemented in digital electronic circuitry, or in computer software, firmware, or hardware, including the structures disclosed in this specification and their structural equivalents, or in combinations of one or more of them. Some of the subject matter described in this specification can be implemented as one or more computer programs, i.e., one or more modules of computer program instructions, encoded on a computer storage medium for execution by, or to control the operation of, data-processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

Some of the operations described in this specification can be implemented as operations performed by a data processing apparatus on data stored on one or more computer-readable storage devices or received from other sources.

The term "data-processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array), AI processor or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. Data processing may be performed by any and all processing types such as quantum processors, light field, etc. not just conventional computer chips of today. Computer storage medium includes any and all storage approaches be they SSD, optical, quantum based, photonic, biological, etc.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

To provide for interaction with a user, operations can be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

In a general aspect, a data management system for spatial phase imaging is described. A rich data set of first order primitive physical values including angular information can be obtained at the pixel level. This includes RGB, intensity, angle, and second order primitives of derived values based on those first order primitives. That same set of first and second order primitives can be used to segment a set of pixels into surfaces bearing similar properties. Those surfaces can then be represented with its own specific set of first order and second order primitives whose values are attributed to the entirety of the surface. A significant number of applications can be constructed based on just this set of data without any further analysis—e.g. autonomous driving, scene segmentation, etc. which don't require any further knowledge about the surface other than its existence, extent and location in a defined coordinate space. Surfaces themselves and relationship of surfaces to each other can further be derived and used in applications and further calculations—e.g. surfaces representing angular relationships of panels of a vehicle demonstrate invariance to orientation and thus represent a higher order object representing a real world shape of interest. This next level of information overlay can be used in applications to further characterize and provide useful information about the real-world objects such as a wood surface from glass from metal, type of vehicle, volume occupied, etc. Repeated measurements of the surfaces and shapes within a localized coordinate space and/or measurements of the deltas of the same surfaces and shapes in time/space can be further analyzed (e.g. change in shape/size can reveal growth or speed/acceleration). Various mathematical techniques, equations, AI approaches, etc. can be used to process the pixel level, surface level and shape level data to further refine and produce useful analytics for a wide variety of applications such as machine vision, prediction, scene segmentation, etc. This pixel level, surface level and shape level set of data, processing, and derived properties can be used to represent "objects" of interest from the microscopic level to the macroscopic level at any level of resolution—e.g. micron level resolution of carbon fiber structures to traffic flow along a freeway. The physics behind the data capture allows for there to be pixel, surfaces and shapes level information at "gradient" layers allowing for the ability to "penetrate" and/or see beneath "outer" surfaces—e.g. blood flow in a vein below the surface of the outer skin. This applies to the material within two boundary areas as well. Combinations of data at various levels such as pixel, surface, shape and combinations of mathematical routines and approaches at these levels can be constructed to produce useful specific applications and collections of applications can be organized into a platform approach. These combinations can also be organized into a digital architecture approach and manifest into such digital architecture forms as a Shape operating system providing access to these layers of information and processing thru an "SDK" or calling approach, as a portal where a human can interact and access with those data layers and transform the data into other data types thru a human directed approach, as a specific set of those combinations to create a stand-alone application providing a limited set of outputs or any combination therein of those approaches to create a system of value. These combinations of data collection, data processing and digital architectures can be executed on any existing digital platform such as mainframe processors, edge processors, GPUs, etc. and new platforms such as quantum based, photonic based, biological based, etc.

Example 1: A data management system for spatial phase imaging, includes a storage engine configured to receive and store input data in a record format. The input data includes: pixel-level first-order primitives generated based on electromagnetic (EM) radiation received from an object located in a field-of-view of an image sensor device; and pixel-level second-order primitives generated based on the first-order primitives. The data management system further includes an analytics engine configured to determine a plurality of features of the object based on the pixel-level first-order primitives and the pixel-level second-order primitives; and an access engine configured to provide a user access to the plurality of features of the object determined by the analytics engine and to the input data stored by the storage engine.

Example 2: The data management system of Example 1, where the access engine is configured to provide the user access through a software developer kit (SDK) layer, a portal through which the user can interact with the input data and the plurality of features of the object and transform the input data and the plurality of features into other data types through a human-directed approach, a technical platform providing a specific plurality of features to the user, or a combination thereof.

Example 3: The data management system of Example 1, where the analytics engine is configured to determine the plurality of features of the object by clustering pixel-level first-order primitives having similar attributes and pixel-level second-order primitives having similar attributes to define surfaces of the object.

Example 4: The data management system of Example 3, where the analytics engine is configured to determine the plurality of features of the object by attributing a respective set of surface-level first-order primitives and surface-level second-order primitives to an entirety of each surface of the object.

Example 5: The data management system of Example 4, where the access engine is configured to provide the user access to the sets of surface-level first-order primitives and surface-level second-order primitives, the access engine being an application operating on an existence, an extent, or a location of the surfaces of the object in a defined coordinate space.

Example 6: The data management system of Example 5, where the application includes an autonomous driving application or a scene segmentation application.

Example 7: The data management system of Example 4, where the analytics engine is configured to determine the plurality of features of the object by determining one or more geometric or angular relationships among the surfaces of the object that are invariant to orientation, translation, distance, or a coordinate system used to specify a location of the object.

Example 8: The data management system of Example 7, where the analytics engine is configured to determine the plurality of features of the object by identifying a shape of the object, identifying one or more materials of the object, identifying a type of the object, or determining a volume occupied by the object based on the one or more geometric or angular relationships.

Example 9: The data management system of Example 8, where the storage engine is configured to receive and store input data from repeated measurements of the object by the image sensor device, and the analytics engine is configured to determine a change in the shape of the object or a size of the object based on the repeated measurements.

Example 10: The data management system of Example 9, where the analytics engine is configured to determine a growth, a speed, or an acceleration of the object based on the change in the shape of the object or the change in the size of the object.

Example 11: The data management system of Example 9, where the analytics engine is configured to determine the plurality of features based on the pixel-level first-order primitives, the pixel-level second-order primitives, the surface-level first-order primitives, the surface-level second-order primitives, and the shape of the object using artificial intelligence (AI)-based analytics.

Example 12: The data management system of Example 11, where the access engine is a machine vision application, a prediction application, a scene segmentation application, or a combination thereof.

Example 13: The data management system of Example 1, where the plurality of features of the object includes microscopic-level features of the object or macroscopic-level features of the object.

Example 14: The data management system of Example 1, where the plurality of features includes: gradient layers of the object; a full rendering of the object and a scene; a distance of the object from the image sensor device, machine vision analysis of the object and the scene; a three-dimensional model or image of the object; a frequency distribution of electromagnetic radiation emanating from the object; angles of one or more surfaces or shapes of the object; surface normal vectors associated with the one or more surfaces of the object; velocity and acceleration of the surface normal vectors; an identification of a material of the object; interior volume features of the object; segmentation of the object; surface features within segments of the object; or a combination thereof.

Example 15: The data management system of Example 1, being implemented by a mainframe processor, an edge processor, a graphic processing unit, a quantum-based processor, a photonic-based processor, a biological-based processor, or a combination thereof.

Example 16: A method includes storing, in a storage engine of a data management system, input data in a record format. The input data includes: pixel-level first-order primitives generated based on electromagnetic (EM) radiation received from an object located in a field-of-view of an image sensor device; and pixel-level second-order primitives generated based on the first-order primitives. The method further includes: determining, by operation of an analytics engine of the data management system, a plurality of features of the object based on the pixel-level first-order primitives and the pixel-level second-order primitives; and providing, by operation of an access engine of the data management system, a user access to the plurality of features of the object determined by the analytics engine and to the input data stored by the storage engine.

Example 17: The method of Example 16, including providing, by operation of the access engine, the user access through a software developer kit (SDK) layer, a portal through which the user can interact with the input data and the plurality of features of the object and transform the input data and the plurality of features into other data types through a human-directed approach, a technical platform providing a specific plurality of features to the user, or a combination thereof.

Example 18: The method of Example 16, where determining the plurality of features of the object includes clustering pixel-level first-order primitives having similar attributes and pixel-level second-order primitives having similar attributes to define surfaces of the object.

Example 19: The method of Example 18, where determining the plurality of features of the object includes attributing a respective set of surface-level first-order primitives and surface-level second-order primitives to an entirety of each surface of the object.

Example 20: The method of Example 19, including providing the user access to the sets of surface-level first-order primitives and surface-level second-order primitives, the access engine being an application operating on an existence, an extent, or a location of the surfaces of the object in a defined coordinate space.

Example 21: The method of Example 20, where the application includes an autonomous driving application or a scene segmentation application.

Example 22: The method of Example 19, where determining the plurality of features of the object includes determining one or more geometric or angular relationships among the surfaces of the object that are invariant to orientation, translation, distance, or a coordinate system used to specify a location of the object.

Example 23: The method of Example 22, where determining the plurality of features of the object includes identifying a shape of the object, identifying one or more materials of the object, identifying a type of the object, or determining a volume occupied by the object based on the one or more geometric or angular relationships.

Example 24: The method of Example 23, including receiving and storing input data from repeated measurements of the object by the image sensor device, and determining a change in the shape of the object or a size of the object based on the repeated measurements.

Example 25: The method of Example 24, including determining a growth, a speed, or an acceleration of the object based on the change in the shape of the object or the change in the size of the object.

Example 26: The method of Example 24, where determining the plurality of features includes determining the plurality of features based on the pixel-level first-order primitives, the pixel-level second-order primitives, the surface-level first-order primitives, the surface-level second-order primitives, and the shape of the object using artificial intelligence (AI)-based analytics.

Example 27: The method of Example 26, where the access engine is a machine vision application, a prediction application, a scene segmentation application, or a combination thereof.

Example 28: The method of Example 16, where the plurality of features of the object includes microscopic-level features of the object or macroscopic-level features of the object.

Example 29: The method of Example 16, where the plurality of features includes: gradient layers of the object; a full rendering of the object and a scene; a distance of the object from the image sensor device, machine vision analysis of the object and the scene; a three-dimensional model or image of the object; a frequency distribution of electromagnetic radiation emanating from the object; angles of one or more surfaces or shapes of the object; surface normal vectors associated with the one or more surfaces of the object; velocity and acceleration of the surface normal vectors; an identification of a material of the object; interior volume features of the object; segmentation of the object; surface features within segments of the object; or a combination thereof.

While this specification contains many details, these should not be understood as limitations on the scope of what may be claimed, but rather as descriptions of features specific to particular examples. Certain features that are described in this specification or shown in the drawings in the context of separate implementations can also be combined. Conversely, various features that are described or shown in the context of a single implementation can also be implemented in multiple embodiments separately or in any suitable subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single product or packaged into multiple products.

A number of embodiments have been described. Nevertheless, it will be understood that various modifications can be made. Accordingly, other embodiments are within the scope of the following claims.

What is claimed is:

1. A data management system for spatial phase imaging, comprising:
    a storage engine configured to receive and store input data in a record format, the input data comprising:
        pixel-level first-order primitives generated based on electromagnetic (EM) radiation received from an object located in a field-of-view of an image sensor device; and
        pixel-level second-order primitives generated based on the pixel-level first-order primitives;
    an analytics engine configured to determine a plurality of features of the object by:
        clustering the pixel-level first-order primitives having similar attributes and the pixel-level second-order primitives having similar attributes to define surfaces of the object; and
        attributing a respective set of surface-level first-order primitives and surface-level second-order primitives to each surface of the object; and
    an access engine configured to provide a user access to the plurality of features of the object determined by the analytics engine and to the input data stored by the storage engine.

2. The data management system of claim 1, wherein the access engine is configured to provide the user access through a software developer kit (SDK) layer, a portal through which the user can interact with the input data and the plurality of features of the object and transform the input data and the plurality of features into other data types through a human-directed approach, a technical platform providing a specific plurality of features to the user, or a combination thereof.

3. The data management system of claim 1, wherein the access engine is configured to provide the user access to the sets of surface-level first-order primitives and surface-level second-order primitives, the access engine being an application operating on an existence, an extent, or a location of the surfaces of the object in a defined coordinate space.

4. The data management system of claim 3, wherein the application comprises an autonomous driving application or a scene segmentation application.

5. The data management system of claim 1, wherein the analytics engine is configured to determine the plurality of features of the object by determining one or more geometric or angular relationships among the surfaces of the object that are invariant to orientation, translation, distance, or a coordinate system used to specify a location of the object.

6. The data management system of claim 5, wherein the analytics engine is configured to determine the plurality of features of the object by identifying a shape of the object, identifying one or more materials of the object, identifying a type of the object, or determining a volume occupied by the object based on the one or more geometric or angular relationships.

7. The data management system of claim 6, wherein the storage engine is configured to receive and store input data from repeated measurements of the object by the image sensor device, and the analytics engine is configured to determine a change in the shape of the object or a size of the object based on the repeated measurements.

8. The data management system of claim 7, wherein the analytics engine is configured to determine a growth, a speed, or an acceleration of the object based on the change in the shape of the object or the change in the size of the object.

9. The data management system of claim 7, wherein the analytics engine is configured to determine the plurality of features based on the pixel-level first-order primitives, the pixel-level second-order primitives, the surface-level first-order primitives, the surface-level second-order primitives, and the shape of the object using artificial intelligence (AI)-based analytics.

10. The data management system of claim 9, wherein the access engine is a machine vision application, a prediction application, a scene segmentation application, or a combination thereof.

11. The data management system of claim 1, wherein the plurality of features of the object comprises microscopic-level features of the object or macroscopic-level features of the object.

12. The data management system of claim 1, wherein the plurality of features comprises:
gradient layers of the object;
a full rendering of the object and a scene;
a distance of the object from the image sensor device, machine vision analysis of the object and the scene;
a three-dimensional model or image of the object; a frequency distribution of electromagnetic radiation emanating from the object;
angles of one or more surfaces or shapes of the object;
surface normal vectors associated with the one or more surfaces of the object;
velocity and acceleration of the surface normal vectors;
an identification of a material of the object; and
interior volume features of the object; segmentation of the object; surface features within segments of the object; or a combination thereof.

13. The data management system of claim 1, being implemented by a mainframe processor, an edge processor, a graphic processing unit, a quantum-based processor, a photonic-based processor, a biological-based processor, or a combination thereof.

14. A method, comprising:
storing, in a storage engine of a data management system, input data in a record format, the input data comprising:
pixel-level first-order primitives generated based on electromagnetic (EM) radiation received from an object located in a field-of-view of an image sensor device; and
pixel-level second-order primitives generated based on the pixel-level first-order primitives;
determining, by operation of an analytics engine of the data management system, a plurality of features of the object by clustering the pixel-level first-order primitives having similar attributes and the pixel-level second-order primitives having similar attributes to define surfaces of the object; and
attributing a respective set of surface-level first-order primitives and surface-level second-order primitives to each surface of the object; and
providing, by operation of an access engine of the data management system, a user access to the plurality of features of the object determined by the analytics engine and to the input data stored by the storage engine.

15. The method of claim 14, comprising providing, by operation of the access engine, the user access through a software developer kit (SDK) layer, a portal through which the user can interact with the input data and the plurality of features of the object and transform the input data and the plurality of features into other data types through a human-directed approach, a technical platform providing a specific plurality of features to the user, or a combination thereof.

16. The method of claim 14, comprising providing the user access to the sets of surface-level first-order primitives and surface-level second-order primitives, the access engine being an application operating on an existence, an extent, or a location of the surfaces of the object in a defined coordinate space.

17. The method of claim 16, wherein the application comprises an autonomous driving application or a scene segmentation application.

18. The method of claim 14, wherein determining the plurality of features of the object comprises determining one or more geometric or angular relationships among the surfaces of the object that are invariant to orientation, translation, distance, or a coordinate system used to specify a location of the object.

19. The method of claim 18, wherein determining the plurality of features of the object comprises identifying a shape of the object, identifying one or more materials of the object, identifying a type of the object, or determining a volume occupied by the object based on the one or more geometric or angular relationships.

20. The method of claim 19, comprising receiving and storing input data from repeated measurements of the object by the image sensor device, and determining a change in the shape of the object or a size of the object based on the repeated measurements.

21. The method of claim 20, comprising determining a growth, a speed, or an acceleration of the object based on the change in the shape of the object or the change in the size of the object.

22. The method of claim 20, wherein determining the plurality of features comprises determining the plurality of features based on the pixel-level first-order primitives, the pixel-level second-order primitives, the surface-level first-order primitives, the surface-level second-order primitives, and the shape of the object using artificial intelligence (AI)-based analytics.

23. The method of claim 22, wherein the access engine is a machine vision application, a prediction application, a scene segmentation application, or a combination thereof.

24. The method of claim 14, wherein the plurality of features of the object comprises microscopic-level features of the object or macroscopic-level features of the object.

25. The method of claim 14, wherein the plurality of features comprises:
gradient layers of the object; a full rendering of the object and a scene;
a distance of the object from the image sensor device, machine vision analysis of the object and the scene; a three-dimensional model or image of the object;
a frequency distribution of electromagnetic radiation emanating from the object;
angles of one or more surfaces or shapes of the object;
surface normal vectors associated with the one or more surfaces of the object;
velocity and acceleration of the surface normal vectors;
an identification of a material of the object;
interior volume features of the object; and
segmentation of the object; surface features within segments of the object; or a combination thereof.

* * * * *

UNITED STATES PATENT AND TRADEMARK OFFICE
CERTIFICATE OF CORRECTION

PATENT NO. : 12,175,600 B2
APPLICATION NO. : 17/587540
DATED : December 24, 2024
INVENTOR(S) : Blair Barbour et al.

It is certified that error appears in the above-identified patent and that said Letters Patent is hereby corrected as shown below:

On the Title Page

Column 1, item (72) Inventors, Line 1, delete "Windemere," and insert --Windermere,--

In the Specification

Column 1, Lines 9-10, after "Imaging"", insert --,--

Column 7, Line 32, delete "beyond." and insert --beyond).--

Column 7, Line 51, delete "201" and insert --104--

Column 13, Lines 12-16, delete "$\begin{pmatrix} 0.5 & 0 & 0.5 & 0.5 & 0.5 \\ 1 & 0 & 1 & 0 & 0 \\ -1 & 0 & 1 & 0 & 0 \\ -1 & 2 & -1 & 1 & -1 \end{pmatrix}$" and insert --$\begin{pmatrix} 0.5 & 0 & 0.5 & 0.5 & 0.5 \\ -1 & 0 & 1 & 0 & 0 \\ -1 & 2 & -1 & 0 & 0 \\ 0 & 0 & 0 & 1 & -1 \end{pmatrix}$--

Column 14, Lines 48-51, delete "$D' = \begin{pmatrix} i0' \\ i45' \\ i90' \\ i135' \end{pmatrix}$," and insert --$D' = \begin{pmatrix} d0' \\ d45' \\ d90' \\ d135' \end{pmatrix}$,--

Column 15, Line 63, delete "do," and insert --d0,--

Column 17, Line 3-4, delete "$K=K_1/K_2$." and insert --$K = K_1 K_2$.--

Signed and Sealed this
Twenty-fifth Day of March, 2025

Coke Morgan Stewart
*Acting Director of the United States Patent and Trademark Office*